United States Patent [19]
Bergmann et al.
[11] Patent Number: 5,003,049
[45] Date of Patent: Mar. 26, 1991

[54] DYES CONTAINING FLUOROTRIAZINE AND DICHLOROPYRIDAZONE GROUPS

[75] Inventors: Udo Bergmann, Darmstadt; Alfred Hackenberger, Ludwigshafen; Manfred Patsch, Wachenheim, all of Fed. Rep. of Germany

[73] Assignee: BASF Aktiengesellschaft, Ludwigshafen, Fed. Rep. of Germany

[21] Appl. No.: 307,621

[22] Filed: Feb. 8, 1989

Related U.S. Application Data

[63] Continuation of Ser. No. 893,148, Aug. 5, 1986, abandoned.

[30] Foreign Application Priority Data

Aug. 10, 1985 [DE] Fed. Rep. of Germany ....... 3528734

[51] Int. Cl.$^5$ ...................... C09B 62/04; C09B 62/12; D06P 1/302; D06P 3/66

[52] U.S. Cl. .................................... 534/618; 534/617; 534/624; 534/634; 534/629; 534/642; 534/633; 534/598; 544/189; 544/181; 544/76; 544/74

[58] Field of Search ......... 534/617, 618, 619, 620-638

[56] References Cited

U.S. PATENT DOCUMENTS

| | | | |
|---|---|---|---|
| 3,126,370 | 3/1964 | Hensel et al. | 534/634 X |
| 3,362,948 | 1/1968 | Andrew et al. | 534/634 X |
| 4,248,771 | 2/1981 | Scholl et al. | 534/634 X |
| 4,677,199 | 6/1987 | Augart et al. | 534/618 |

FOREIGN PATENT DOCUMENTS

| | | | |
|---|---|---|---|
| 751421 | 1/1969 | Canada | 534/634 |
| 0126265 | 4/1984 | European Pat. Off. | 534/634 |
| 0119441 | 9/1984 | European Pat. Off. | 534/634 |
| 1450102 | 10/1965 | France | 534/634 |
| 924660 | 5/1963 | United Kingdom | 534/634 |
| 1015931 | 1/1966 | United Kingdom | 534/634 |
| 2039289 | 8/1980 | United Kingdom | 534/634 |

*Primary Examiner*—Floyd D. Higel
*Attorney, Agent, or Firm*—Oblon, Spivak, McClelland, Maier & Neustadt

[57] ABSTRACT

The compounds of the general formula (I)

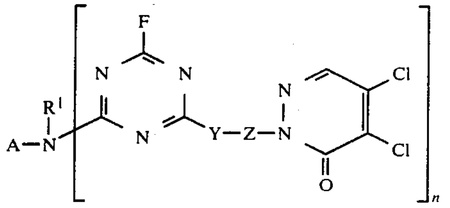

(I)

where A is a dye radical, where relevant the radicals Y independently of one another are each oxygen, sulfur, $R^1$—N or a direct bond, n is 1 or 2, the radicals $R^1$ independently of one another are each hydrogen or unsubstituted or substituted $C_1$-$C_4$-alkyl and Z is a bridge member, are very useful for dyeing hydroxyl-containing textile material.

1 Claim, No Drawings

DYES CONTAINING FLUOROTRIAZINE AND DICHLOROPYRIDAZONE GROUPS

This is a continuation of copending application Ser. No. 06/893,148, filed Aug. 5, 1986, now abandoned.

SUMMARY OF THE INVENTION

The present invention relates to compounds of the general formula (I)

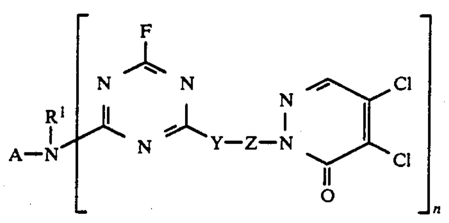

(I)

where A is a dye radical, where relevant the radicals Y independently of one another are each oxygen, sulfur, $R^1$—N or a direct bond, n is 1 or 2, the radicals $R^1$ independently of one another are each hydrogen or unsubstituted or substituted $C_1$-$C_4$-alkyl and Z is a bridge member.

DETAILED DESCRIPTION OF THE PREFERRED EMBODIMENTS

Y is preferably $R^1$—N. Alkyl radicals $R^1$ are, for example, propyl, butyl, ethyl and preferably methyl. $R^1$ is preferably hydrogen.

Z is a (cyclo)aliphatic, aromatic, heteroaromatic or araliphatic group which may carry further substituents. Examples of (cyclo)aliphatic groups are (cyclo)hexylene, (cyclo)pentylene, butylene and preferably propylene, ethylene and methylene. Aromatic groups are derived from, for example, the naphthalene, furan, thiophene or pyridine series. A preferred aromatic group Z is phenylene. An example of an araliphatic group is benzylene. All groups Z may carry one or more substituents, eg. fluorine, chlorine, bromine, (cyclo)alkyl, (hetero)aryl, amino, acetylamino, perhaloalkyl, cyano, ureido, alkoxy, hydroxyl, hydroxycarbonyl, aminocarbonyl or alkoxycarbonyl. Hydroxysulfonyl is preferred.

In the case of (cyclo)aliphatic or araliphatic groups Z, the carbon chain may be interrupted by one or more heteroatoms or by one or more heteroatom-containing groups, eg. oxygen, sulfur, N—$R^1$, carboxamido, carboxylato, aminosulfonyl, ureido, carbonyl or the SO or $SO_2$ group.

Specific examples of bridge members Z are the following groups, to which Y, having the meanings given above, may be bonded in each case via one of the two free bonds. The indices m independently of one another are each an integer of from 0 to 3. Specific examples of (cyclo)aliphatic bridge members Z are:

$-(CH_2)_m-CH_2-(CH_2)_m-$,
$C_5$-bis$C_7$-cycloalkylene-$(CH_2)_m-CHCl-(CH_2)_m-$,
$-(CH_2)_m-CH(OH)-(CH_2)_m-$,
$-(CH_2)_m-CH(SO_3H)-(CH_2)_m-$,
$-(CH_2)_m-CHF-(CH_2)_m-$, $-(CH_2)_m-CF_2-(CH_2)_m-$,
$-(CH_2)_m-CCl_2-(CH_2)_m-$, $-(CF_2)_m-CF_2-$,
$-(CHF)_m-CHF-$, $-(CHCl)_m-CHCl-$, -continued $-(CHBr)_m-CHBr-$, 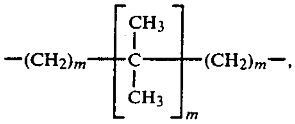

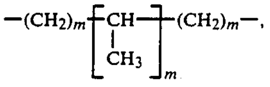 , $-(CH_2)_m-(CHAr)_m-(CH_2)_m-$

[where Ar is unsubstituted or substituted phenyl],

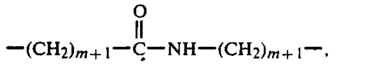

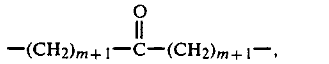

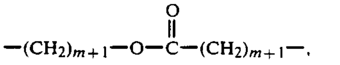

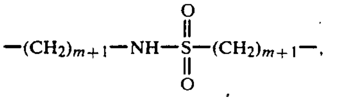

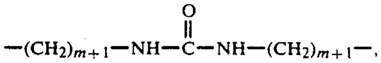

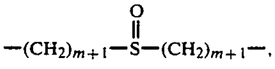 , 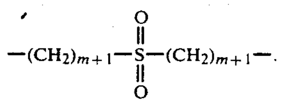

Specific examples of aromatic bridge members Z are:

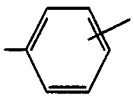 , 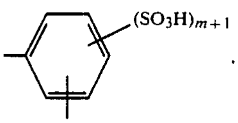 , 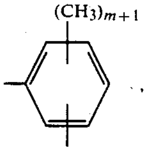 ,

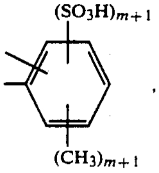 , 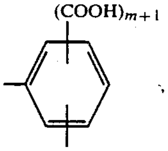 , 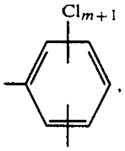 ,

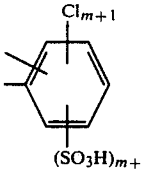 , 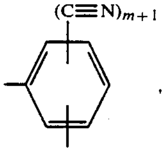 , 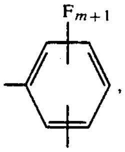 ,

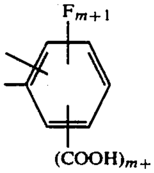 , 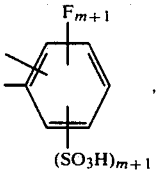 , 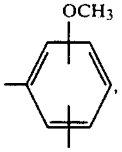 ,

-continued
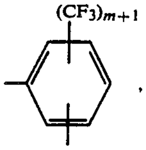, 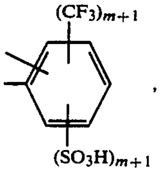, 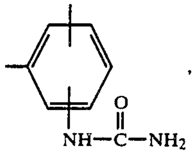,
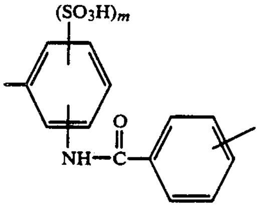, 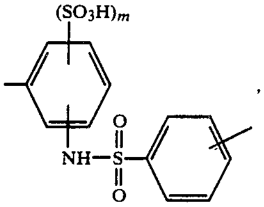,
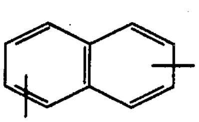, 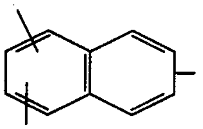,
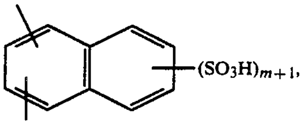
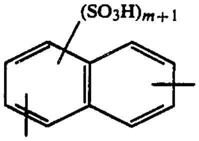, 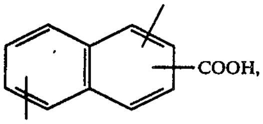
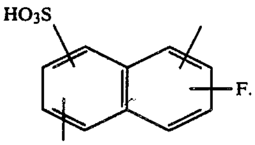
and
Examples of heterocyclic bridge members Z are:
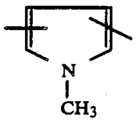, 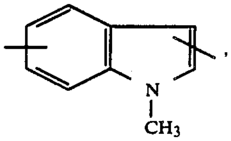,
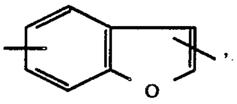, 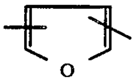, 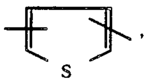,
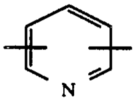, 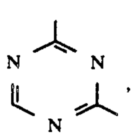, 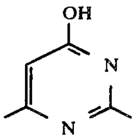,
-continued
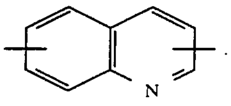.
Examples of araliphatic bridge members Z are:
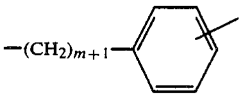, 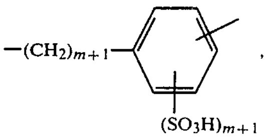,
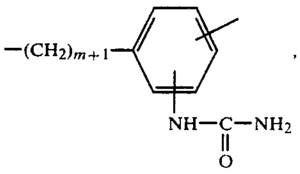,
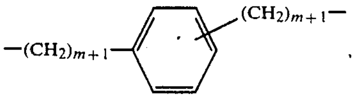,
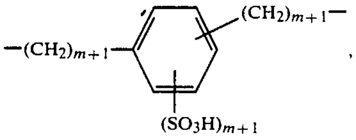,
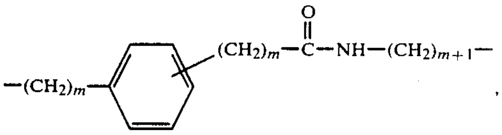,
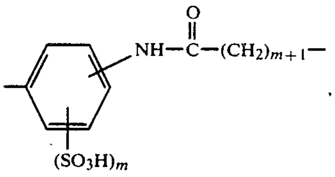,
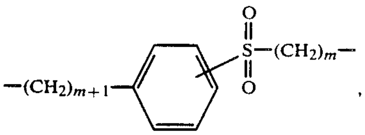,
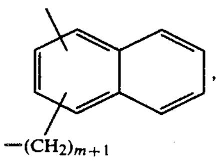, 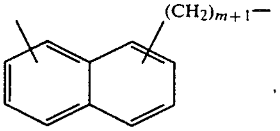.
When Y is a direct bond, Y—Z may furthermore have the following meanings:

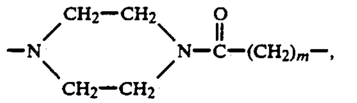

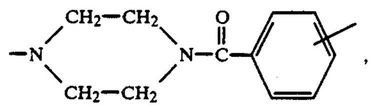

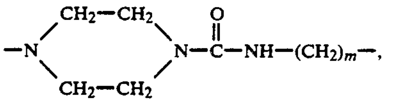

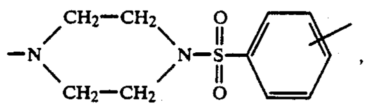

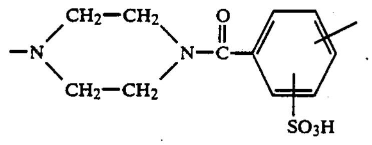

Z is preferably $C_1$–$C_5$-alkylene, or phenylene which is substituted by alkyl and/or by hydroxysulfonyl.

A is derived from, for example, the azo, anthraquinone, formazan, phthalocyanine or triphendioxazine series, and the dyes may furthermore be metallized. A may furthermore contain other conventional reactive groups.

Preferred dyes are those which contain from 1 to 6 sulfo groups. Suitable dye radicals A or amino-containing dyes from which the dyes (I) are derived are described in large numbers in the literature, for example in:

Belgian Patent Nos. 606,947, 617,435, 567,435, 701,273, 683,734, 683,573, 693,749, 708,003 and 707,307;

German Published Application Nos.: 1,242,553, 1,212,655 and 1,225,322;

German Laid-Open Application Nos.: 2,633,255, 2,103,299, 2,305,206, 2,418,283, 2,623,224, 1,809,388, 1,912,178, 2,057,867, 1,769,205, 2,107,427, 2,303,601 and 2,600,490.

Swiss Patent Nos.: 536,353 and 521,403;

British Patent Nos.: 1,299,881 and 1,300,742 and

Vankataraman: The Chemistry of Synthetic Dyes, volume VI, chapter II, pages 211-325, New York, London 1972.

Particularly useful dyes of this series are water-soluble azo dyes, in particular those which possess sulfo and/or carboxyl groups. However, reactive dispersion dyes of the azo series which are free of sulfo and carboxyl groups are also important. The azo dyes may be either metal-free or metal-containing, the copper, chromium and cobalt complexes being preferred among the metal complexes.

Examples of important azo dyes are those of the benzeneazonaphthalene, benzeneazo-1-phenyl-5-pyrazolone, benzeneazobenzene, naphthaleneazobenzene, benzeneazoaminonaphthalene, naphthaleneazonaphthalene, naphthaleneazo-1-phenylpyrazol-5-one, benzeneazopyridone, benzeneazoaminopyridine, naphthaleneazopyridone, naphthaleneazoaminopyridine and stilbeneazobenzene series, the sulfo-containing dyes being preferred in this case too. In the case of metal complex azo dyes, the groups bonded to form the metal complex are preferably ortho to the azo group, for example in the form of o,o'-dihydroxy, o-hydroxy-o'-carboxyl, o-carboxy-o'-amino and o-hydroxy-o'-aminoazo groups.

The following azo-containing dye radicals

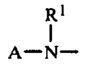

are, in particular, of the formula

D—N=N—K where D is a radical of a diazo component and K is a radical of a coupling component, and a fiber-reactive radical

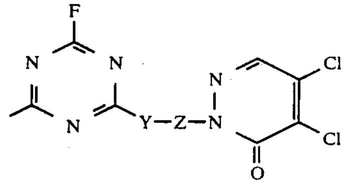

which will be designated B below, can be bonded to the dye either via the radical D of the diazo component or via the radical K of the coupling component or, where n is 2, via D and K.

Aromatic radicals D of the diazo components of the aniline and aminonaphthalene series which do not carry any fiber-reactive groups are derived from, for example, amines of the formulae II a–f:

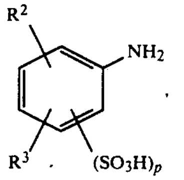

IIa

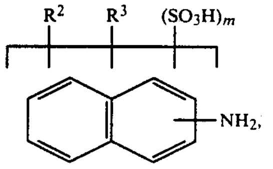

IIb

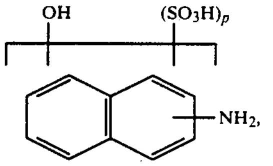

IIc

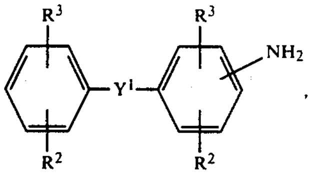

IId

-continued

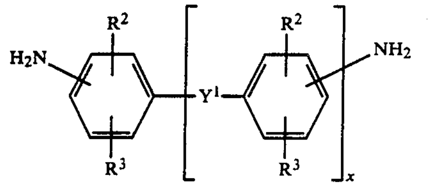

IIe or

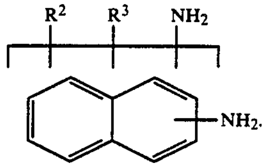

IIf where m is an integer of from 0 to 3, p is an integer of from 0 to 2, $R^2$ is hydrogen, methyl, ethyl, methoxy, ethoxy, acetyl, cyano, hydroxycarbonyl, hydroxysulfonyl, $C_1$–$C_4$-alkoxycarbonyl, hydroxyl, aminocarbonyl, $C_1$–$C_4$ -alkylaminocarbonyl, fluorine, chlorine, bromine or trifluoromethyl, $R^3$ is hydrogen, methyl, ethyl, methoxy, ethoxy, cyano, hydroxycarbonyl, hydroxysulfonyl, acetylamino, $C_1$–$C_4$-alkoxycarbonyl, aminocarbonyl, $C_1$–$C_4$-alkylaminocarbonyl, fluorine, chlorine, nitro, aminosulfonyl, $C_1$–$C_4$-alkylaminosulfonyl, $C_1$–$C_4$-alkylsulfonyl, phenylsulfonyl or phenoxy, x is 0 or 1 and $Y^1$ is a direct bond or —NHCO—, —CONH—, —CO—, —$NHSO_2$—, —$SO_2NH$—, —$SO_2$—, —CH=CH—, —$CH_2$—$CH_2$—, —$CH_2$—, —NH—, —O—, —S— or —N=N—.

$R^2$ is preferably H, $CH_3$, $CH_3O$, Cl, COOH, $SO_3H$ or OH, $R^3$ is preferably H, $CH_3$, $CH_3O$, Cl, COOH, $SO_3H$ or $NHCOCH_3$ and $Y^1$ is preferably —$SO_2$—, —CO—, —CH=CH—, —N=N—, —$CH_2$—$CH_2$— and —$CH_2$—.

Specific examples of aromatic amines which do not possess a fiber-reactive group, can be used as diazo components for the preparation of the novel dyes and are, for example, of the general formulae (IIa), (IIb), (IIc) and (IId) are aniline, 2-methoxyaniline, 2-ethoxyaniline, 2-methylaniline, 4-nitro-2-aminoanisole, 4-chloro-2-aminoanisole, 4-methylaniline, 4-methoxyaniline, 2-nitro-4-aminoanisole, 2-methoxy-5-methylaniline, 4-nitroaniline, 2-chloro-4-nitroaniline, 2,6-dichloro-4-nitroaniline, 2-nitro-4-methylaniline, 2,5-dimethoxyaniline, 2,5-dimethylaniline, 2,4-dimethylaniline, 4-butylaniline, 2-cyano-4-nitroaniline, 2,5-diethoxyaniline, 4-cyanoaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-(p-tolylsulfonyl)-aniline, 2-ethoxy-1-naphthylamine, 1-naphthylamine, 2-naphthylamine, 4-benzoylamino-2-ethoxyaniline, 3-amino-4-methylbenzonitrile, 4-methylsulfonylaniline, 2-trifluoromethylaniline, 1-trifluoromethyl-3-chloroaniline, 2,4-dichloroaniline-5-carboxylic acid, 2-aminobenzoic acid, 4-aminobenzoic acid, 3-aminobenzoic acid, 3-chloroaniline-6-carboxylic acid, aniline-2- or -3- or -4-sulfonic acid, 2,5-disulfoaniline, 2,4-disulfoaniline, 3,5-disulfoaniline, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4 -sulfonic acid, 4-sulfo-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3-sulfonic acid or -4-sulfonic acid, 3-acetylamino-6-sulfonic acid, 4-acetylamino-2-sulfoaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 2-aminophenol-4-sulfonic acid, 2-aminophenol-5-sulfonic acid, 3-aminophenol-6-sulfonic acid, 4- or 5-nitro-2-aminophenol, 4-nitro-6-sulfo-2-aminophenol, 1-hydroxy-2-aminonaphthalene-5,8- or 4,6-disulfonic acid, 6-nitro-2-hydroxy-4-sulfoaminonaphthalene, 6-nitro-2-aminonaphthalene-4,8-disulfonic acid, 4-aminodiphenylamine, 4-amino-4'-methoxydiphenylamine, 4-amino-4'-methoxydiphenylamine-3-sulfonic acid, 4-(2'-methylphenylazo)-2-methylaniline, 4-aminoazobenzene, 4'-nitrophenylazo-1- aminonaphthalene, 4-(6'-sulfonaphthylazo)-1-aminonaphthalene, 4-(2',5'-disulfophenylazo)-1-aminonaphthalene, 4'-amino-3'-methyl-3-nitrobenzophenone, 4-aminobenzophenone, 4-(4'-aminophenylazo)-benzenesulfonic acid, 4-(4'-amino-3'-methoxyphenylazo)-benzenesulfonic acid and 2-ethoxy-1-naphthylamine-6-sulfonic acid.

Specific examples of aromatic diamines which do not possess a fiber-reactive group, can be used as tetrazo components for the preparation of the novel dyes and are of, for example, the general formula (IIe) or (IIf) are: 1,3-diaminobenzene, 1,3-diaminobenzene-4-sulfonic acid, 1,4-diaminobenzene, 1,4-diaminobenzene-2-sulfonic acid, 1,4-diamino-2-methylbenzene, 1,4-diamino-2-methoxybenzene, 1,3-diamino-4-methylbenzene, 1,3-diaminobenzene-5-sulfonic acid, 1,3-diamino-5-methylbenzene, 1,6-diaminonaphthalene-4-sulfonic acid, 2,6-diamino-4,8-disulfonaphthalene, 3,3'-(diaminodiphenylsulfone, 4,4'-diaminodiphenylsulfone, 3,3'-diaminodisulfodiphenyl sulfone, 4,4'-diaminostilbene-2,2'-disulfonic acid, 2,7'-diaminodiphenyl sulfone, 2,7'-diaminodiphenylsulfone-4,5-disulfonic acid, 4,4'-diaminobenzophenone, 4,4'-diamino-3,3'-dinitrobenzophenone, 3,3'-diamino-4,4'-dichlorobenzophenone, 4,4'- or 3,3'-diaminodiphenyl, 4,4'-diamino-3,3'-dichlorodiphenyl, 4,4'-diamino-3,3'-dichlorodiphenyl, 4,4'-diamino-3,3'-dimethoxy- or -3,3'-dimethyl- or -2,2'-dimethyl- or -2,2'-dichloro- or -3,3'-diethoxydiphenyl, 4,4'-diamino-3,3'-dimethyl-6,6'-dinitrodiphenyl, 4,4'-diamino-2,2'- or -3,3'-disulfodiphenyl, 4,4'-diamino-3,3'-dimethyl- or -3,3'-dimethoxy or -2,2'-dimethoxy-6,6'-disulfodiphenyl, 4,4'-diamino-2,2',5,5'-tetrachlorodiphenyl, 4,4'-diamino-3,3'-dinitrodiphenyl, 4,4'-diamino-2,2'-dichloro-5,5'-dimethoxydiphenyl, 4,4'-diamino-2,2'- or -3,3'-dicarboxylic acid, 4,4'-diamino-3,3'-dimethyl-diphenyl-5,5'-disulfonic acid, 4,4'-diamino-2-nitrodiphenyl, 4,4'-diamino-3-ethoxy- or -3-sulfodiphenyl, 4,4'-diamino-3,3'-dimethyl-5-sulfodiphenyl, 4,4'-diaminodiphenylmethane, 4,4'-diamino-3,3'-dimethyldiphenylmethane, 4,4'-diamino-2,2',3,3'-tetramethyldiphenylmethane, 4,4'-diaminodiphenylethane, 4,4'-diaminostilbene and 4,4'-diaminodiphenylmethane-3,3'-dicarboxylic acid.

Aromatic radicals D of the diazo component of the aniline and aminonaphthalene series, which may carry a fiber-reactive radical B, are derived from, for example, amines of the formulae III a–c:

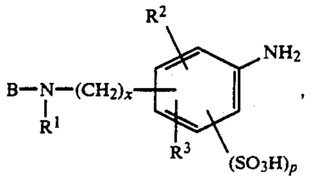

IIIa

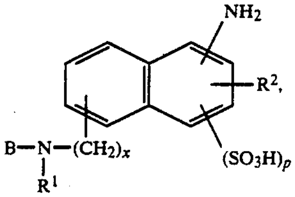

IIIb

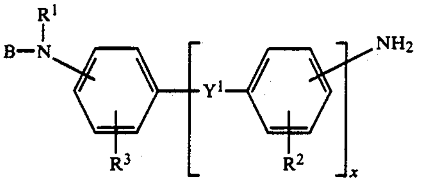

IIIc where $R^1$, $R^2$, $R^3$, p, x, $Y^1$ and B have the stated meanings.

The aromatic compounds of the formulae III a–c which carry the fiber-reactive radical B are derived in particular from, for example, the following diamines: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,6-diamino-2-naphthol-4-sulfonic acid, 1,6-diaminonaphthalene-4-sulfonic acid, 2,6-diamino-4,8-disulfonaphthalene, 2,6-diamino-1-naphthol-4,8-disulfonic acid, 1,3-diaminobenzene-5-sulfonic acid, 1,3-diamino-5-methylbenzene, 2,6-diaminophenol-4-sulfonic acid, 5-(ω-aminomethyl)-2-aminonaphthalene-1-sulfonic acid, 5-(ω-N-methylaminomethyl)-2-aminonaphthalene-1-sulfonic acid, 4,4'-diaminostilbene-3,3'-dicarboxylic acid, 4-(ω-N-methylaminomethyl)-aniline-2-sulfonic acid and 3-(ω-N-methylaminomethyl)-aniline-6-sulfonic acid.

The radicals K of the coupling component are preferably derived from the aniline, naphthalene, pyrazole, pyridine, pyrimidine, indole, acylacetarylide or barbituric acid series and may also carry fiber-reactive groups. They may therefore be of the formula

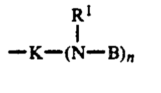

where B, K, $R^1$ and n have the stated meanings.

Examples of coupling components of the aniline and naphthalene series are anilines, N-monosubstituted anilines, m-phenylenediamine derivatives, naphtholsulfonic acids, aminonaphthalenes, naphthols, hydroxynaphthoic acid derivatives, aminonaphthalenesulfonic acids and aminonaphtholsulfonic acids.

Coupling components of the aniline and naphthalene series which are free of fiber-reactive groups are, for example, compounds of the formulae IVa–g:

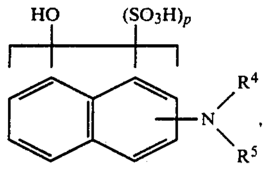

IVa

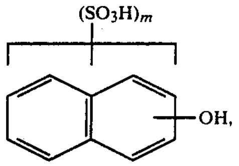

IVb

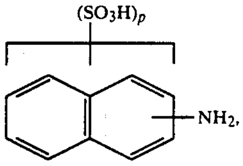

IVc

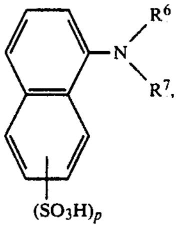

IVd

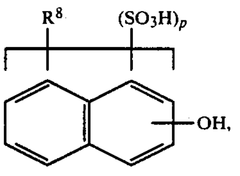

IVe

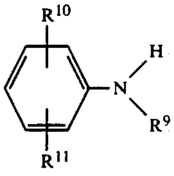

IVf or

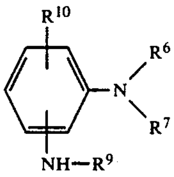

IVg where $R^4$ is hydrogen or $C_1$–$C_4$-alkyl, $R^5$ is hydrogen or $C_1$-$C_4$-alkyl or is phenyl which may be substituted by 1 or 2 substituents from the group consisting of $C_1$–$C_4$-alkyl, $C_1$–$C_4$-alkoxy, chlorine, bromine and hydroxysulfonyl, R is hydrogen or $C_1$–$C_4$-alkyl which may be substituted by hydroxyl, cyano, hydroxycarbonyl, hydroxysulfonyl, hydroxysulfonyloxy, methoxycarbonyl, ethoxycarbonyl or acetoxy, $R^7$ is hydrogen or $C_1$–$C_4$-alkyl which may be substituted by hydroxyl, cyano, hydroxycarbonyl, hydroxysulfonyl, hydroxysulfonyloxy, methoxycarbonyl, ethoxycarbonyl or acetoxy, or is benzyl, or phenyl which may be substituted by $C_1$–$C_4$-alkyl, $C_1$–$C_4$-alkoxy, chlorine and/or hydroxysulfonyl, $R^8$ is $C_1$–$C_6$-alkyl-ureido or phenylureido, each of which may be substituted by chlorine, methyl, methoxy, nitro, hydroxysulfonyl and/or hydroxycarbonyl, or is $C_1$–$C_6$-alkanoylamino, eg. acetamino, propionylamino or cyclohexanoylamino, or is benzoylamino which may be substituted by chlorine, methyl, methoxy, nitro, hydroxysulfonyl and/or hydroxycarbonyl, or is hydroxyl, $R^9$ is hydrogen, $C_1$–$C_6$-alkyl, in particular $C_1$–$C_4$-alkyl, which may be substituted by aryl, eg. phenyl, or by $C_1$–$C_4$-alkoxy, hydroxyl, phenoxy or $C_1$–$C_4$-alkanoyloxy, or is cycloalkyl, eg. cyclohexyl, or aryl, eg. phenyl, which may contain a hydroxysulfonyl group, $R^{10}$ is hydrogen, methyl, ethyl, methoxy, ethoxy, chlorine, bromine, acetylamino, amino, ureido, methylsulfonylamino, ethylsulfonylamino, dimethylaminosulfonylamino, methylamino, ethylamino, dimethylamino or diethylamino, $R^{11}$ is hydrogen, methyl, ethyl, methoxy, ethoxy, chlorine or bromine and p and m have the stated meanings.

Specific examples are: aniline N-methanesulfonate, o- and m-toluidine, o- and m-anisidine, cresidine, 2,5-dimethylaniline, 2,5-dimethoxyaniline, m-aminoacetanilide, 3-amino-4-methoxyacetanilide, 3-amino-4-methylacetanilide, m-aminophenylurea, N-methylaniline, N-methyl-m-toluidine, N-ethylaniline, N-ethyl-m-toluidine, N-β-hydroxyethylaniline and N-β-hydroxy-m-toluidine.

Examples of naphtholsulfonic acids are: 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1,8-dihydroxy naphthalene-3,6-disulfonic acid, 2,6-dihydroxynaphthalene-8-sulfonic acid and 2,8-dihydroxynaphthalene-6-sulfonic acid.

Other examples are: α-naphthylamine, N-phenyl-α-naphthylamine, N-ethyl-α-naphthylamine, N-phenyl-β-naphthylamine, 1,5-naphthylenediamine, 1,8-naphthylenediamine, α-naphthol, β-naphthol, 1,5-dihydroxynaphthalene, 1,6-dihydroxynaphthalene, 1,7-dihydroxynaphthalene, 2,7-dihydroxynaphthalene, 2-hydroxynaphthalene-3-carboxylic acid N-phenylamide, 2-hydroxynaphthalene-3-carboxylic acid N-(2'-methoxyphenyl)-amide and 2-hydroxynaphthalene-3-carboxylic acid N-(2',5'-dimethoxyphenyl)amide.

Examples of aminonaphthalenesulfonic acids are: 1-naphthylamine-6-sulfonic acid, 1-naphthylamine-6/7-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid and 2-naphthylamine-6,8-disulfonic acid.

Examples of aminonaphtholsulfonic acids are: 1-amino-5-hydroxynaphthalene-7-sulfonic acid, 1-amino-8-hydroxynaphthalene-4-sulfonic acid, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxy-naphthalene-6-sulfonic acid, 2-methylamino-8-hydroxynaphthalene-6-sulfonic acid and 2-(3'- and 4'-sulfophenyl)-amino-8-hydroxynaphthalene-6-sulfonic acid.

Of particular importance are sulfo-containing and/or carboxyl-containing coupling components which may carry azo groups and couple ortho or para to a hydroxyl and/or amino group.

Examples of such coupling components are: 2-acetylamino-5-hydroxynaphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid and 1-benzoyl-amino-8-hydroxynaphthalene-4,6-disulfonic acid.

Examples of further coupling components are, in particular, 1-amino-8-hydroxynaphthalene-3,6- and -4,6-disulfonic acid and their arylazo coupling products, obtained by coupling under acidic conditions, of the formula

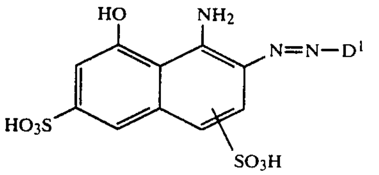

where $D^1$ is a radical of a diazo component, for example a radical of the formula

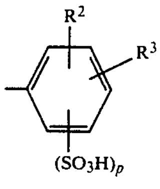

or

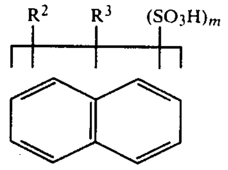

where $R^2$, $R^3$, p and m have the stated meanings.

Specific radicals $D^1$ are derived from, for example, the following amines: aniline, aniline-2-, -3- and -4-sulfonic acid, aniline-2,4-, -2,5- and -3,5-disulfonic acid, 2-naphthylamine-1,5- and -4,8-disulfonic acid, 2-naphthylamine-3,6,8- and -4,6,8-trisulfonic acid, 1-naphthylamine-3,6,8- and -4,6,8-trisulfonic acid, 1-naphthylamine-4-sulfonic acid, 2-naphthylamine-1-sulfonic acid, 3- and 4-aminoacetanilide, 4- and 5-acetamido-2-sulfoaniline, 4-nitroaniline, 4-nitroaniline-2-sulfonic acid and 2-amino-6-acetaminonaphthalene-4,8-disulfonic acid.

Examples of coupling components of other series are pyrazolones and aminopyrazolones, 2,6-diaminopyridines, pyridones, hydroxy- and aminopyrimidines, indoles, barbituric acid derivatives and acetoacetarylides.

Coupling components of this series which are free of fiber-reactive groups are, for example, of the formulae Va–f:

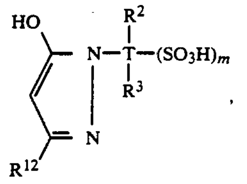

Va

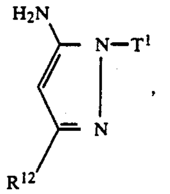

Vb

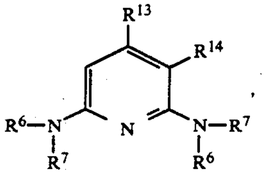

Vc

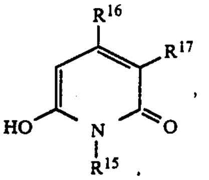

Vd

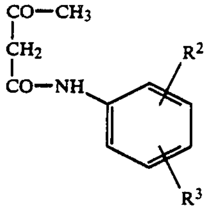

Ve and

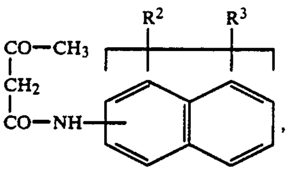

Vf where T is a benzene or naphthalene nucleus, T' is $C_1$–$C_4$-alkyl, cyclohexyl or benzyl or is phenyl which is monosubstituted or polysubstituted by fluorine, chlorine, bromine, methyl, methoxy, nitro, hydroxysulfonyl, hydroxycarbonyl, acetyl, acetylamino, methylsulfonyl, aminosulfonyl or aminocarbonyl, $R^{12}$ is methyl, hydroxycarbonyl, methoxycarbonyl, ethoxycarbonyl or phenyl, $R^{13}$ is hydrogen, methyl or ethyl or is $C_1$–$C_4$-alkyl which is substituted by methoxy, ethoxy or cyano, $R^{14}$ is hydrogen, methyl, sulfomethylene, hydroxysulfonyl, cyano or aminocarbonyl, $R^{15}$ is hydrogen or $C_1$–$C_4$-alkyl which may be substituted by phenyl, sulfophenyl, hydroxyl, amino, methoxy, ethoxy, hydroxycarbonyl, hydroxysulfonyl, acetylamino, benzoylamino or cyano, or is cyclohexyl or is phenyl which is unsubstituted or substituted by hydroxycarbonyl, hydroxysulfonyl, benzoylamino, acetylamino, methyl, methoxy, cyano or chlorine or is amino which is substituted by phenyl, $C_1$–$C_4$-alkyl, acetyl or benzoyl, $R^{16}$ is $C_1$–$C_4$-alkyl, phenyl, hydroxyl, cyano, acetyl, benzoyl, hydroxycarbonyl, methoxycarbonyl, aminocarbonyl or sulfomethylene, $R^{17}$ is hydrogen, chlorine, bromine, acetylamino, amino, nitro, hydroxysulfonyl, aminosulfonyl, methylsulfonyl, phenylsulfonyl, hydroxycarbonyl, methoxycarbonyl, acetyl, benzoyl, aminocarbonyl, cyano or sulfomethylene, and $R^2$, $R^3$, $R^6$, $R^7$ and m have the stated meanings.

Examples of the pyrazolone coupling components are 3-methyl-, 3-carboxy- and 3-alkoxycarbonyl-5-pyrazolones which can carry, in the 1-position, hydrogen, phenyl which is unsubstituted or substituted by methyl, ethyl, fluorine, chlorine, bromine, trifluoromethyl, methoxy, ethoxy, cyano, phenoxy, phenylsulfonyl, methylsulfonyl, hydroxysulfonyl, benzoyl, acetyl, acetylamino, nitro, hydroxyl, carboxyl, carbamyl or sulfamyl, or α- or β-naphthyl which is substituted by hydroxysulfonyl, for example 1-phenyl-, 1-(2'-chlorophenyl)-, 1-(2'-methoxyphenyl)-, 1-(2'-methylphenyl)-, 1-(2',5'-dichlorophenyl)-, 1-(2',6'-dichlorophenyl)-, 1-(2'-methyl-6'-chlorophenyl)-, 1-(2'-methoxy-5'-methylphenyl)-, 1-(2'-chloro-5'-sulfophenyl)-, phenyl)-, 1-(2'-methoxy-5'-sulfophenyl)-, 1-(2'-methyl-4'-sulfophenyl)-, 1-(2',5'-dichloro-4'-sulfophenyl)-, 1-(2',5'-disulfophenyl)-, 1-(2'-carboxyphenyl)-, 1-(3'-sulfophenyl)-, 1-(4'-sulfophenyl)-, 1-(3'-sulfamylphenyl-3-carboxy-5-pyrazolone, 1-(3'- or 4'-sulfophenyl)-, 1-(2'-chlorophenyl)-, 1-(2'-chloro-4'- or -5'-sulfophenyl)-, 1-(2'-methyl-4'-sulfophenyl)-, 1-(2',5'-dichlorophenyl)-, 1-(4',8'-disulfo-8-naphthyl)- or 1-(6'-sulfo-α-naphthyl)-3-methyl-5-pyrazolone, ethyl 1-phenyl-5-pyrazolone-3-carboxylate, ethyl 5-pyrazolone-3-carboxylate or 5-pyrazolone-3-carboxylic acid.

Examples of other coupling components from the pyrazole series are 1-methyl-, 1-ethyl-, 1-propyl-, 1-butyl-, 1-cyclohexyl-, 1-benzyl- or 1-phenyl-5-aminopyrazole, 1-(4'-chlorophenyl)- or 1-(4'-methylphenyl)-5-aminopyrazole or 1-phenyl-3-methyl-5-aminopyrazole.

Acetoacetanilides are, in particular, acetoacetanilide and its derivatives which are monosubstituted or polysubstituted in the phenyl nucleus by chlorine, methyl, ethyl, methoxy, ethoxy, acetylamino, hydroxysulfonyl, hydroxycarbonyl, aminocarbonyl or aminosulfonyl.

Examples of coupling components derived from pyridine are the derivatives described in German Laid-Open Application No. DOS 2,260,827.

Examples of suitable pyrimidine coupling components are the compounds listed in German Laid-Open Application Nos. DOS 2,202,820, DOS 2,308,663 and DOS 3,119,349. Other examples are barbituric acid and its N-substitution products. Examples of N-substituents in this context are, in particular, $C_1$–$C_4$alkyl and unsubstituted or substituted phenyl.

Examples of indole coupling components are 2-methylindole, 2-phenylindole, 2-phenylindole-5-sulfonic acid, 1-methyl-2-phenylindole and 1-(2'-hydroxyethyl)-, 1-(2'-carboxyethyl)-, 1-(2'-carbamylethyl)-2-methylindole and -2-phenylindole.

Examples of pyridone coupling components are: 1-ethyl-2-hydroxy-4-methyl-5-carboxamidopyrid-6-one, 1-(2'-hydroxyethyl)-2-hydroxy-4-methyl-5-carboxamidopyrid-6-one, 1-phenyl-2-hydroxy-4-methyl-5-carboxamidopyrid-6-one, 1-ethyl-2-hydroxy-4-methyl-5-cyanopyrid-6-one, 1-ethyl-2-hydroxy-4-sulfomethyl-5-carboxamidopyrid-6-one, 1-ethyl-2-hydroxy-4-methyl-5-sulfomethylpyrid-6-one, 1-methyl-2-hydroxy-4-methyl-5-cyanopyrid-6-one, 1-methylhydroxy-5-acetylpyrid-6-one, 1,4-dimethyl-2-hydroxy-5-cyanopyrid-6-one, 1,4-dimethylhydroxy-5-carboxamidopyrid-6-one, 2,6-dihydroxy-4-ethyl-5-cyanopyridine, 2,6-dihydroxy-4-ethyl-5-carboxamidopyridine, 1-ethyl-2-hydroxy-4-methyl-5-sulfomethylpyrid-6-one, 1-methyl-2-hydroxy-4-methyl-5-methylsulfonylpyrid-6-one and 1-carboxymethyl-2-hydroxy-4-ethyl-5-phenylsulfonylpyrid-6-one.

Examples of coupling components K of the aniline and naphthalene series which contain fiber-reactive groups are compounds of the formulae VIa–e:

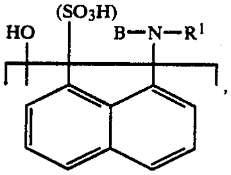,

VIa

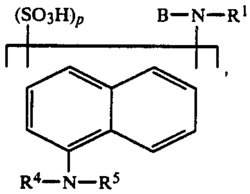,

VIb

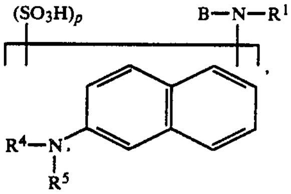,

VIc

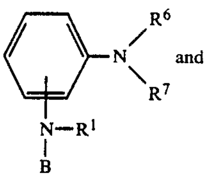 and

VId

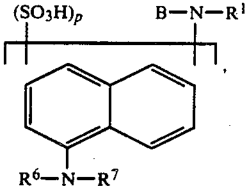,

VIe where $R^1$, $R^4$, $R^5$, $R^6$, $R^7$, B and p have the stated meanings.

Other particularly noteworthy compounds are the arylazo coupling products of 1-amino-8-hydroxynaphthalene-3,6- and -4,6-disulfonic acid of the formula

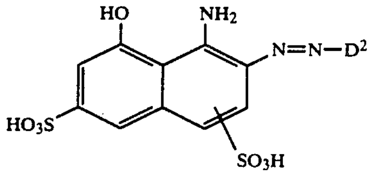

where $D^2$ is a diazo component radical containing reactive groups, for example a radical of the formula

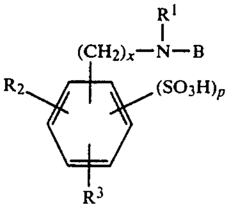 or 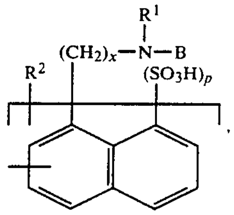.

where $R^1$, $R^2$, $R^3$, x, p and B have the stated meanings, these couplings products being obtained by coupling under acidic conditions.

Specific examples of aromatic amines from which the diazo component radicals $D^2$ which carry fiber-reactive radicals B are derived are: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,6-diaminonaphthalene-4-sulfonic acid, 2,6-diamino-4,8-disulfonaphthalene, 1,3-diaminobenzene-5-sulfonic acid, 1,3-diamino-5-methylbenzene, 5-(ω-aminomethyl)-2-aminonaphthalene-1-sulfonic acid, 5-(ω-N-methylaminomethyl)-2-aminonaphthalene-1-sulfonic acid, 4,4'-diaminostilbene-3,3'-dicarboxylic acid, 4-(∫-N-methyl)-aniline-2-sulfonic acid and 3-(ω-N-methylaminomethyl)-aniline-6-sulfonic acid, and in all these amino compounds one primary or secondary amino group is substituted by the fiber-reactive acyl radical B.

Specific examples of diazo component radicals $D^2$ which carry fiber-reactive groups are:

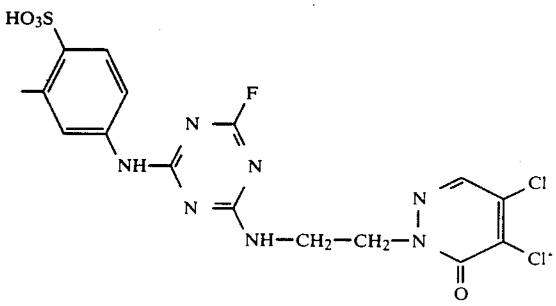

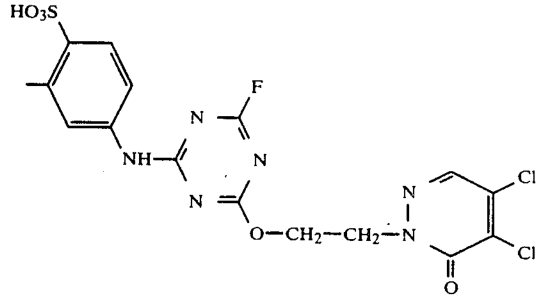

-continued
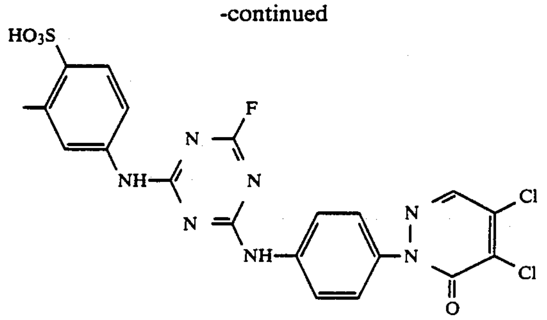
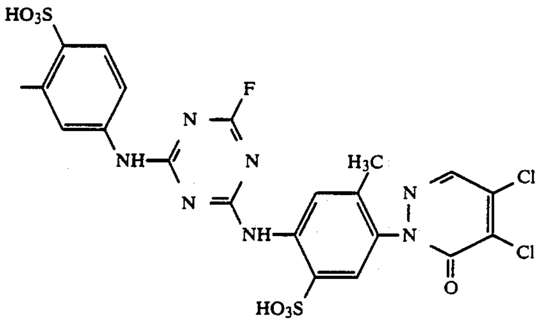
-continued
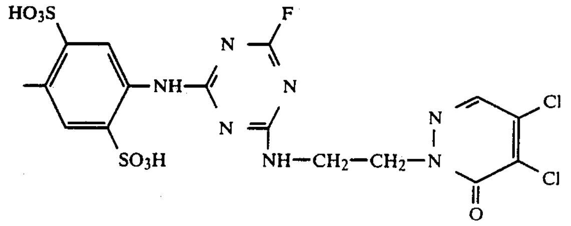
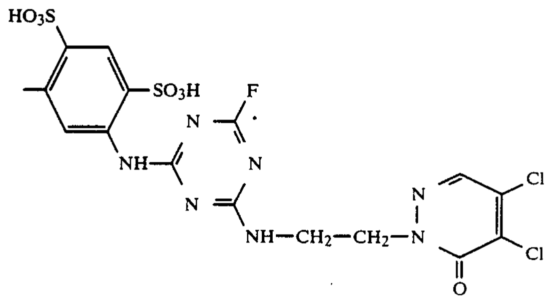
Instead of the fiber-reactive radical B, the diazo component $D^2$ may also carry other fiber-reactive radicals. $D^2$ is, for example,
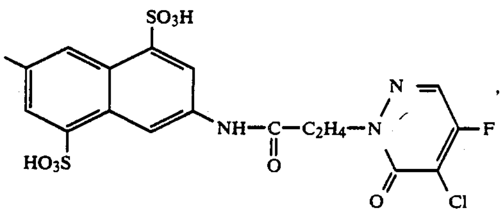
,
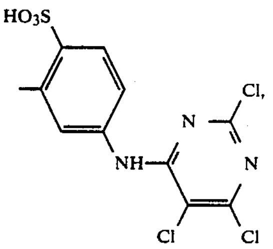
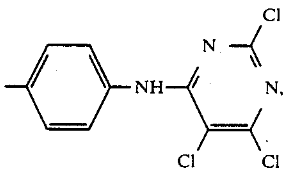
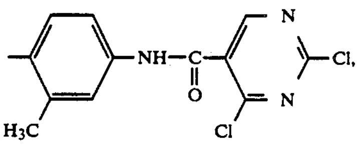
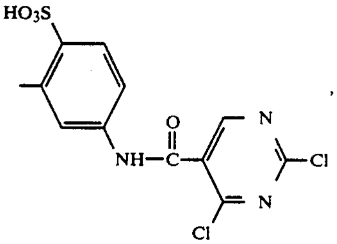
,
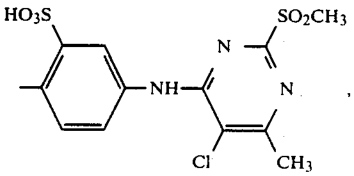
,
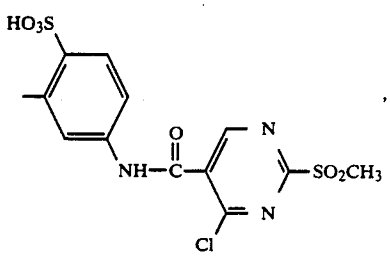
,
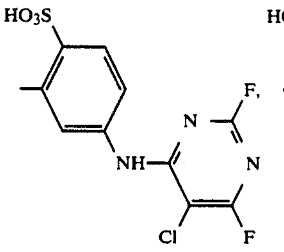
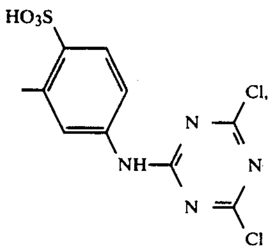

-continued
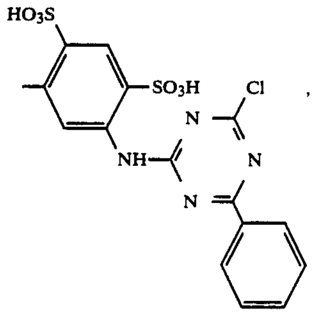
,
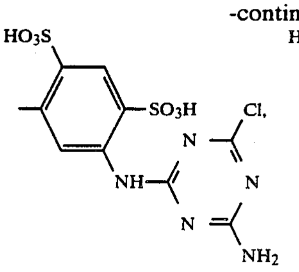
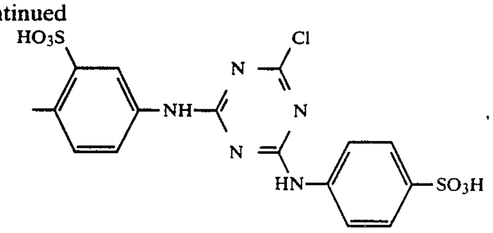
,
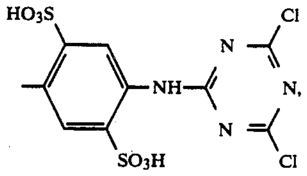
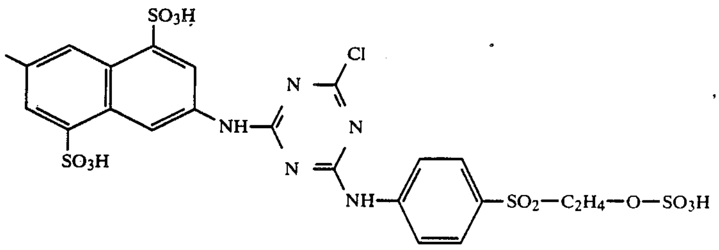
,
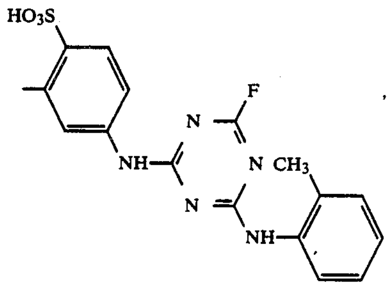
,
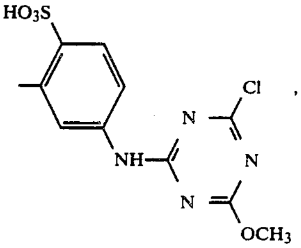
,
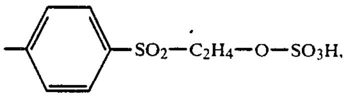
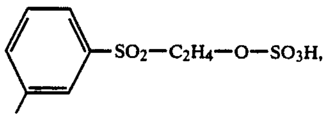
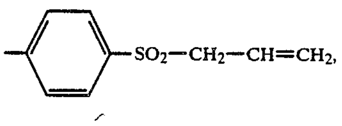
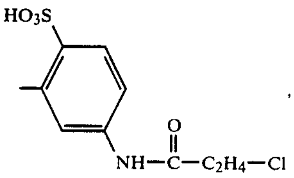
,
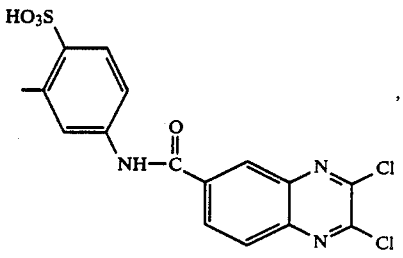
,
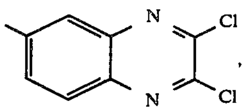
,
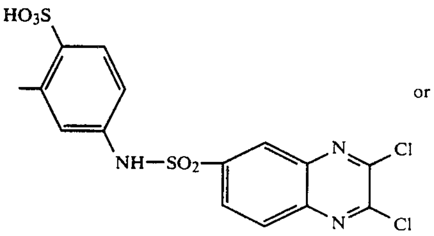
or
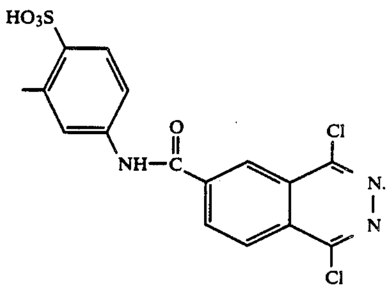
Coupling components of the pyrazolone, aminopyrazole, 2,6-diaminopyridine, pyridone, hydroxypyrimidine, aminopyrimidine, indole, barbituric acid or acetoacetarylide series which contain fiber-reactive groups are, for example, of the formulae VIIa–f:

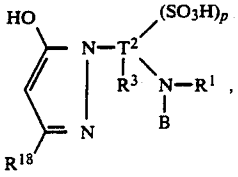,

VIIa

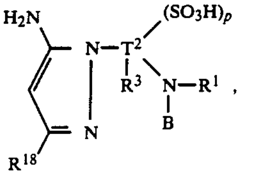,

VIIb

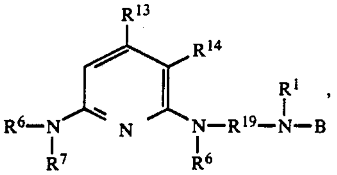,

VIIc

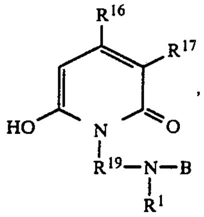,

VIId

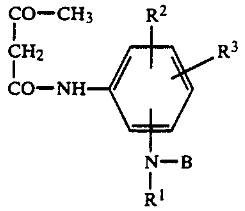

or

VIIe

-continued

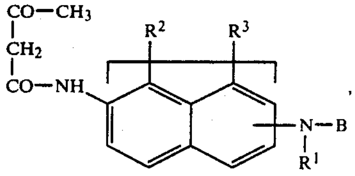,

VIIf where $T^2$ is a benzene or naphthalene nucleus, $R^{18}$ is methyl or hydroxycarbonyl, $R^{19}$ is $C_1$-$C_4$-alkyl, benzyl, phenylethyl or phenyl, where the phenyl nuclei may be further substituted by fluorine, chlorine, bromine, methyl, methoxy, cyano, hydroxysulfonyl, hydroxycarbonyl, acetyl, nitro, aminocarbonyl or aminosulfonyl, and $R^1$, $R^2$, $R^3$, $R^6$, $R^7$, $R^{13}$, $R^{14}$, $R^{16}$, $R^{17}$, p and B have the stated meanings.

Pyrazolone coupling components carrying fiber-reactive radicals B are derived from, for example, the following pyrazolones: 1-(3'- or 4'-aminophenyl)-, 1-(2'-sulfo-5'-aminophenyl)-, 1-(2'-methoxy-5'-aminophenyl)-3-carboxy-5-pyrazolone, 1-(3'- or 4'-aminophenyl)-, 1-(3'- or 4'-nitrophenyl)-3-methyl-5-pyrazolone, 1-(3'- or 4'-nitrophenyl)-, 1-(6'-nitro-4',8'-disulfonaphth-2'-yl)- or 1-(6'-amino-4',8'-disulfonaphth-2'-yl)-3-carboxy-5-pyrazolone.

Specific examples of pyrazolones carrying fiber-reactive radicals B are:

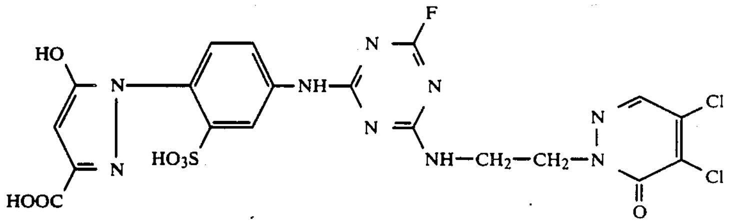

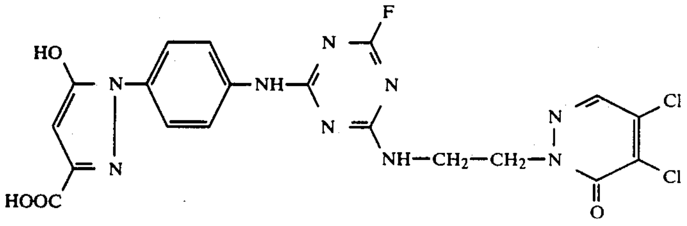

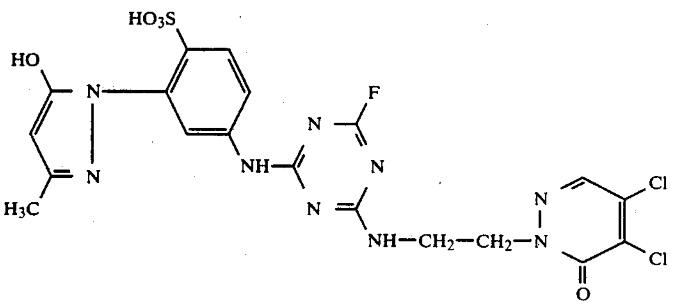

-continued
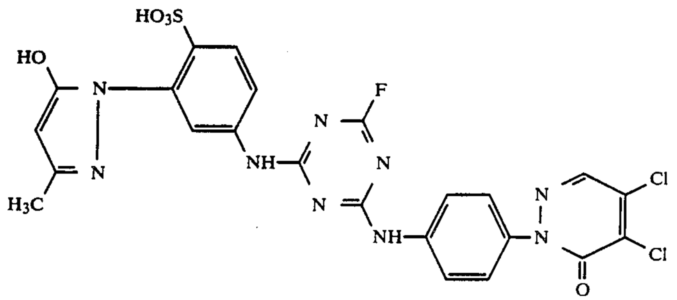
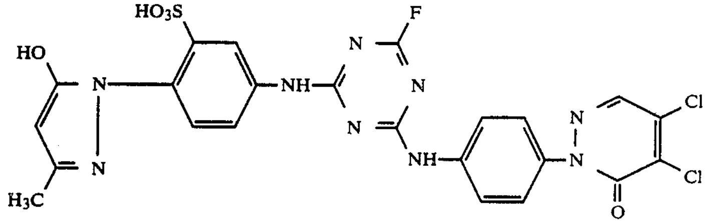
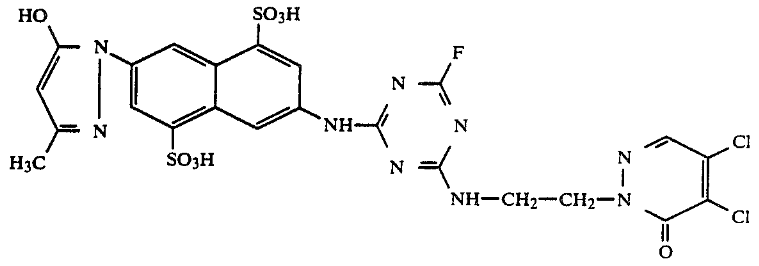
Specific examples of pyridones carrying fiber-reactive radicals B are:
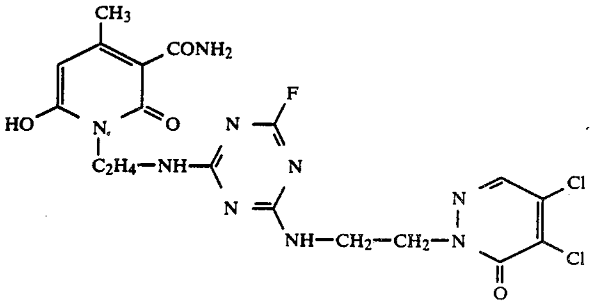
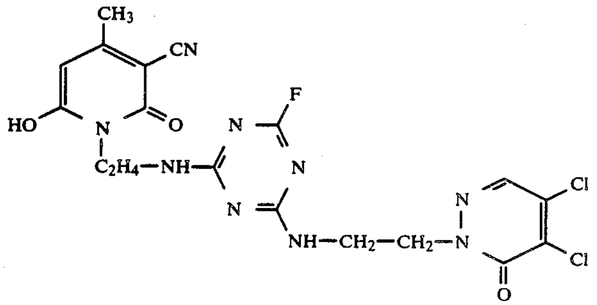

-continued

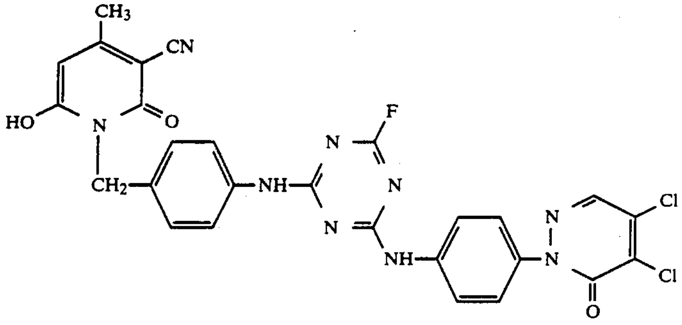

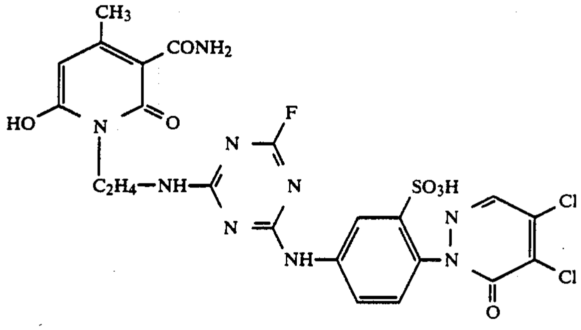

Of particular industrial importance are azo compounds which are of the general formula

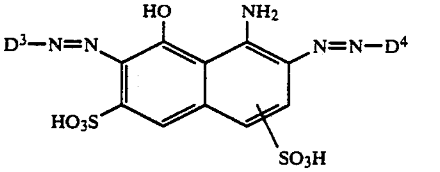

where $D^3$ and $D^4$ are identical or different radicals of diazo components, one or both of these radicals carrying a radical of the formula

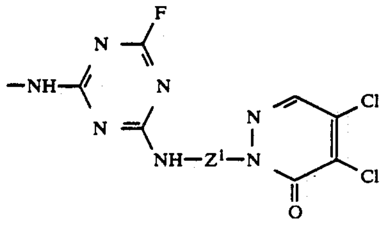

where $Z^1$ is alkylene or unsubstituted or substituted arylene.

Other useful compounds are those of the formula

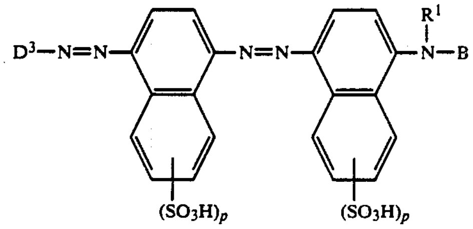

where $R^1$, $D^3$, p and B have the stated meanings.

Dyes of the dioxazine series are of the general formula

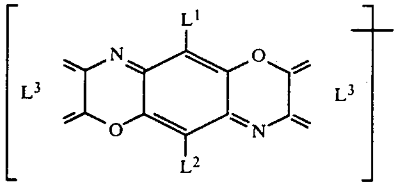

where $L^1$ and $L^2$ independently of one another are each hydrogen, chlorine, bromine, cyano, unsubstituted or substituted alkyl, aryl, hetaryl, alkoxy, aryloxy or acylamino, and the groups $L^3$ independently of one another are each a radical of the formula

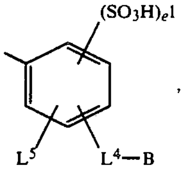
,
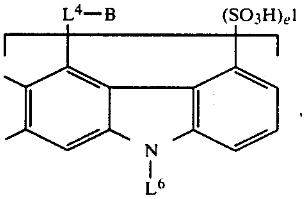
,
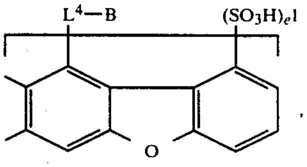
,
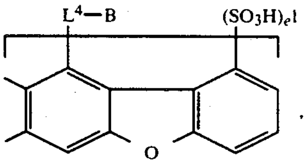
.

-continued

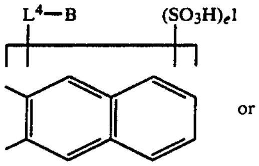

or

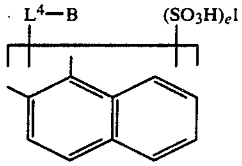

where $e^1$ is 0, 1 or 2, $L^4$ is a bridge member, $L^5$ is hydrogen, alkoxy or acylamino and $L^6$ is hydrogen or $C_1$-$C_4$-alkyl.

Specific examples of radicals $L^1$ and $L^2$ in addition to those stated above are: $CH_3$, $C_2H_5$, $C_3H_7$, $C_4H_9$, $C_6H_5$, $C_6H_4Cl$, $C_6H_4CH_3$, $C_6H_4OCH_3$, $C_6H_4NO_2$, $C_6H_3ClCH_3$, 2-thienyl, $OCH_3$, $OC_2H_5$, $OC_3H_7$, $OC_4H_9$, $OC_6H_5$, $OC_6H_4Cl$, $OC_6H_4CH_3$, $NHCOCH_3$, $NHCOC_2H_5$ and $NHCOC_3H_7$.

$L^1$ and $L^2$ are each preferably hydrogen and in particular Cl.

Examples of specific radicals $L^5$ are hydrogen, methoxy, ethoxy, propoxy, butoxy, acetylamino, propionylamino and butyrylamino.

$L^5$ is preferably hydrogen, methoxy or acetylamino.

Examples of bridge members $L^4$ are: —NH—(alkylene)—NH—, $-SO_2$—NH—(alkylene)—NH—, —NH—(arylene)—NH—, $-SO_2$—NH—(arylene)—NH—, —NH—(alkylene)—O—(alkylene)—NH—, $-SO_2$—(alkylene)—O—(alkylene)—NH—, —O—(alkylene)—O—(arylene)—NH—, —NH—(alkylene)—NH—(arylene)—NH—, —NH—(aralkylene)—NH—, $-SO_2$—NH—(aralkylene)—NH—, $-CH_2$—NH— or $-CH_2$—NHCO—(alkylene)—NH—, and the hydrogen in the NHs groups may be replaced by unsubstituted or substituted alkyl groups which may be bonded to one another to form a heterocyclic ring.

Specific examples of radicals $L^4$ are:

$-NH-CH_2-CH_2-NH-$, $-SO_2-NH-CH_2-CH_2-NH-$, $-NH-CH_2-CH_2-CH_2-NH-$, $-SO_2-NH-CH_2-CH_2-CH_2-NH-$,

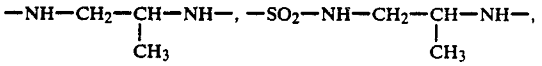

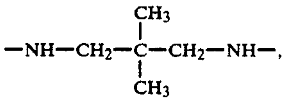

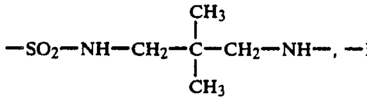 $-NH-(CH_2)_4-NH-$, $-SO_2-NH-(CH_2)_4-NH-$, $-NH-(CH_2)_6-NH-$, $-SO_2NH-(CH_2)_6-NH-$, $-NH-CH_2CH_2-O-CH_2-CH_2-NH-$, $-SO_2-NH-CH_2CH_2-O-CH_2-CH_2-NH-$,

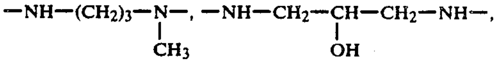

-continued

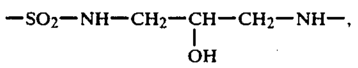

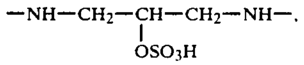

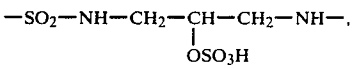

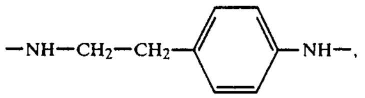

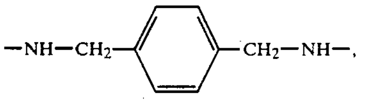

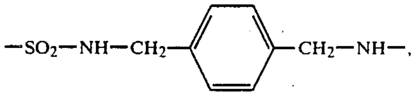

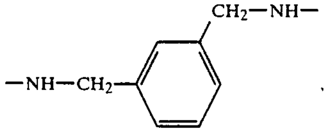

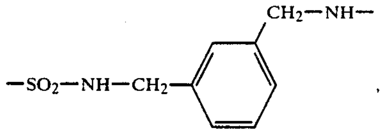

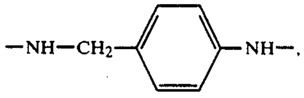

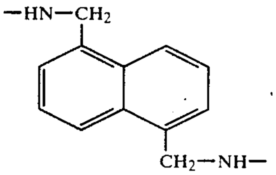

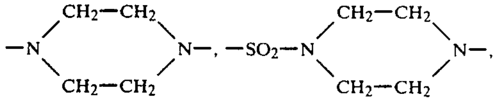

$-CH_2-NH-$, 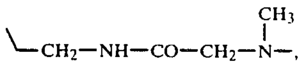

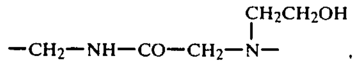

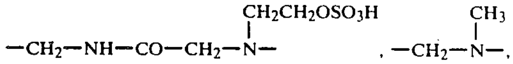

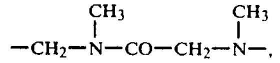

-continued

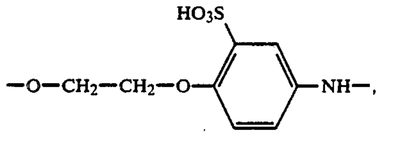

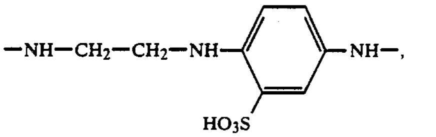

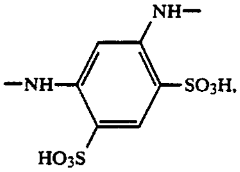

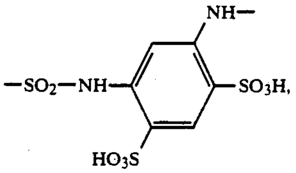

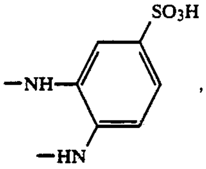

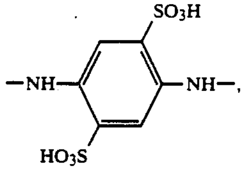

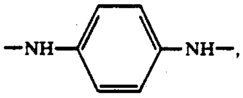

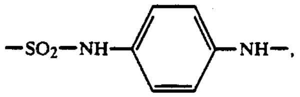

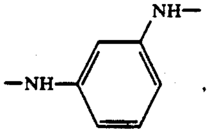

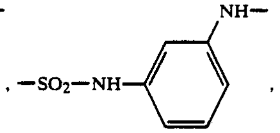

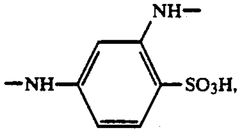

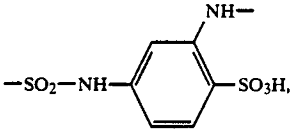

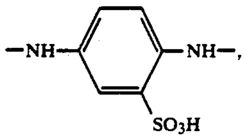

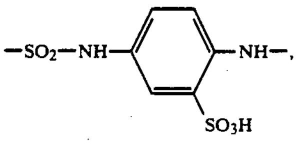

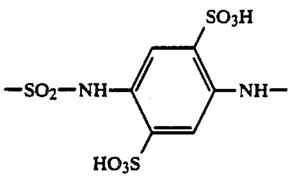

and

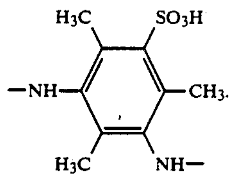

Examples of preferred radicals $L^4$ are:

$-NH-CH_2-CH_2-NH-$, $-SO_2-NH-CH_2-CH_2-NH-$, $-NH-CH_2-CH_2-CH_2-NH-$, $-SO_2-NH-CH_2-CH_2-CH_2-NH-$,

-continued

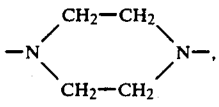

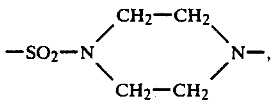

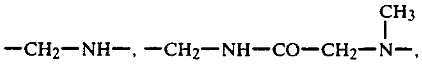

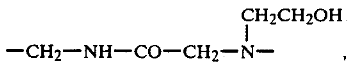

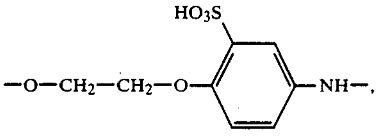

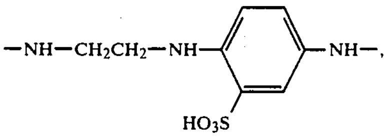

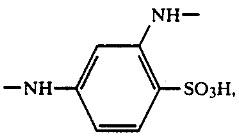

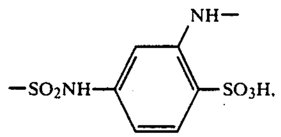

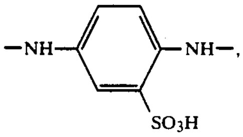

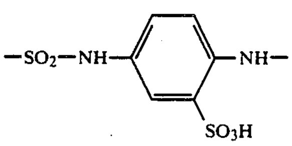

and

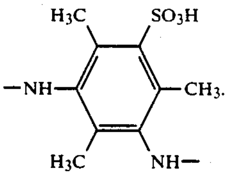

Anthraquinone dyes are, for example, of the formula

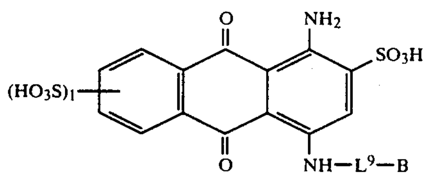

where L is 0 or 1 and $L^9$ is a bridge member.

Examples of bridge members are iminophyenylene, -alkylene, -cycloalkylene or -hetarylene which are unsubstituted or monosubstituted or polysubstituted by $CH_3$, $SO_3H$, $SO_2NH_2$, Cl, Br or $OCH_3$, or are polynuclear radicals containing a further reactive group.

Specific examples of bridge members $L^9$ are:

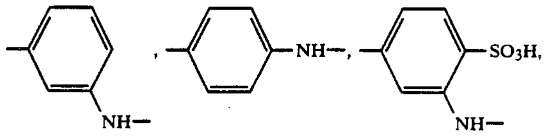
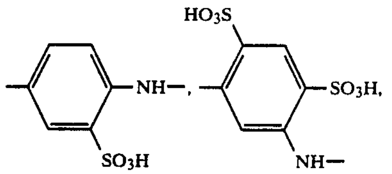
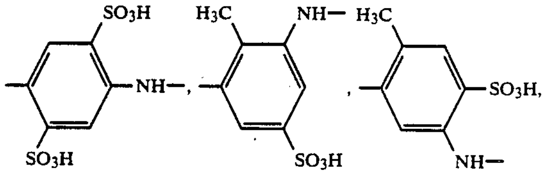
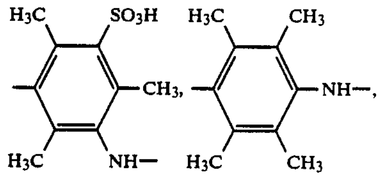
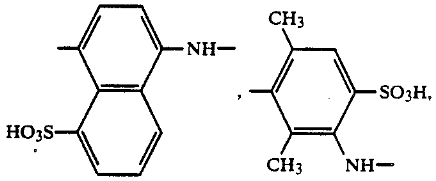
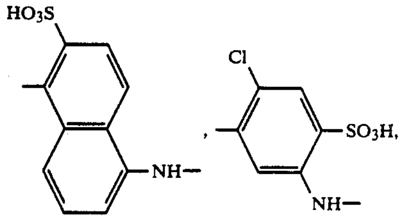
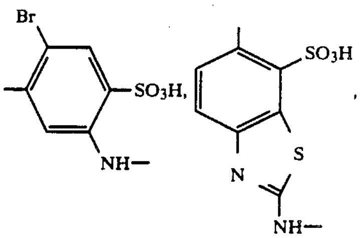
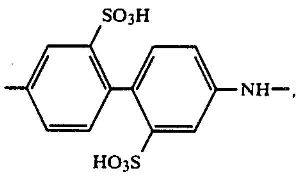
-continued
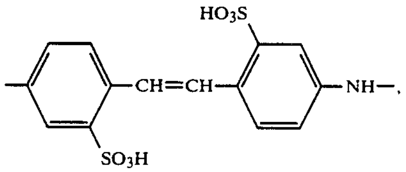
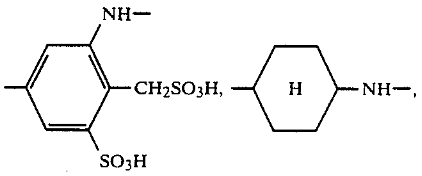
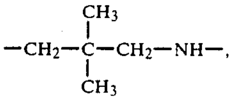
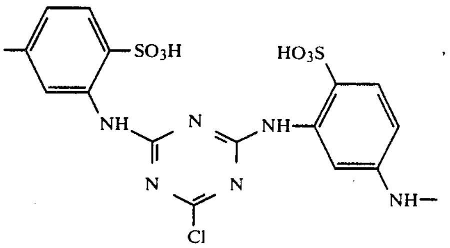
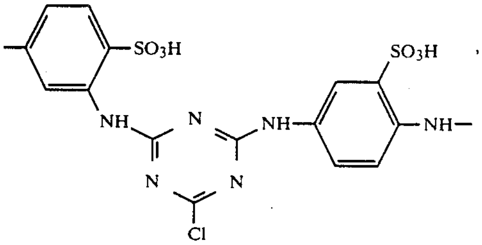
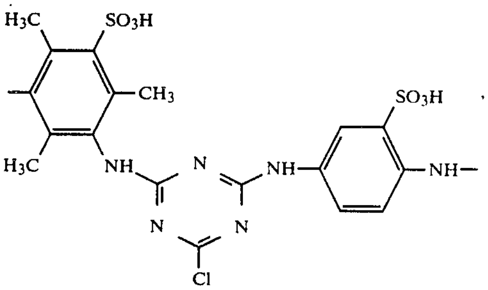
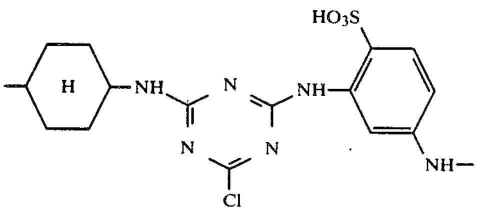

-continued
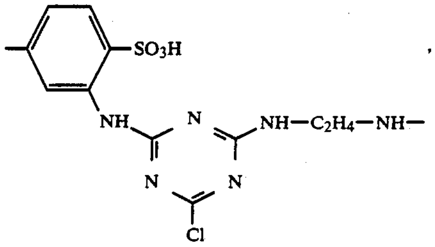
,
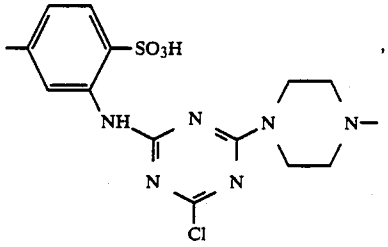
,
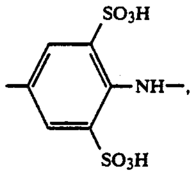
,
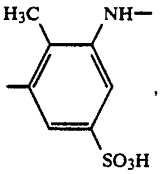
,
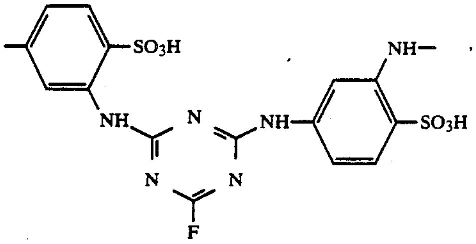
,
Examples of preferred bridge members $L^9$ in addition to a direct bond are:
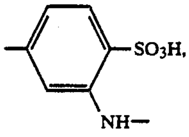
,
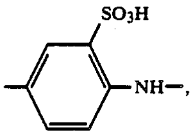
,
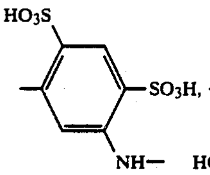
,
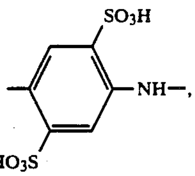
,
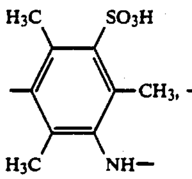
,
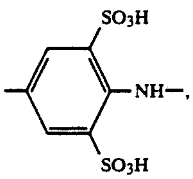
,
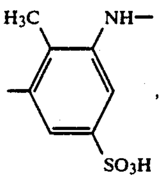
,
-continued
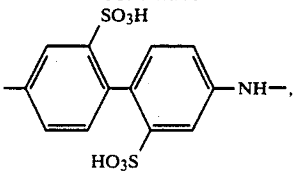
,
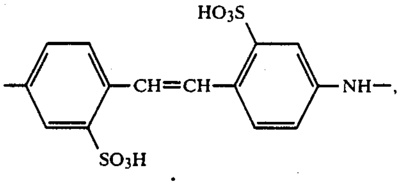
,
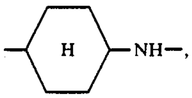
,
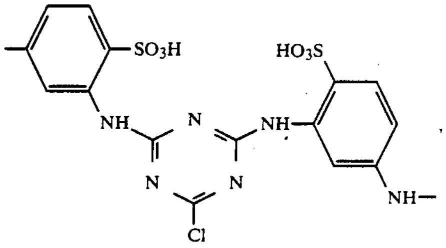
,
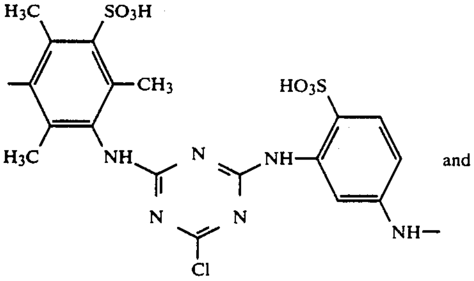
and
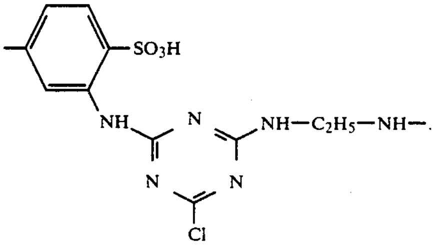
.
Phthalocyanine dyes are of the formula
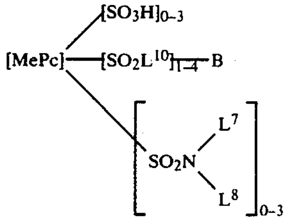
where Me is nickel or copper, $L^7$ and $L^8$ independently of one another are each hydrogen or unsubstituted or substituted alkyl, aralkyl or aryl and $L^{10}$ is a bridge member or a direct bond. Specific examples of radicals $L^7$ and $L^8$ in addition to hydrogen are methyl, ethyl, propyl, butyl, hydroxyethyl and hydroxypropyl.

Examples of bridge members $L^{10}$ are: —HN—(alkylene)—NH—, —HN—(cycloalkylene)—NH—, —NH—(aralkylene)—NH—, —NH— (arylene)—NH—, —NH—(arylene)—N=N—(hetarylene)—NH—, —NH—(hetarylene)—N=N—(arylene)—NH— or —NH—(arylene)—N=N—(arylene)—NH—, and the hydrogen atoms of the NH group may be replaced by unsubstituted or substituted alkyl groups which may furthermore be bonded to one another and may thus form a heterocyclic ring.

Specific examples of bridge members $L^{10}$ are:

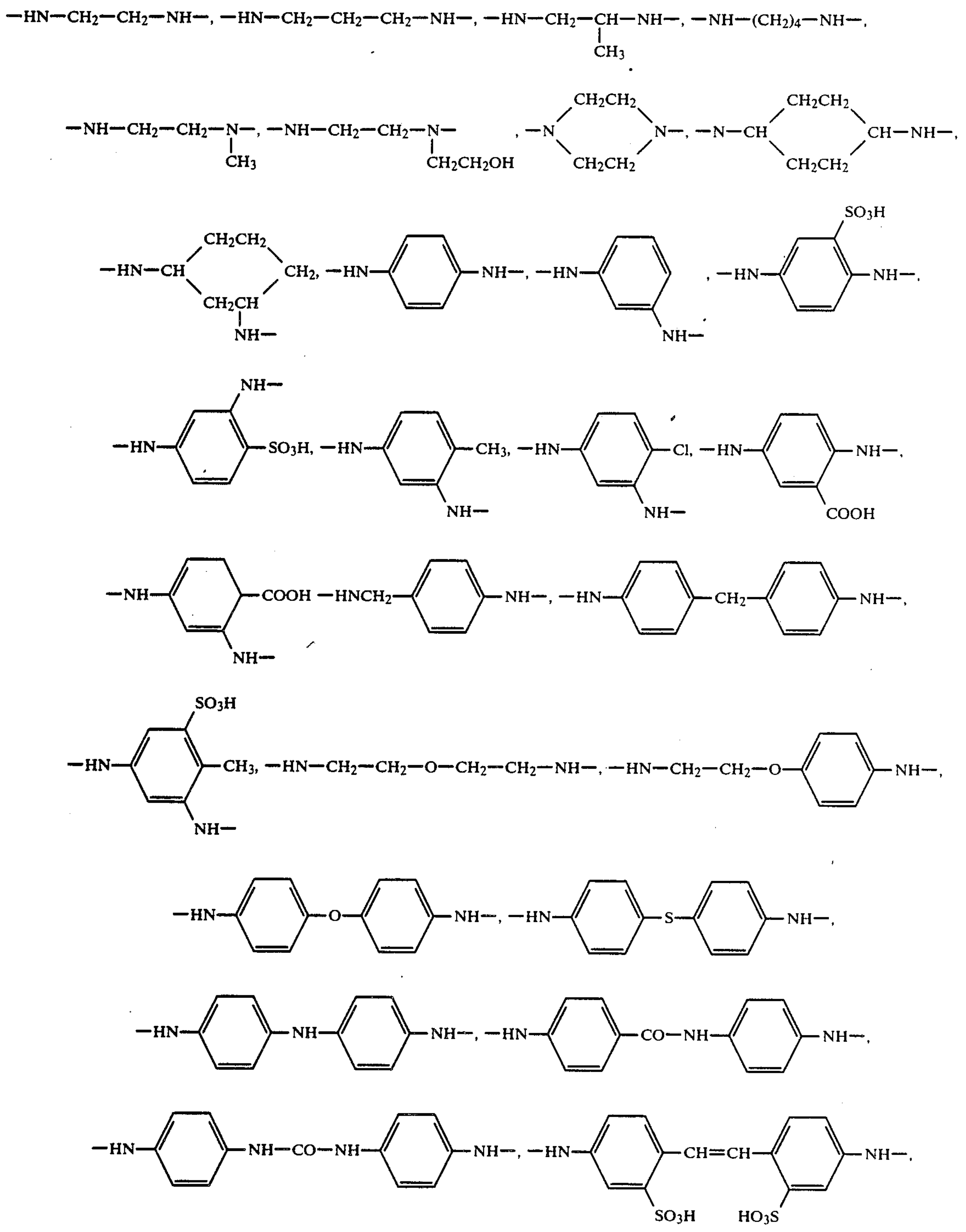

-continued
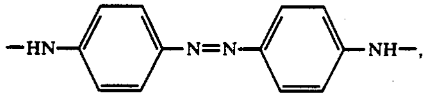, 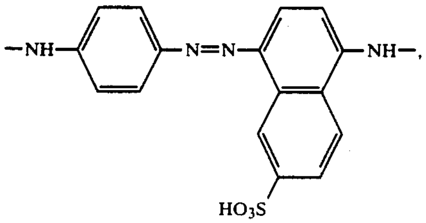,
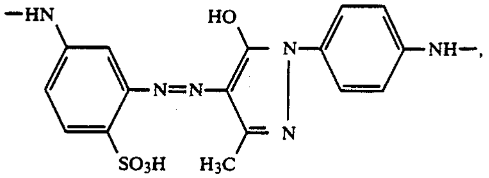, 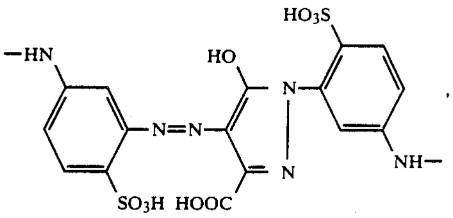,
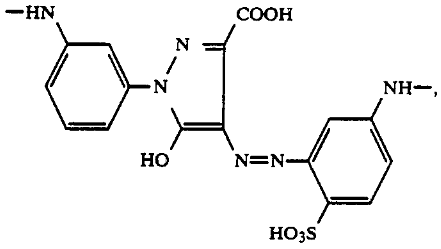, 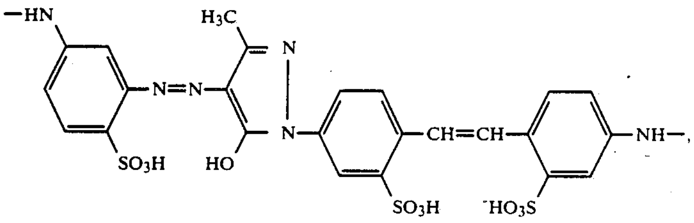,
and 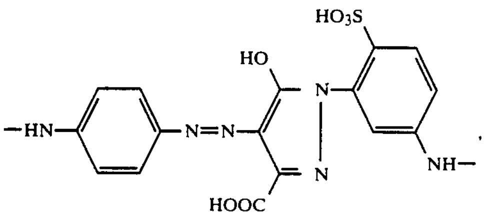,
Examples of preferred bridge members $L^{10}$ are:
$-NH-CH_2-CH_2-NH-$, 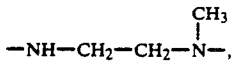, 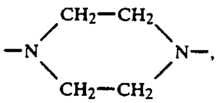, 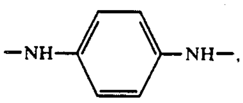, 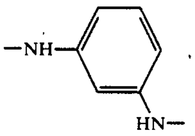,
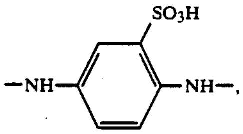, 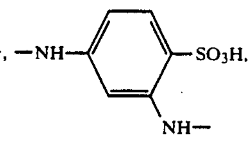, 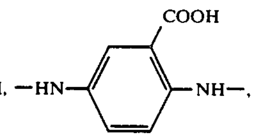,
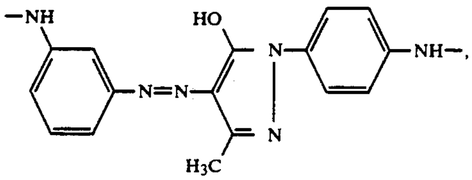, 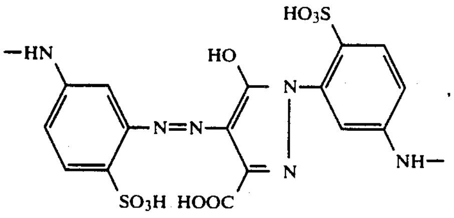, -continued

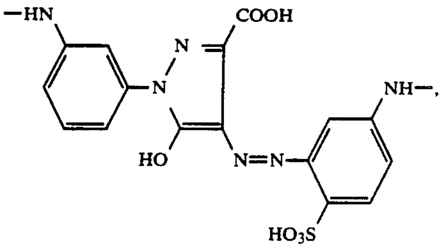

,

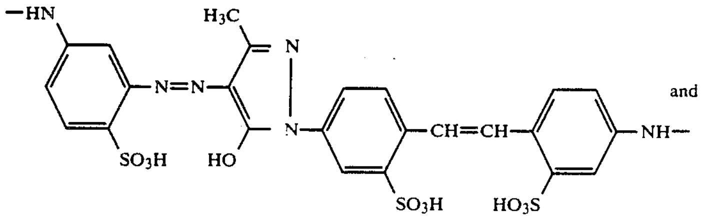

and

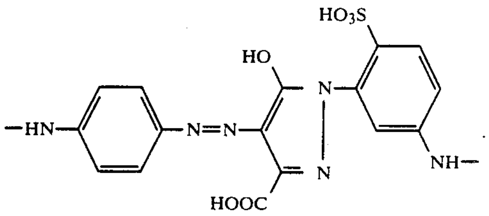

Instead of the azo dye radicals D—N=N—K, the dyes of the formula I may furthermore contain appropriate metal complex dye radicals, particularly suitable complex-forming metals being copper, cobalt, chromium, nickel and iron, preferably copper, cobalt and chromium.

As a rule, the metals are bonded to the dye molecule via —O— or —COO—.

The Co and Cr complexes are 1:2 complexes, whereas exclusively 1:1 complexes are formed when Cu is used. Met is preferably copper, cobalt or chromium. The dye types stated below may additionally be substituted by substituents which are usual in reactive dyes, eg. Cl, Br, $OCH_3$, $NHCONH_2$, $NO_2$, $SO_3H$, $SO_2NH_2$, COOH or $CONH_2$. The dyes are synthesized by conventional methods.

Examples of preferred types of complexes are:

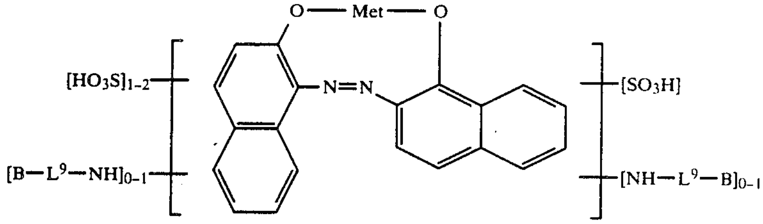

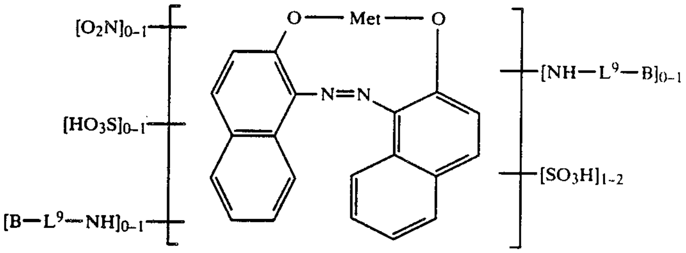

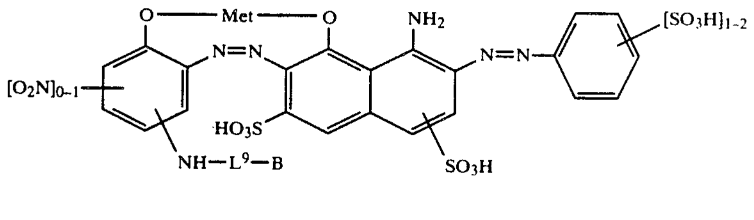

-continued
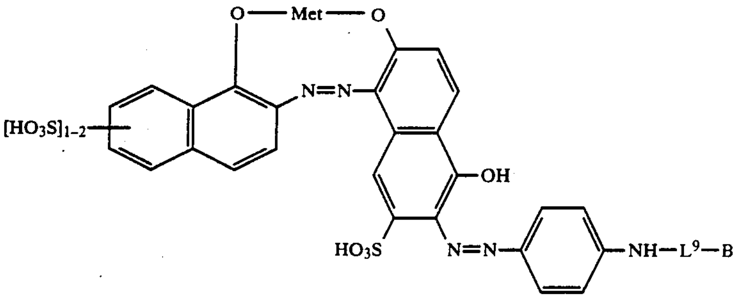
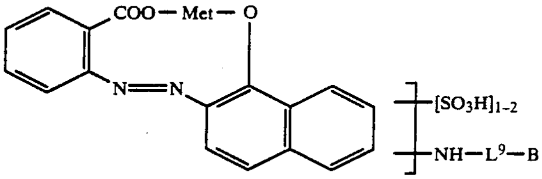
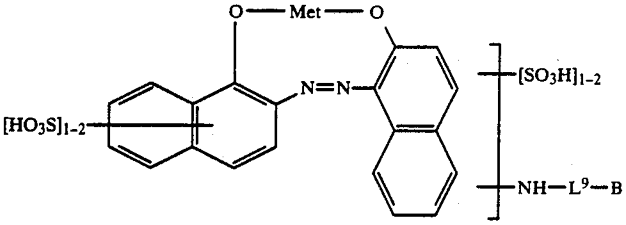
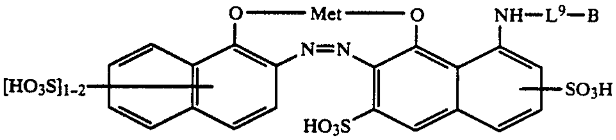
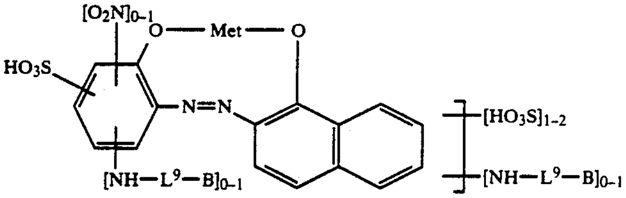
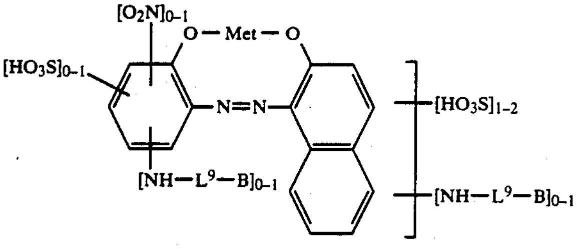
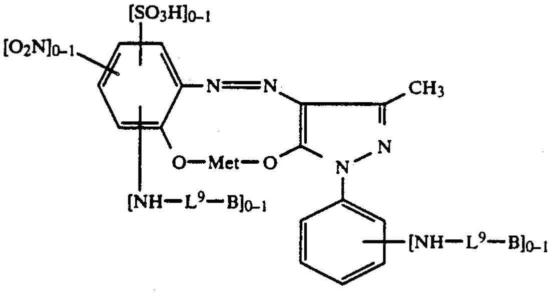
and -continued

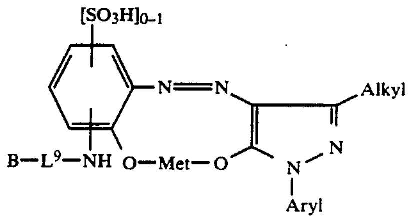

In these formulae, aryl is phenyl or naphthyl radical which is substituted by any substituents, in particular by $SO_3H$, Cl, $NH_2$ or $OCH_3$, and $L^9$ has the stated meanings.

Asymmetric Co or Cr metal complexes of the 1:2 type may also be prepared, eg.

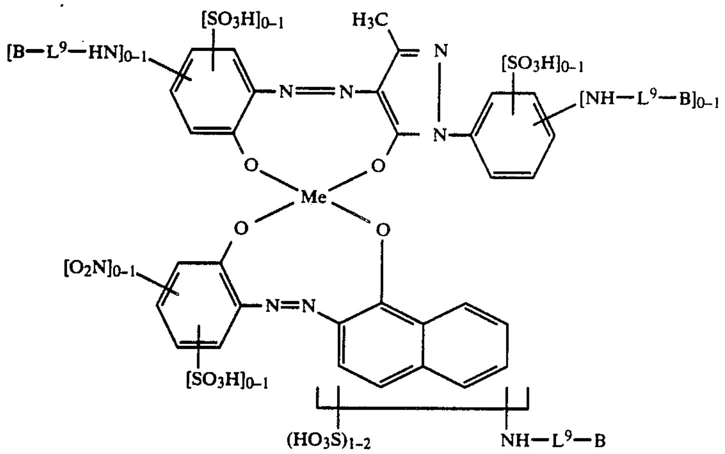

Particularly brilliant blue dyes are obtained in the series consisting of the copper formazan complex dyes. Formazan dyes are of the general formulae

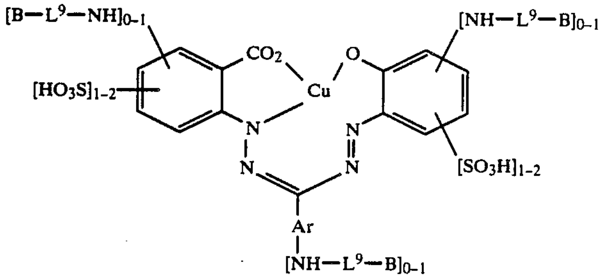

and

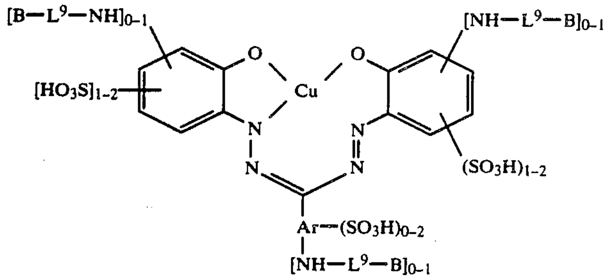

where Ar is a phenyl or naphthyl radical which is substituted by any substituents, in particular by $SO_3H$, Cl, $NH_2$ or $OCH_3$. The reactive dyes of the formula I are prepared by condensing an organic dye of the formula II

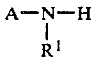 II or a dye precursor and the fiber-reactive group III

III

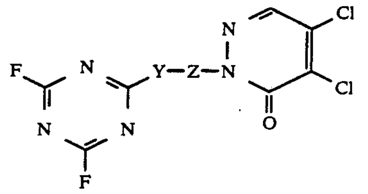

where A, $R^1$, Y and Z in the above formulae have the meanings stated under formula I, and, where dye precursors are used, the resulting intermediates are converted to the desired dyes.

Where Y is not a direct bond, the dyes may also be prepared by condensing an organic dye of the formula II or a dye precursor with 2,4,6-trifluoro-s-triazine and reacting the product with a 4,5-dichloropyridaz-6-one of the formula IV

IV

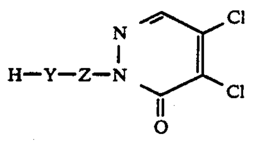

in a further step.

Where a dye precursor is condensed with 2,4,6-trifluoro-s-triazine, the further reaction with the pyridazone IV can be carried out at any suitable stage in the synthesis of the end dye.

Fiber-reactive compounds of the formula III can be obtained, for example, by fluorinating a compound of the formula V

V

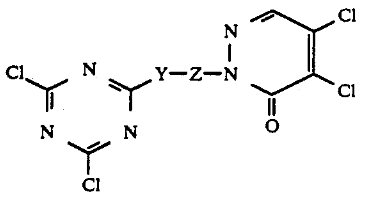

selectively in the triazine moiety with a conventional fluorinating agent, eg. HF or a metal fluoride. Where Y is not a direct bond, preparation may also be carried out by condensing 2,4,6-trifluoro-s-triazine with a pyridazone of the formula IV, with elimination of HF.

The compounds of the formula I are useful as reactive dyes for hydroxyl-containing fibers, in particular cotton and wool.

Suitable dyeing methods are the known reactive dyeing methods, in particular the exhaust method at 40°-80° C. and the pad-batch method.

Application may be effected within a wide temperature range, and the dyes are distinguished by good color strength.

Of particular importance are compounds of the formula Ia

Ia

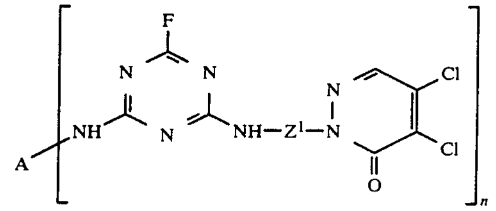

where A and n have the stated meanings, $Z^1$ is $-(CH_2)_{x'}-$ or

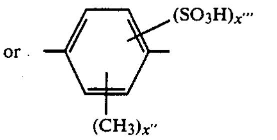

x' is 1, 2, 3, 4 or 5 and x'' and X''' independently of one another are each 0, 1 or 2.

The examples tabulated below describe novel dyes of the general formula I, the abbreviations $B^1$-$B^7$ having the following meanings:

$B^1$

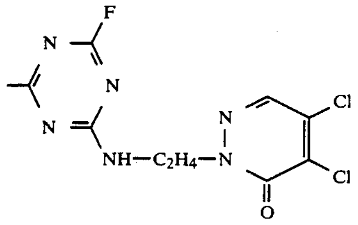

$B^2$

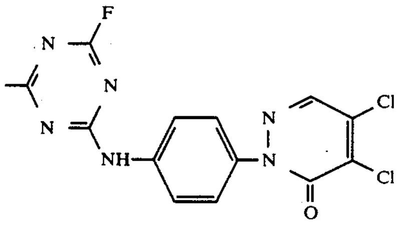

$B^3$

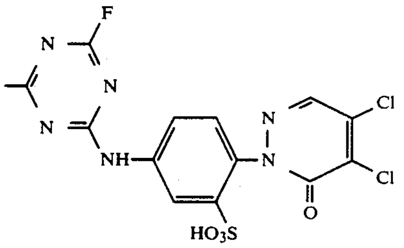

$B^4$

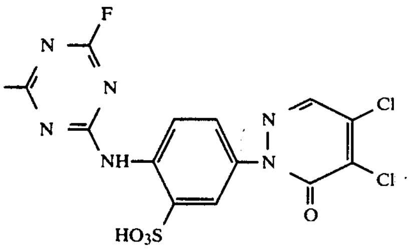

-continued

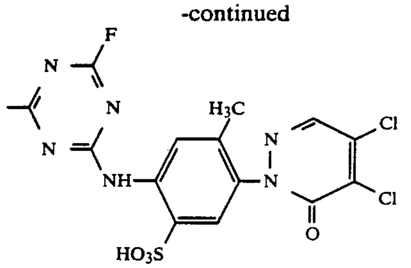

B5

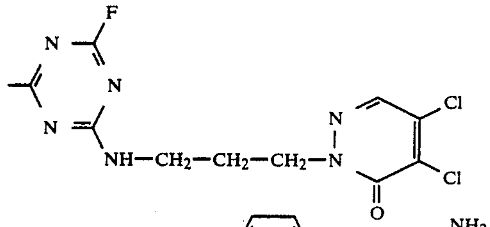

B6

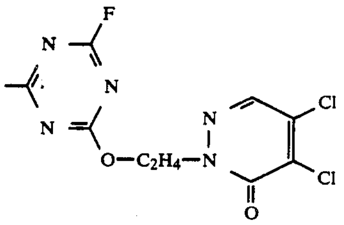

B7

EXAMPLE 1

(a) A neutral aqueous solution of 37.7 parts of 1,3-phenylenediamine-4-sulfonic acid is added dropwise to a suspension of 66 parts of 4,5-dichloro-1-(N'-difluorotriazine-2'-ylaminoethyl)-pyridaz-6-one in 200 parts by volume of acetone at 15°-20° C., and the pH is kept at 6-6.5 over 6 hours by successive addition of sodium bicarbonate. Thereafter, the reaction product of the formula

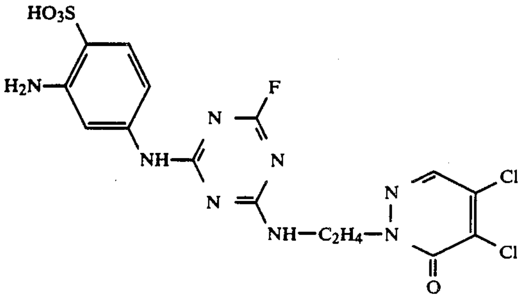

is filtered off and dried under reduced pressure in a freezer. 80 parts of a colorless powder are obtained.

(b) 17.3 parts of aniline-4-sulfonic acid are diazotized in the presence of hydrochloric acid, and a suspension of 31.3 parts of 1-amino-8-hydroxynaphthalene-3,6-disulfonic acid in 300 parts of water is added at 0°-5° C. Coupling is then completed at pH 1.0-1.3 with the addition of sodium acetate.

A diazo suspension prepared from 49.2 parts of the condensate obtained in Example 1a and containing hydrochloric acid is added to the resulting red monoazo dye at 0°-5° C., and the pH is brought to 5.5-6 by adding sodium carbonate. Coupling is complete after 3 hours at this pH, and the dye is precipitated from the reaction mixture with sodium chloride, filtered off and freeze?dried. The dye of the formula

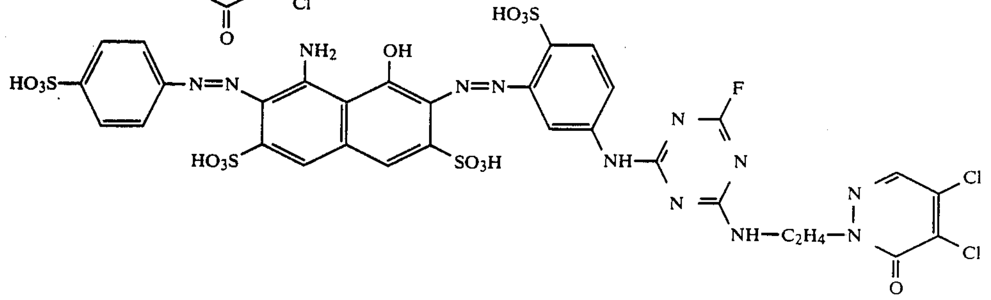

which dyes cotton in lightfast and wetfast navy hues is obtained.

EXAMPLE 2

(a) If the reactive anchor used in Example 1a is replaced by 68.8 parts of 4,5-dichloro-1-(N'-difluorotriazin-3'-ylaminopropyl)-pyridaz-6-one and a similar reaction procedure is employed, 83.5 parts of the compound of the formula

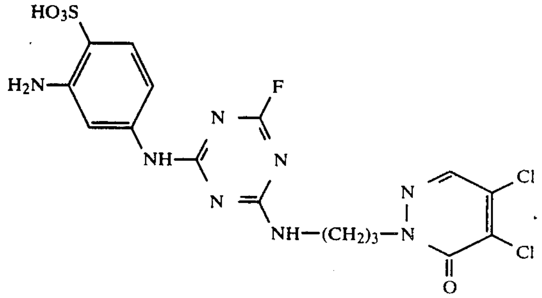

are obtained in the form of a colorless powder.

(b) The diazo suspension of 34 parts of the condensate obtained in 2a, containing hydrochloric acid, is added, at 0°-5° C., to the red monoazo dye obtained as described in Example 1b from 17.3 parts of aniline-4-sulfonic acid and 31.3 parts of 1-amino-8-hydroxynaphthalene-3,6-disulfonic acid, and the pH is kept at 6-6.5 until coupling is complete, by adding sodium carbonate. Thereafter, the dye is salted out with sodium chloride, filtered and dried under mild conditions under reduced pressure. The dye is of the formula

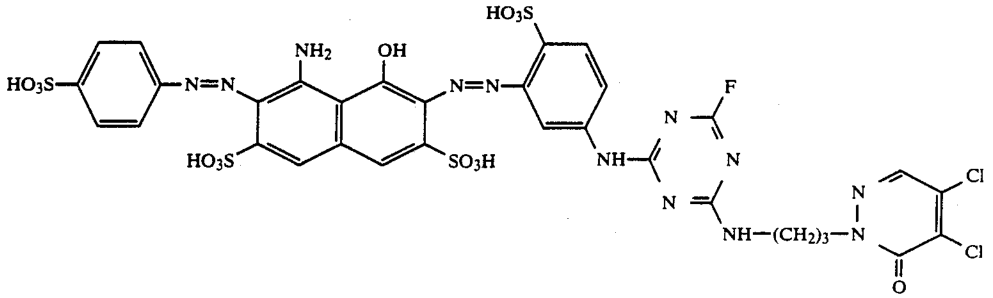

and gives fast navy dyeings on cotton.

EXAMPLE 3

If the reactive anchor used in Example 2 is replaced by 37.1 parts of 4,5-dichloro-1-(4'-aminophenyl)-pyridaz-6-one, the dye of the formula

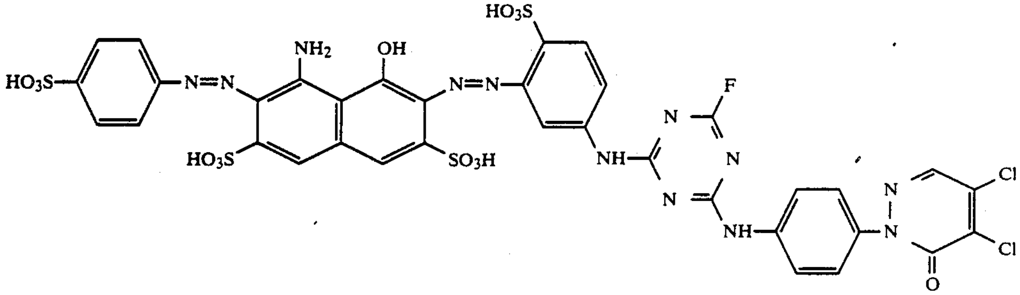

is obtained in a similar manner. This dye gives navy dyeings having similar properties on cotton.

EXAMPLE 4

A suspension of 31.6 parts of 1-amino-8-hydroxynaphthalene-3,6-disulfonic acid in 300 parts of water is added, at 0°-5° C., to 25.3 parts of aniline-2,5-disulfonic acid which has been diazotized in the presence of hydrochloric acid. Coupling is carried out overnight at pH 0.7-1 and then for a further 3 hours at pH 3, after the addition of sodium bicarbonate.

The solution of the resulting red monoazo dye is added, at 10° C., to a diazo suspension of 49.2 parts of the condensate obtained as described in Example 1a, the suspension containing hydrochloric acid. The pH is kept at 6.5 for 4 hours with sodium carbonate and the suspension is stirred overnight at room temperature without further addition of salt, until coupling is complete.

The dye of the formula

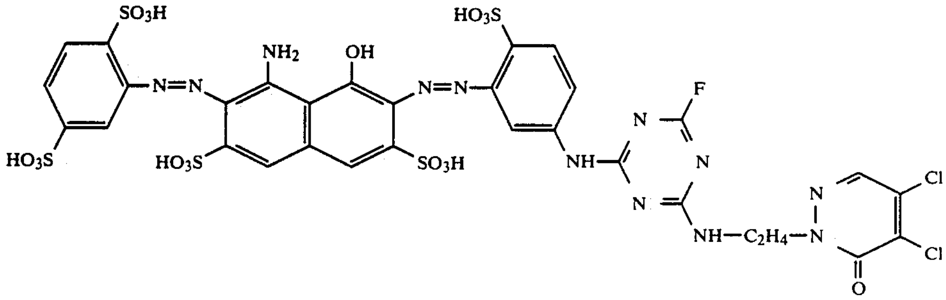

is precipitated from the neutral solution with 800 parts of sodium chloride, filtered off and dried under mild conditions. It dyes cotton in navy hues having generally good allround fastness.

EXAMPLE 5

If the aniline-4-sulfonic acid used in Example 1 is replaced by 28.8 parts of 2-chloroaniline-4,6-disulfonic acid, the dye of the formula

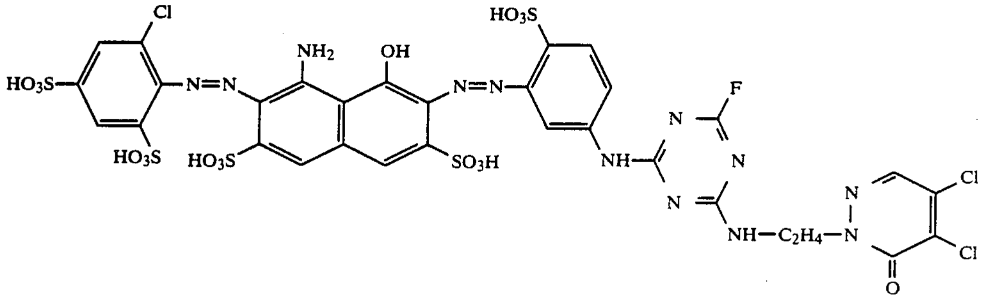

is obtained in a similar manner. This dye gives reddish navy dyeings having good fastness properties on cotton.

EXAMPLE 6

32.3 parts of 4,5-dichloro-1-(N'-difluorotriazin-2'-ylaminoethyl)-pyridaz-6-one are dissolved in 150 parts by volume of N-methylpyrrolidone, and the solution is added dropwise at 40° C. to a neutral aqueous solution of 26.8 g of 1,4-phenylenediamine-2,5-disulfonic acid. The pH is then kept at 6 for 4 hours with a little sodium bicarbonate. The mixture is then cooled to 0° C. with ice and diazotized with sodium nitrite in the presence of hydrochloric acid, and the resulting diazo suspension is added to a suspension of the red monoazo dye obtained from 17.3 parts of aniline-4-sulfonic acid and 31.3 parts of 1-amino-8-hydroxynaphthalene-3,6-disulfonic acid by a method similar to that described in Example 1. Coupling is completed overnight at pH 5.5–6, and the product is precipitated with 250 parts of sodium chloride, filtered off and dried under mild conditions to give the dye of the formula

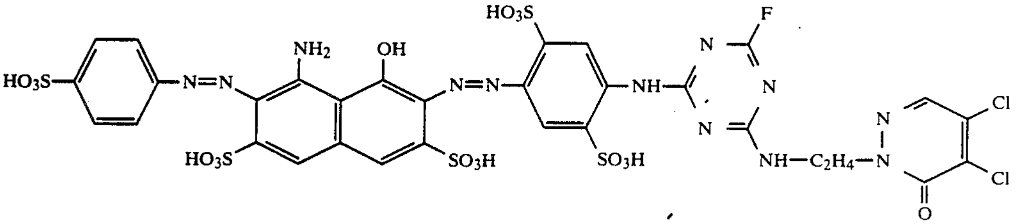

in the form of a black powder, which dyes cotton in navy hues possessing generally good fastness properties.

The navy diazo dyes characterized in the Table below are obtained similarly to dye Examples 1–6.

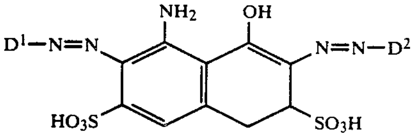

| Example | $D^1$ | $D^2$ | Hue on cotton |
|---|---|---|---|
| 7 | 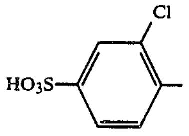 | 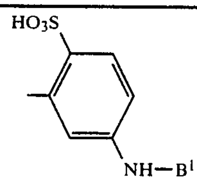 | navy |
| 8 | 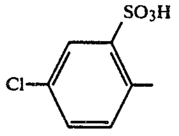 | 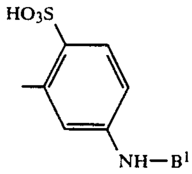 | navy |
| 9 | 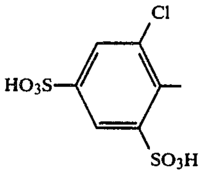 | 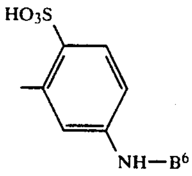 | reddish navy |

-continued
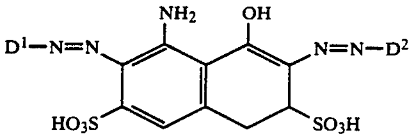
| Example | $D^1$ | $D^2$ | Hue on cotton |
|---|---|---|---|
| 10 | 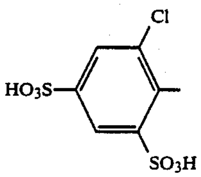 | 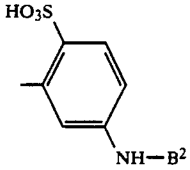 | reddish navy |
| 11 | 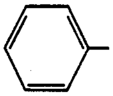 | 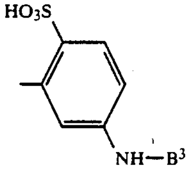 | navy |
| 12 | 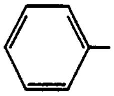 | 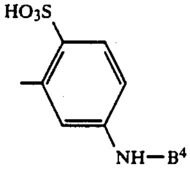 | navy |
| 13 | 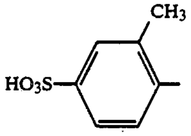 | 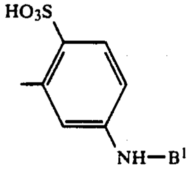 | navy |
| 14 | 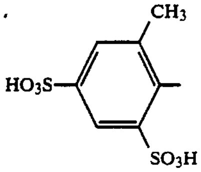 | 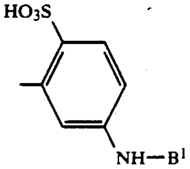 | reddish navy |
| 15 | 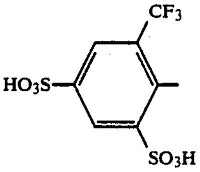 | 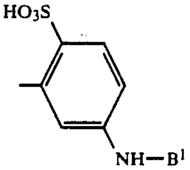 | reddish navy |
| 16 | 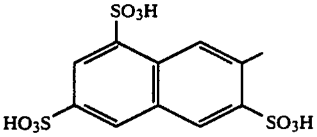 | 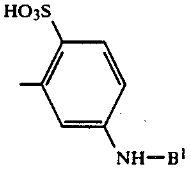 | greenish navy |

-continued
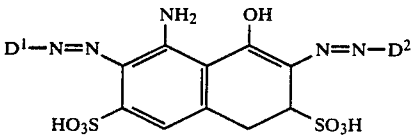
| Example | D[1] | D[2] | Hue on cotton |
| --- | --- | --- | --- |
| 17 | 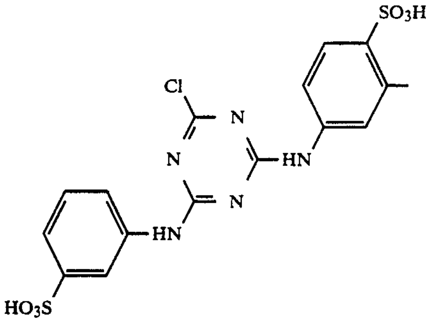 | 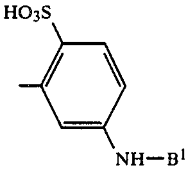 | navy |
| 18 | 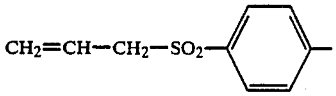 | 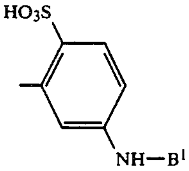 | navy |
| 19 | 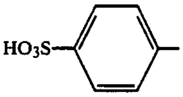 | 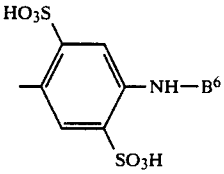 | greenish navy |
| 20 | 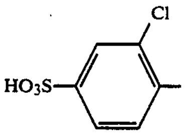 | 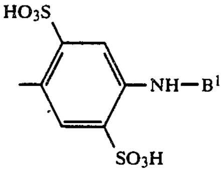 | greenish navy |
| 21 | 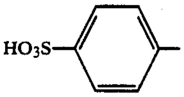 | 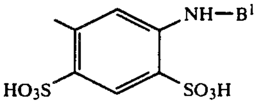 | navy |
| 22 | 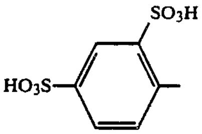 | 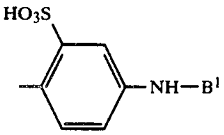 | greenish navy |
| 23 | 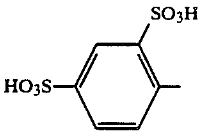 | 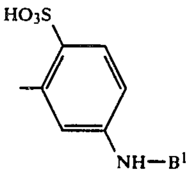 | navy |

-continued

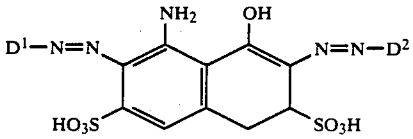

| Example | $D^1$ | $D^2$ | Hue on cotton |
|---|---|---|---|
| 24 | 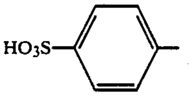 | 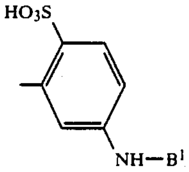 | navy |
| 25 | 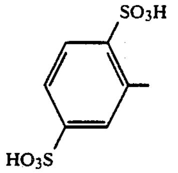 | 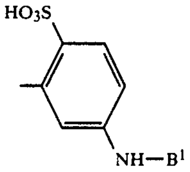 | navy |
| 26 | 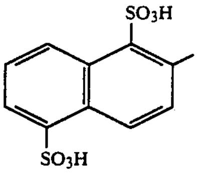 | 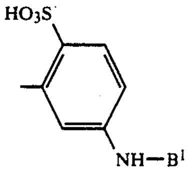 | greenish navy |
| 27 | 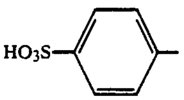 | 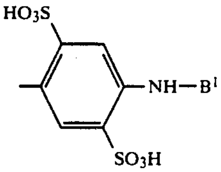 | greenish navy |
| 28 | 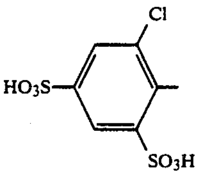 | 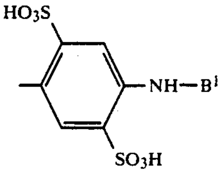 | navy |

EXAMPLE 29

49.2 parts of the condensate obtained as described in Example 1a from 1,3-phenylenediamine-4-sulfonic acid and 4,5-dichloro-1-(N'-difluorotriazin-2'-ylaminoethyl)-pyridaz-6-one are diazotized in the presence of hydrochloric acid and then coupled in a solution containing acetic acid, using a suspension of 31.3 parts of 1-amino-8-hydroxynaphthalene-3,6-disulfonic acid in 300 parts of water. 17.3 parts of aniline-4-sulfonic acid which have been diazotized in the presence of hydrochloric acid are then added to the red monoazo dye, and coupling is carried out at pH 6.5-7 to give the disazo dye. The product is then salted out with sodium chloride and the precipitate is filtered off and dried under mild conditions. The dye of the formula

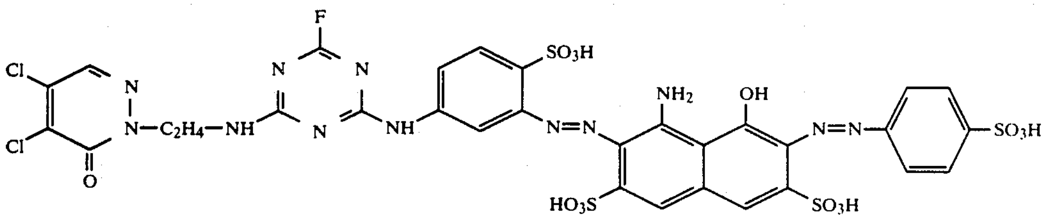

dyes cotton in navy hues possessing good lightfastness and wetfastness.

Other dyes which are prepared similarly to Example 29 are characterized in the Table below. They have similar fastness properties.

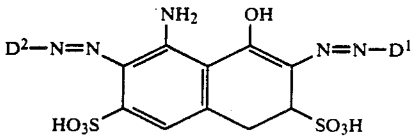
| Example | $D^1$ | $D^2$ | Hue on cotton |
|---|---|---|---|
| 30 | 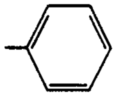 | 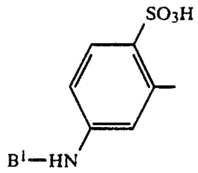 | reddish navy |
| 31 | 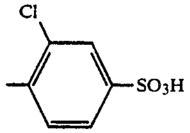 | 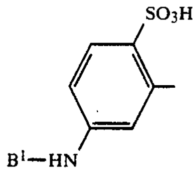 | reddish navy |
| 32 | 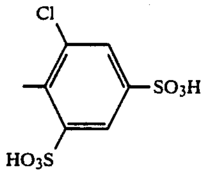 | 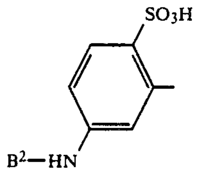 | reddish navy |
| 33 | 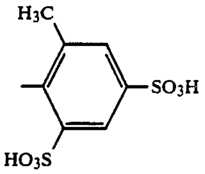 | 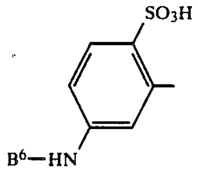 | reddish navy |
| 34 | 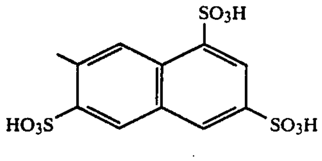 | 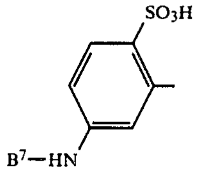 | reddish navy |
| 35 | 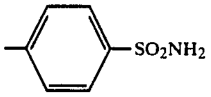 | 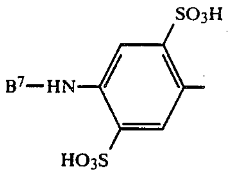 | greenish navy |
| 36 | 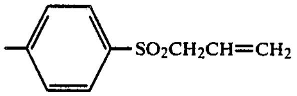 | 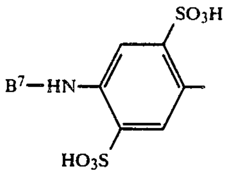 | greenish navy |

-continued

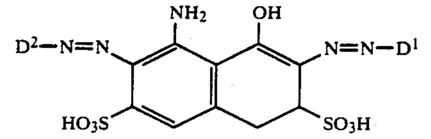

| Example | $D^1$ | $D^2$ | Hue on cotton |
|---|---|---|---|
| 37 | 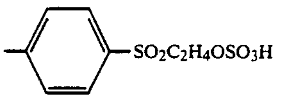 | 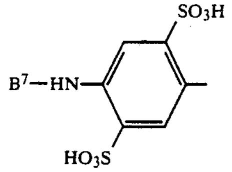 | greenish navy |

EXAMPLE 38

25 parts of the condensate of 1,3-phenylenediamine-4-sulfonic acid and 4,5-dichloro-1-(N'-difluorotriazin-2'-ylaminoethyl)-pyridaz-6-one in 300 parts of water are diazotized in the presence of hydrochloric acid, 22 parts of 1-(4-sulfophenyl)-3-carboxy-5-hydroxypyrazole are added and the mixture is kept at pH 6-7 for 2 hours at room temperature. The dye of the formula

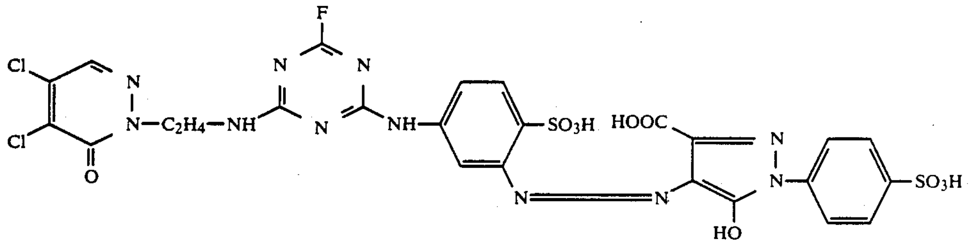

is isolated by filtration under suction. It dyes cotton in fast fluorescent yellow hues.

EXAMPLE 39

49.2 parts of the condensate from Example 2a are diazotized in the presence of hydrochloric acid and the product is reacted with an aqueous, neutral solution of 30.4 parts of 1-hydroxynaphthalene-3,6-disulfonic acid at 10° C. A pH of 6 is then maintained with sodium bicarbonate until coupling is complete, which takes 7 hours. The mixture is stirred overnight, and the product is filtered off and dried under mild conditions. The dye of the formula

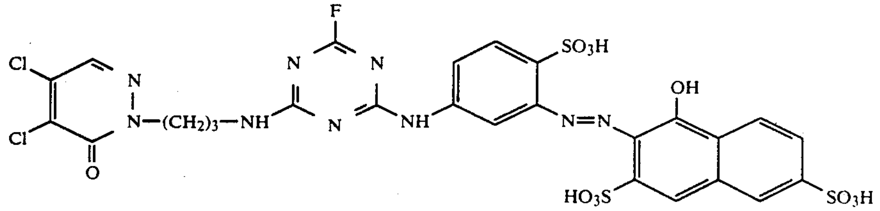

gives fast orange hues on cotton.

The dyes characterized in the Table below are obtained in a manner similar to that described in Examples 38 and 39 and give fast dyeings having the stated hues on cotton.

$D^2—N=N—K$

| Example | $D^2$ | K | Hue on cotton |
|---|---|---|---|
| 40 | 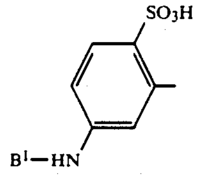 | 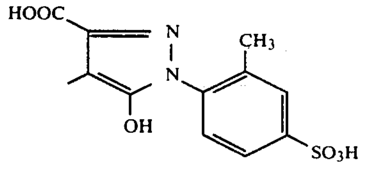 | yellow |

-continued
$D^2—N=N—K$
| Example | $D^2$ | K | Hue on cotton |
|---|---|---|---|
| 41 | 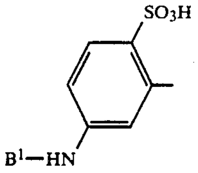 | 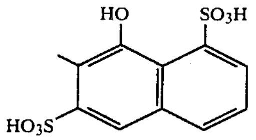 | yellowish red |
| 42 | 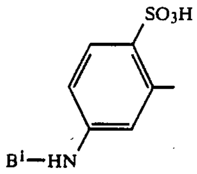 | 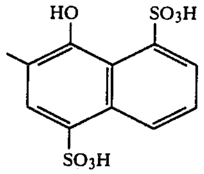 | yellowish red |
| 43 | 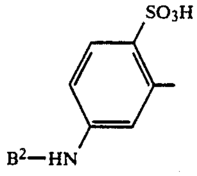 | 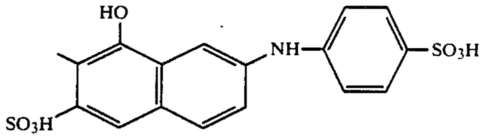 | brown |
| 44 | 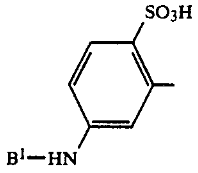 | 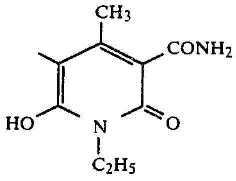 | yellow |
| 45 | 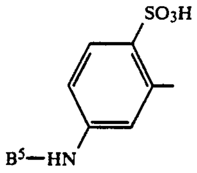 | 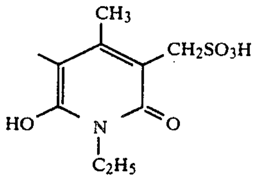 | yellow |
| 46 | 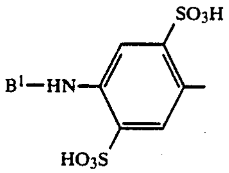 | 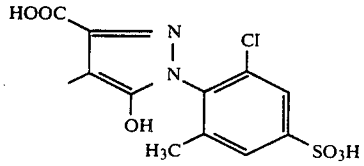 | reddish yellow |
| 47 | 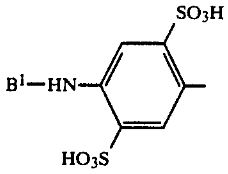 | 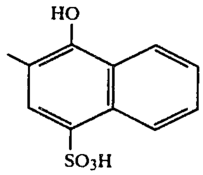 | yellowish red |
| 48 | 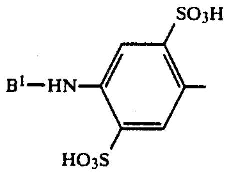 | 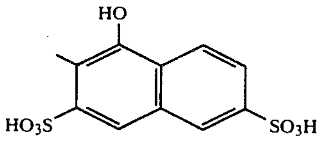 | yellowish red |

-continued

D²—N=N—K

| Example | $D^2$ | K | Hue on cotton |
|---|---|---|---|
| 49 | 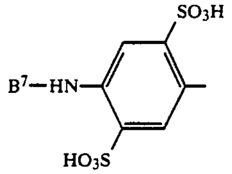 | 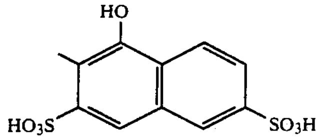 | yellowish red |
| 50 | 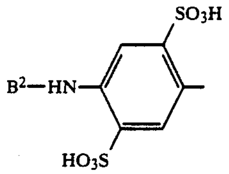 | 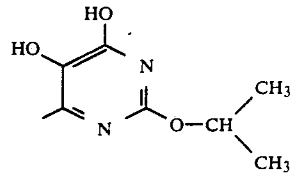 | yellow |
| 51 | 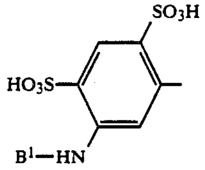 | 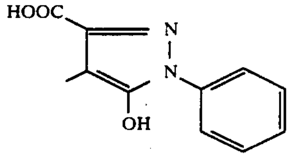 | yellow |
| 52 | 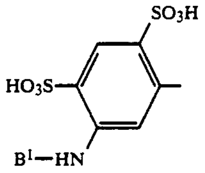 | 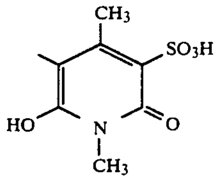 | greenish yellow |
| 53 | 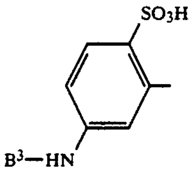 | 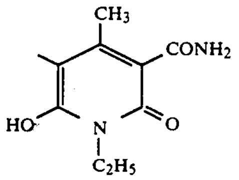 | greenish yellow |
| 54 | 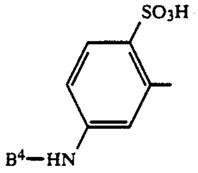 | 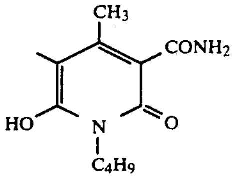 | greenish yellow |
| 55 | 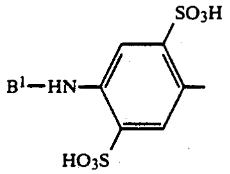 | 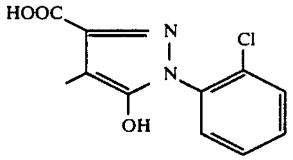 | reddish yellow |

EXAMPLE 56

A solution of 48.3 parts of 1-(4'-Sulfophenyl)-3-carboxy-4-(4'-amino-2'-sulfophenylazo)-pyrazol-5-one in 750 parts of ice water is reacted with a suspension of 33 parts of 4,5-dichloro-1-(N'-difluorotriazin-2'-ylaminoethyl)-pyridaz-6-one in 100 parts by volume of acetone at 20°-30° C. and pH 6-6.5. As soon as free amino groups are no longer detectable, the product is precipitated with potassium chloride, filtered off and dried under mild conditions. The resulting dye of the formula

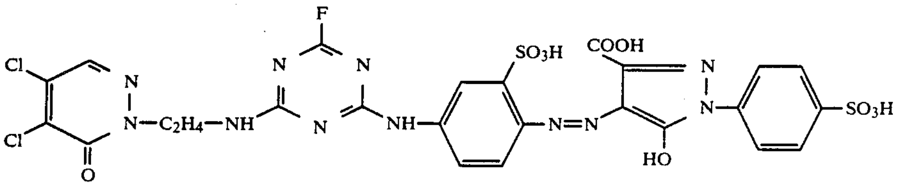

dyes cotton in fast golden yellow hues.

EXAMPLE 57

38.5 parts of 2-aminonaphthalene-3,6,8-trisulfonic acid are diazotized in the presence of hydrochloric acid and the product is coupled to 15 parts of 3-acetylaminoaniline. The product is then reacted with a suspension of 33 parts of 4,5-dichloro-1-(N'-difluorotriazin-2'-ylaminoethyl)pyridaz-6-one in 100 parts by volume of acetone at 25°-30° C. and pH 6-6.5. As soon as free amino groups are no longer detectable, the product is salted out with sodium chloride, filtered off and dried under mild conditions and under reduced pressure. The resulting dye of the formula

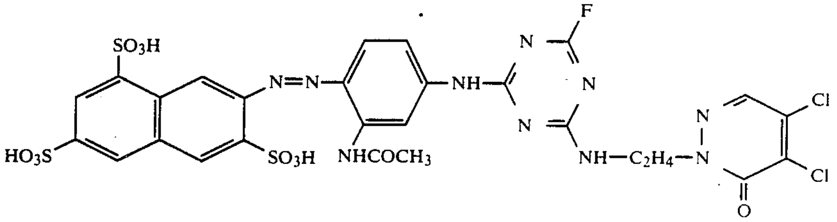

gives fast reddish yellow hues on cotton.

The dyes described in the Table below are also obtained in a manner similar to that described in Example 57 and dye cotton in brilliant golden yellow hues having very good fastness properties.

| D¹—N=N—K | | | |
| --- | --- | --- | --- |
| Example | $D^1$ | K | Hue on cotton |
| 58 | 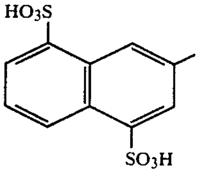 | 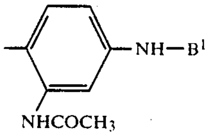 | reddish yellow |
| 59 | 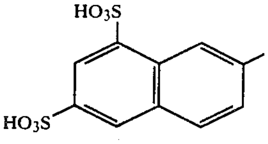 | 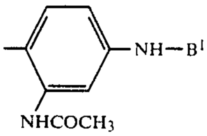 | reddish yellow |
| 60 | 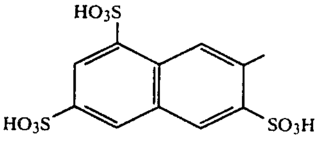 | 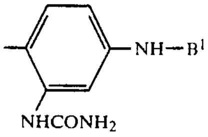 | reddish yellow |
| 61 | 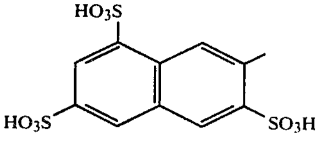 | 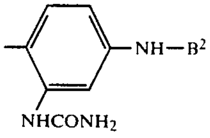 | reddish yellow |
| 62 | 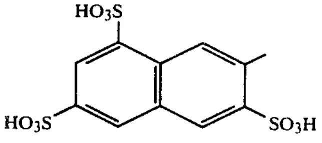 | 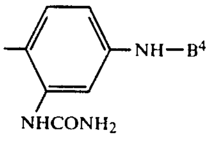 | reddish yellow |

-continued
$D^1-N=N-K$
| Example | $D^1$ | K | Hue on cotton |
|---|---|---|---|
| 63 | 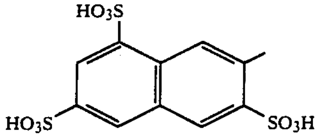 | 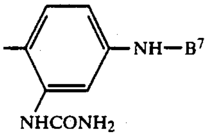 | reddish yellow |
| 64 | 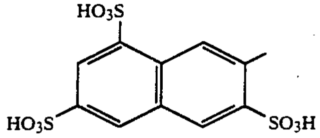 | 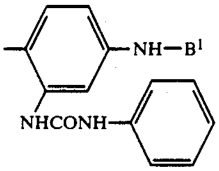 | reddish yellow |
| 65 | 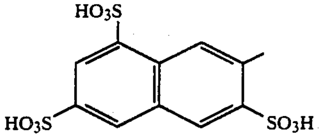 | 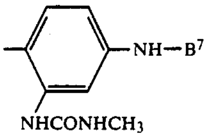 | reddish yellow |
| 66 | 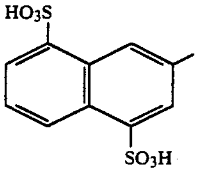 | 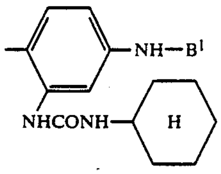 | reddish yellow |
| 67 | 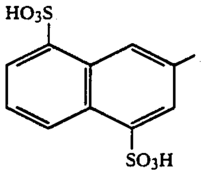 | 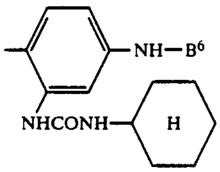 | reddish yellow |
| 68 | 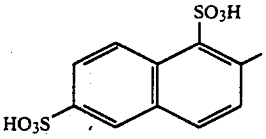 | 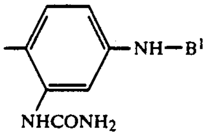 | reddish yellow |
| 69 | 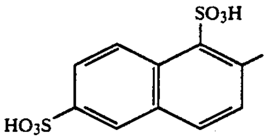 | 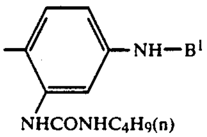 | reddish yellow |
| 70 | 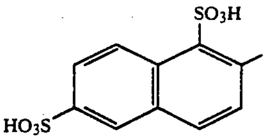 | 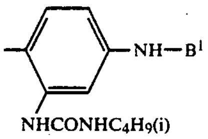 | reddish yellow |
EXAMPLE 71
72.5 parts of the aminodiazo compound of the formula
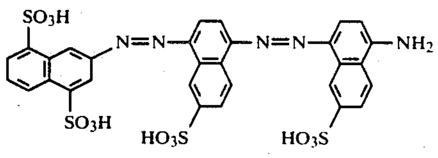

prepared in the usual way are dissolved in 500 parts by volume of water at pH 6.5, and reacted with a suspension of 35 parts of 4,5-dichloro-1-N'-difluorotriazin-3'-ylaminopropyl)pyridaz-6-one in 100 parts by volume of acetone at 20°-25° C. When the reaction is complete, the dye of the formula

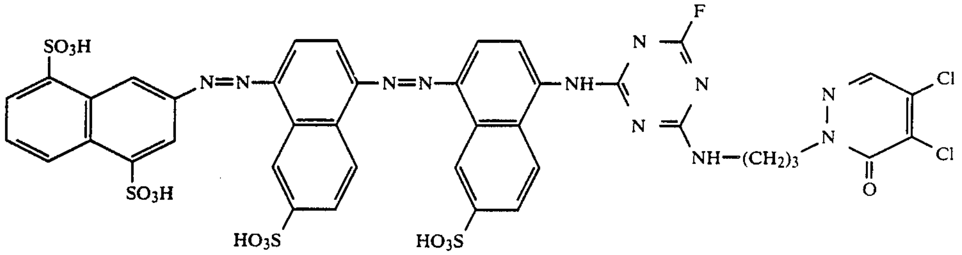

is salted out with sodium chloride, filtered off and dried under reduced pressure. It dyes cotton in fast reddish brown hues.

Other brown dyes which are prepared in a similar manner are characterized in the Table below

| Example | | Hue on cotton |
|---|---|---|
| 72 | 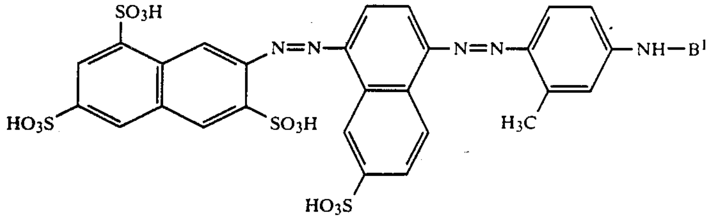 | brown |
| 73 | 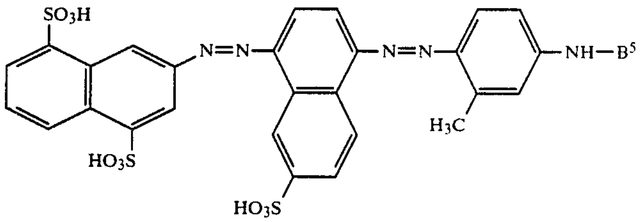 | brown |
| 74 | 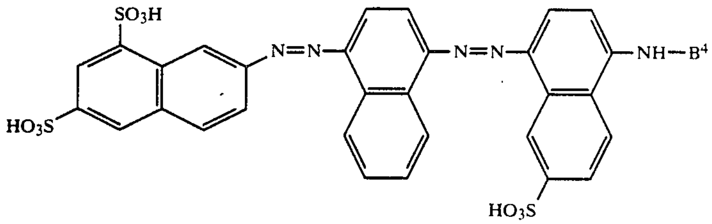 | reddish brown |
| 75 | 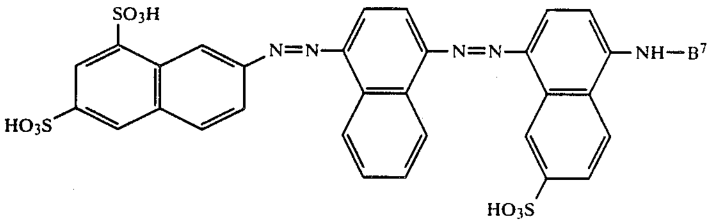 | reddish brown |
| 76 | 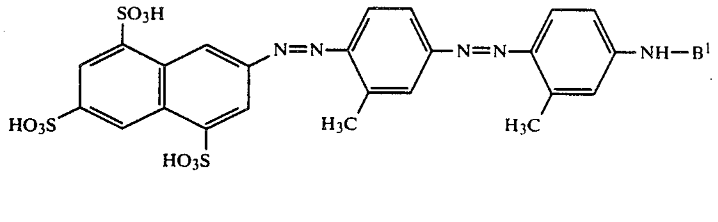 | orange brown |

-continued

| Example | | Hue on cotton |
|---|---|---|
| 77 | 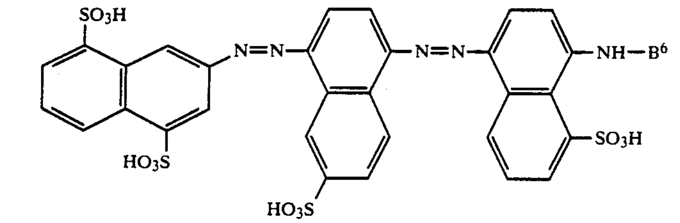 | reddish brown |
| 78 | 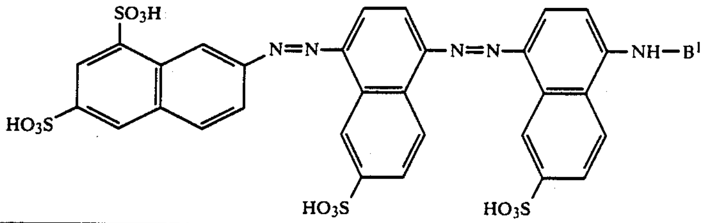 | reddish brown |

EXAMPLE 79

A diazo solution containing hydrochloric acid and complete, the product is precipitated with sodium chloride, filtered off and dried. The dye, which is of the formula

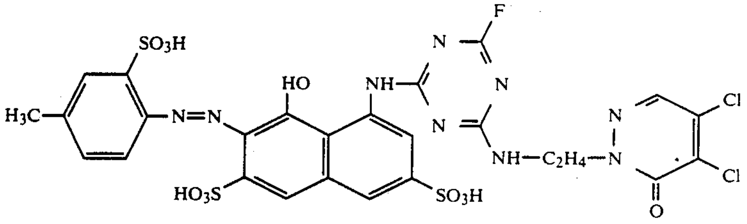

prepared from 18.7 parts of 4-methylaniline-2-sulfonic acid is added to an aqueous suspension of the condensate of 1-amino-8-hydroxynaphthalene-3,6-disulfonic acid with 32.3 parts of 4,5-dichloro-1-(N'-difluorotriazin-2'-ylamionethyl)-pyridaz-6-one, and a pH of 6–6.5 is maintained with sodium bicarbonate. When coupling is gives red dyeings having good lightfastness and wetfastness on cotton.

The dyes listed in the Table below are prepared similarly to Example 79. On cotton, they give dyeings having generally good allround fastness.

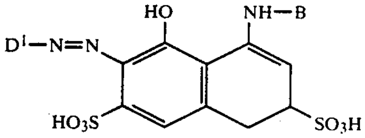

| Example | $D^1$ | B | Hue on cotton |
|---|---|---|---|
| 80 | 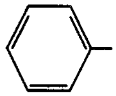 | $B^1$ | red |
| 81 | 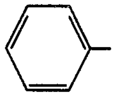 | $B^3$ | red |
| 82 | 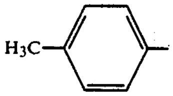 | $B^4$ | red |

-continued
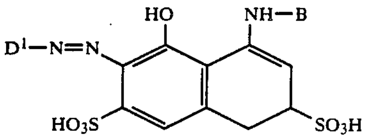
| | | | |
|---|---|---|---|
| 83 | 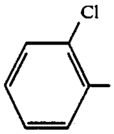 | $B^2$ | red |
| 84 | 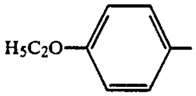 | $B^1$ | bluish red |
| 85 | 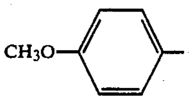 | $B^1$ | bluish red |
| 86 | 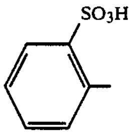 | $B^5$ | red |
| 87 | 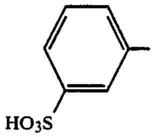 | $B^7$ | red |
| 88 | 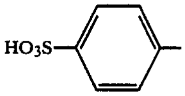 | $B^6$ | red |
| 89 | 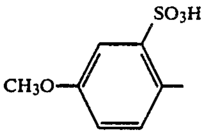 | $B^1$ | bluish red |
| 90 | 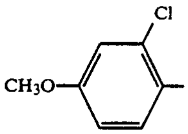 | $B^1$ | red |
| 91 | 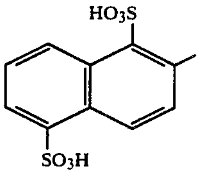 | $B^1$ | bluish red |
| 92 | 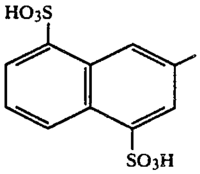 | $B^1$ | bluish red |

-continued
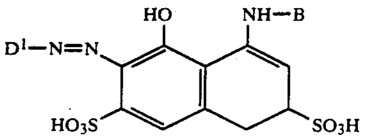
| | | | |
|---|---|---|---|
| 93 | 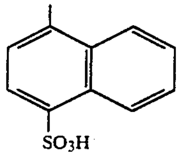 | $B^2$ | bluish red |
| 94 | 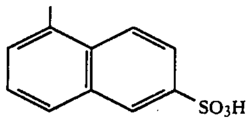 | $B^7$ | bluish red |
| 95 | 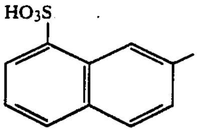 | $B^4$ | bluish red |
| 96 | 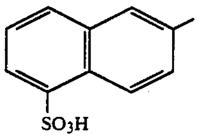 | $B^1$ | bluish red |
| 97 | 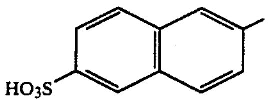 | $B^1$ | bluish red |
| 98 | 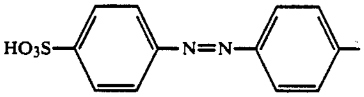 | $B^1$ | reddish violet |
| 99 | 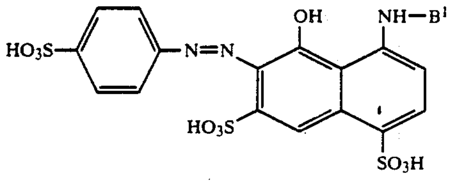 | | yellowish red |
| 100 | 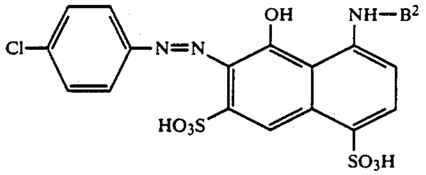 | | yellowish red |
| 101 | 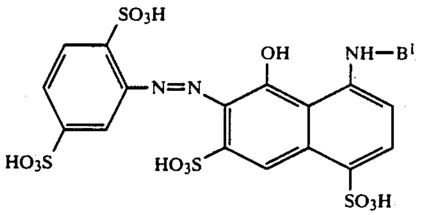 | | yellowish red |

-continued
| | 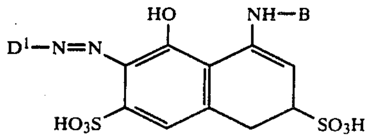 | |
|---|---|---|
| 102 | 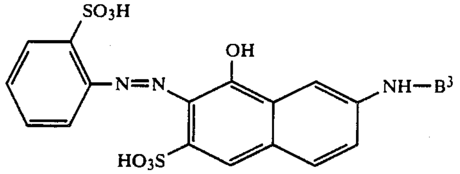 | red |
| 103 | 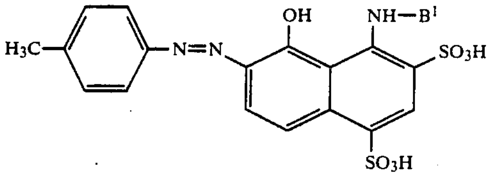 | red |
| 104 | 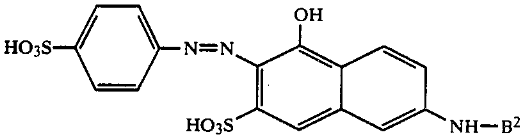 | orange |
| 105 | 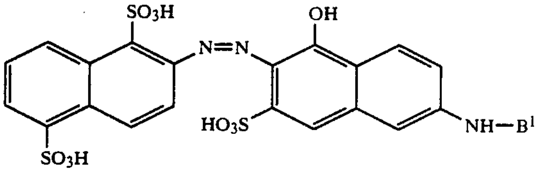 | orange |
| 106 | 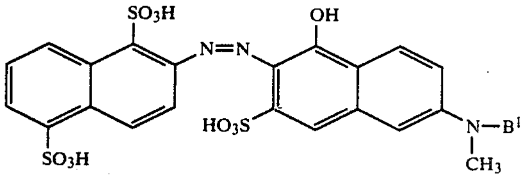 | orange |
| 107 | 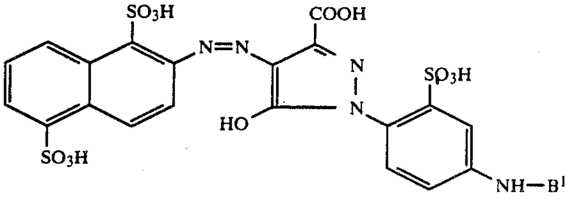 | yellow |
| 108 | 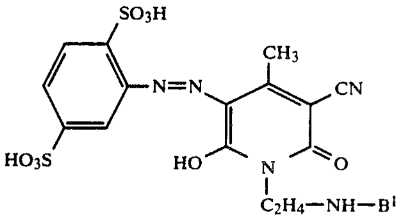 | yellow |
EXAMPLE 109
A suspension of the aminoazo dye of the formula

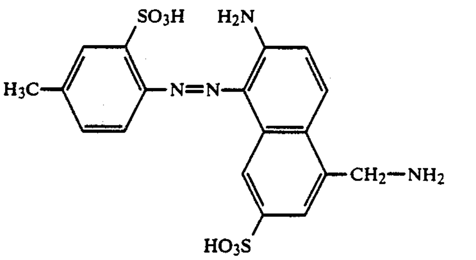

prepared by the usual method is reacted, in water and at pH 6.5, with one equivalent of 4,5-dichloro-1-(N'-difluorotriazine-2'-ylaminoethyl)-pyridaz-6-one. The product is then precipitated by adding potassium chloride and is filtered off under suction and dried. The dye of the formula

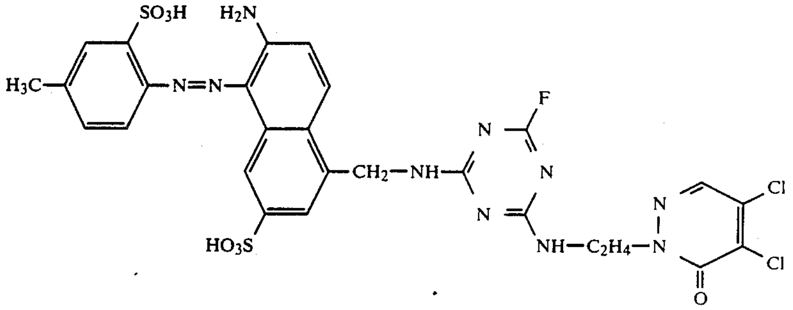

dyes cotton in fast red hues.

EXAMPLE 110

The condensate of 1,3-diaminobenzene-4-sulfonic acid with 4,5-dichloro-1-(N'-difluorotriazin-2'-ylaminoethyl)-pyridaz-6-one is prepared similarly to Example 1a and diazotized as described, and the product is coupled to 1-acetylamino-8-hydroxynaphthalene-3,6-disulfonic acid. The resulting dye is of the formula

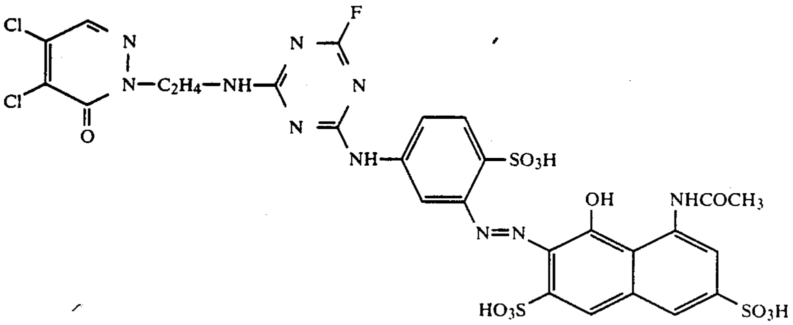

and dyes cotton in fast red hues.

The monoazo dyes characterized in the Table below are also synthesized similarly to Example 110.

| | $D^2—N=N—K$ | | |
|---|---|---|---|
| Example | $D^2$ | K | Hue on cotton |
| 111 | 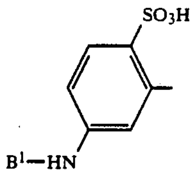 | 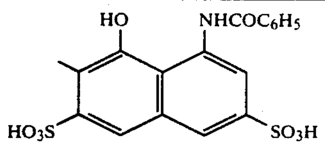 | red |
| 112 | 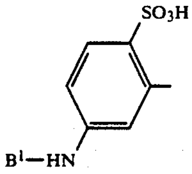 | 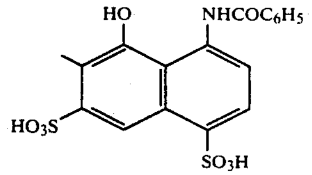 | red |

-continued
| | $D^2—N=N—K$ | | |
|---|---|---|---|
| Example | $D^2$ | K | Hue on cotton |
| 113 | 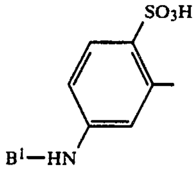 | 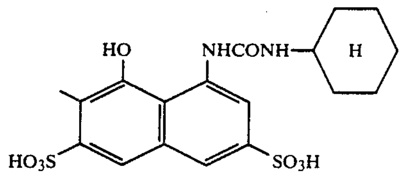 | red |
| 114 | 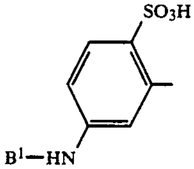 | 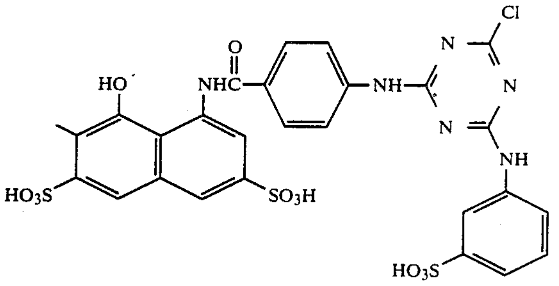 | red |
| 115 | 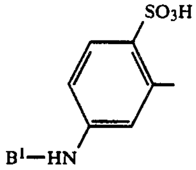 | 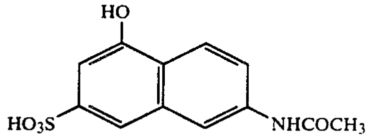 | orange |
| 116 | 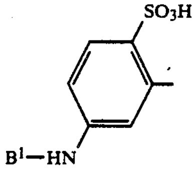 | 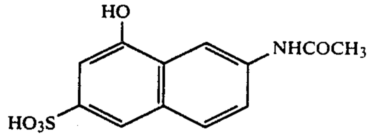 | red |
| 117 | 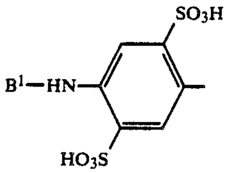 | 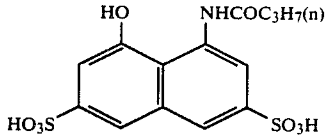 | bluish red |
| 118 | 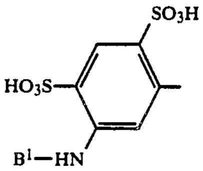 | 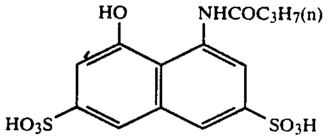 | bluish red |
EXAMPLE 119
26 parts of the known dye of the formula
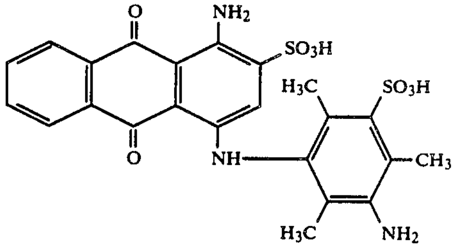
are reacted with 16.5 parts of 4,5-dichloro-1-(N'-difluorotriazin-2'-ylaminoethyl)-pyridaz-6one in water at 20°-25° C. and pH 6-6.5. The resulting dye, which is of the formula

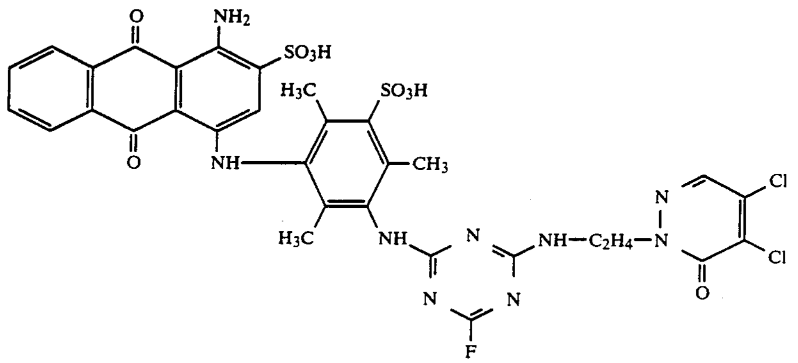
is then salted out with potassium chloride, filtered off and dried under reduced pressure. It dyes cotton in fluorescent blue hues having very good lightfastness.
The reactive dyes which are listed in the Table below are also synthesized in a similar manner.
| Example | | Hue on cotton |
|---|---|---|
| 120 | 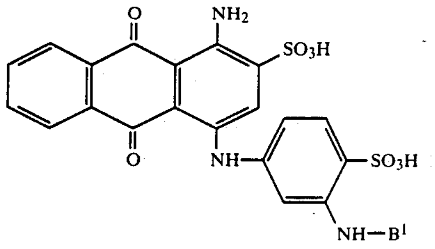 | greenish blue |
| 121 | 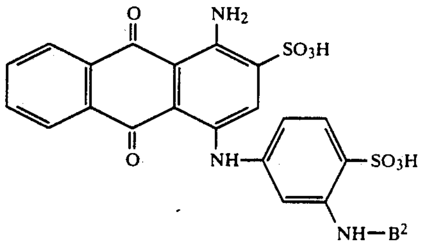 | greenish blue |
| 122 | 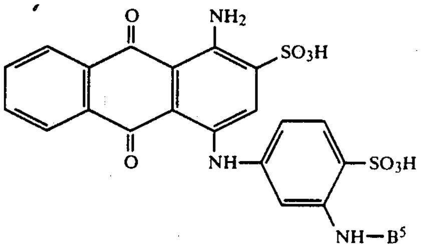 | greenish blue |
| 123 | 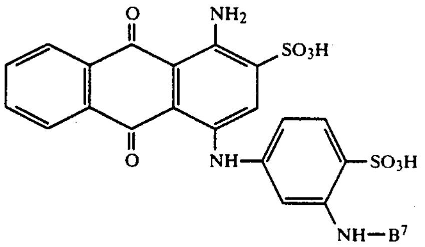 | greenish blue |

-continued
| Example | | Hue on cotton |
|---|---|---|
| 124 | 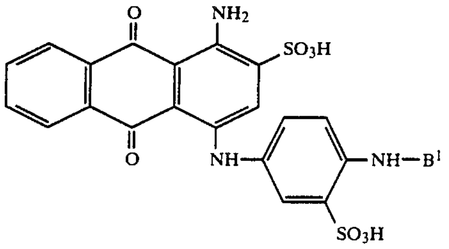 | greenish blue |
| 125 | 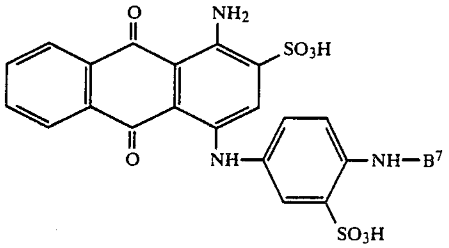 | greenish blue |
| 126 | 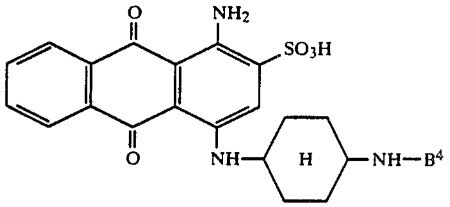 | greenish blue |
| 127 | 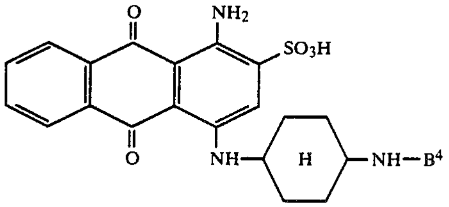 | greenish blue |
| 128 | 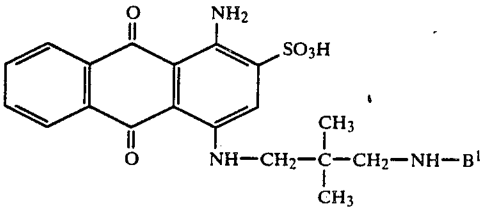 | blue |
| 129 | 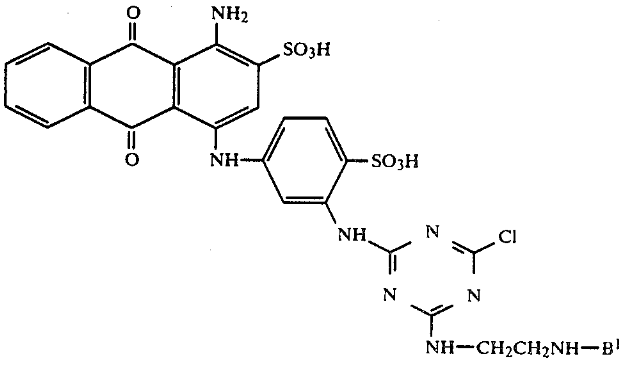 | blue |

-continued

| Example | | Hue on cotton |
|---|---|---|
| 130 | 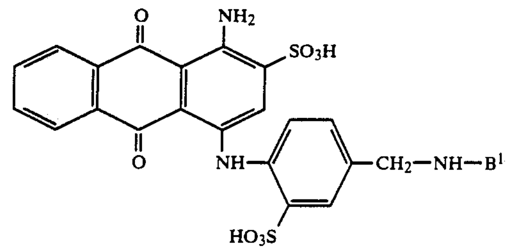 | blue |
| 131 | 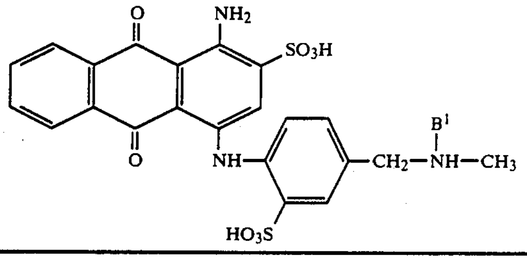 | blue |

EXAMPLE 132

64.8 parts of the known dye of the formula

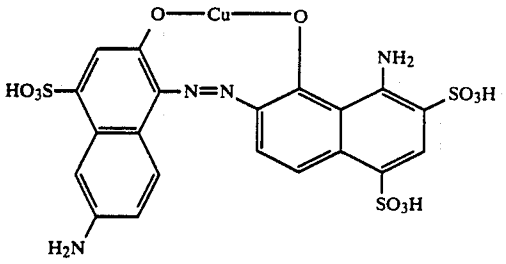

are stirred in 700 parts of water and reacted with 33 parts of 4,5-dichloro-1-(N'-difluorotriazin-2'-ylaminoethyl)-pyridaz-6-one at pH 6-6.5 and 20°-25° C. The dye is then salted out with sodium chloride and dried under mild conditions to give the dye of the formula

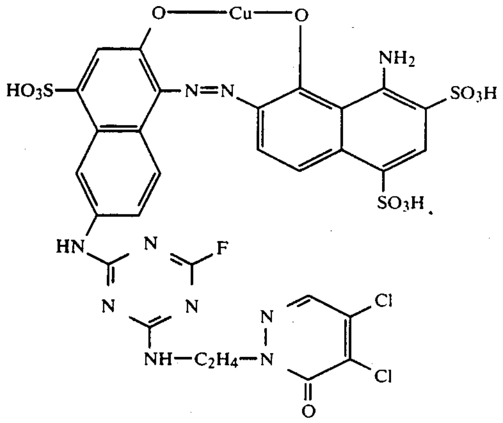

which dyes cotton in blue hues having good fastness properties.

The novel dyes of the general formula

Chromophore-B are synthesized in a similar manner and by methods which are known per se, the dyes being summarized in the Table below.

| Example | Chromophore | B | Hue on cotton |
|---|---|---|---|
| 133 | 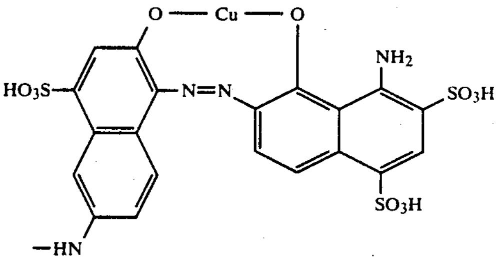 | $B^1$ | blue |

-continued
| Example | Chromophore | B | Hue on cotton |
|---|---|---|---|
| 134 | 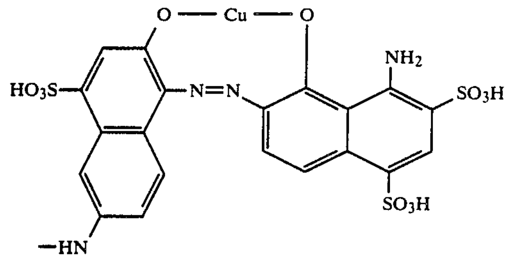 | $B^7$ | blue |
| 135 | 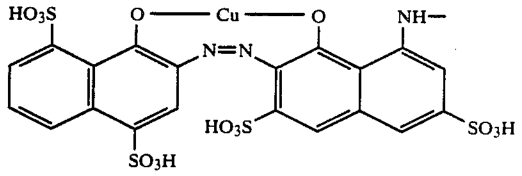 | $B^1$ | blue |
| 136 | 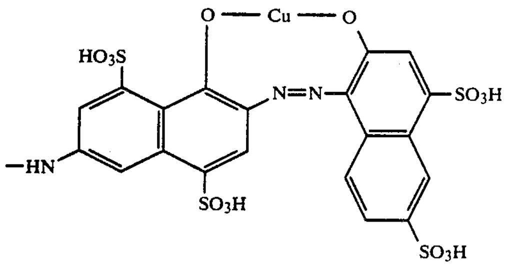 | $B^1$ | blue |
| 137 | 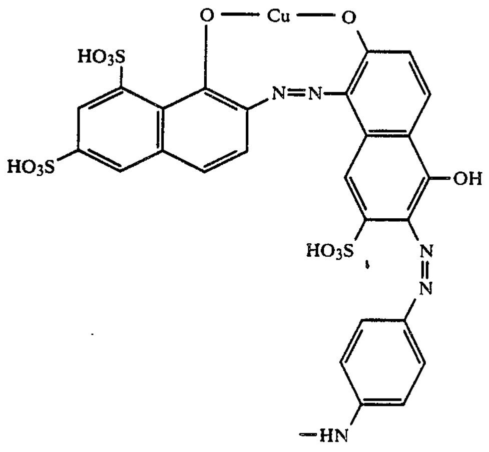 | $B^1$ | navy |
| 138 | 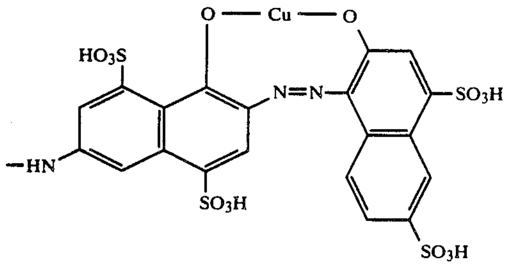 | $B^1$ | blue |

-continued
| Example | Chromophore | B | Hue on cotton |
|---|---|---|---|
| 139 | 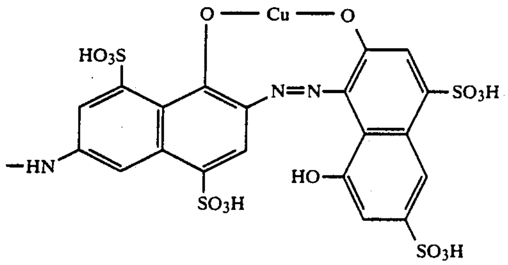 | $B^5$ | blue |
| 140 | 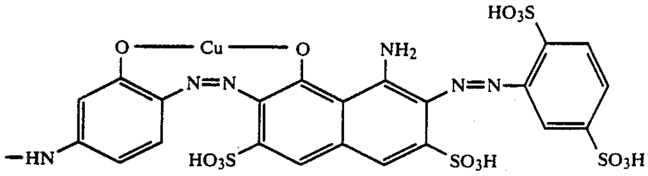 | $B^1$ | navy |
| 141 | 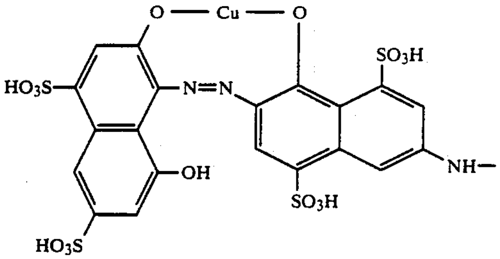 | $B^1$ | navy |
| 142 | 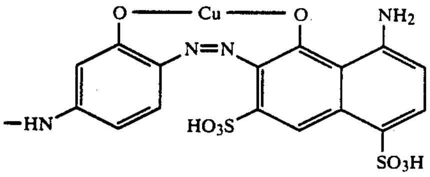 | $B^1$ | blue |
| 143 | 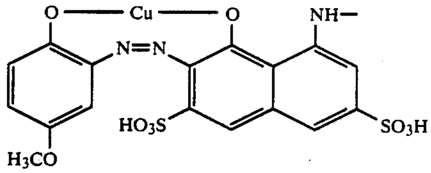 | $B^1$ | navy |
| 144 | 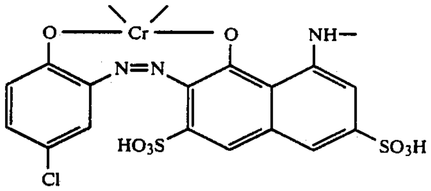 1:2-complex | $B^1$ | navy |
| 145 | 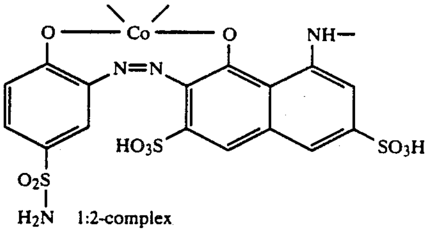 1:2-complex | $B^1$ | navy |

-continued
| Example | Chromophore | B | Hue on cotton |
|---|---|---|---|
| 146 | 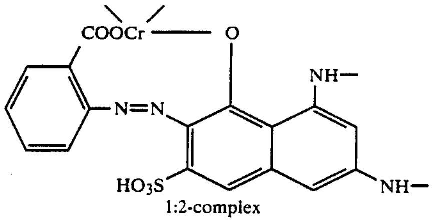 | $B^1$ | brown |
| 147 | 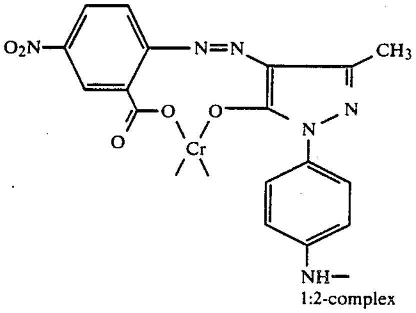 | $B^1$ | brown |
| 148 | 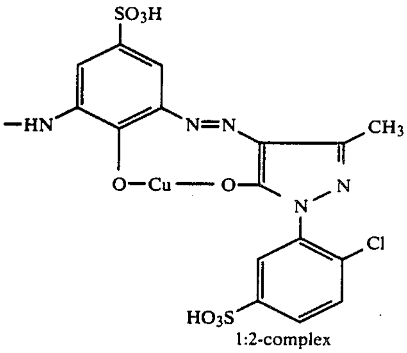 | $B^1$ | brown |
| 149 | 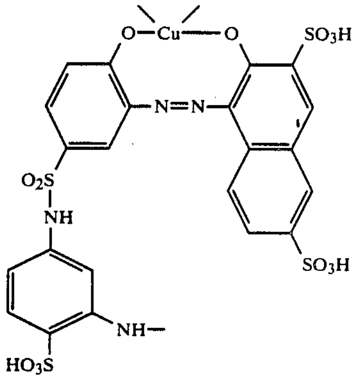 | $B^2$ | red |
| 150 | 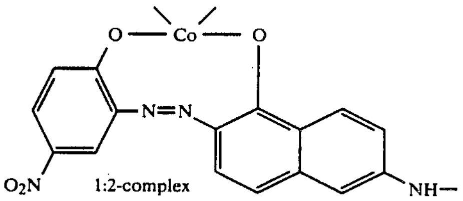 | $B^1$ | bluish red |

-continued
| Example | Chromophore | B | Hue on cotton |
|---|---|---|---|
| 151 | 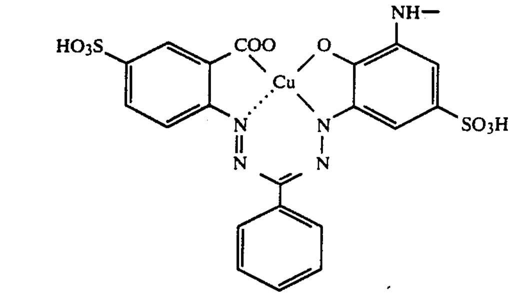 | $B^1$ | blue |
| 152 | 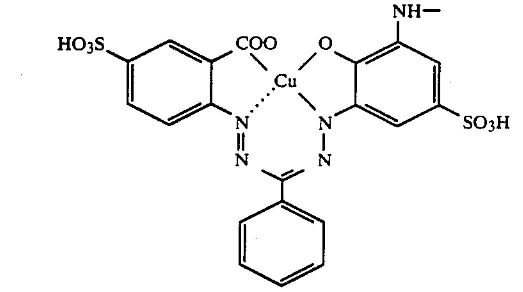 | $B^7$ | blue |
| 153 | 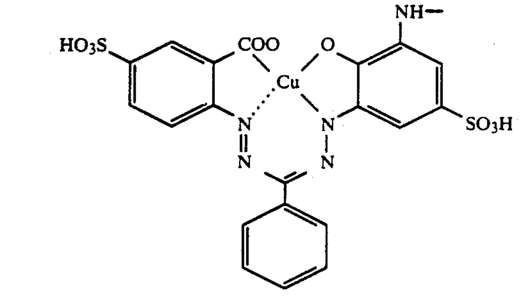 | $B^6$ | blue |
| 154 | 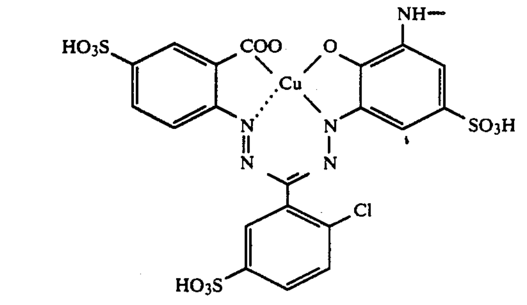 | $B^1$ | blue |
| 155 | 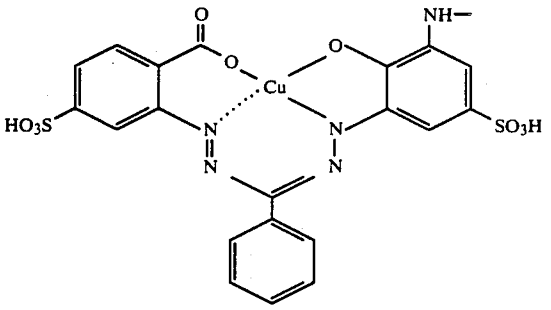 | $B^1$ | blue |

-continued

| Example | Chromophore | B | Hue on cotton |
| --- | --- | --- | --- |
| 156 | 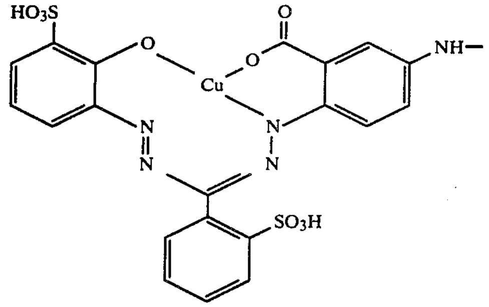 | $B^1$ | blue |

EXAMPLE 157

15.8 parts of the compound of the formula

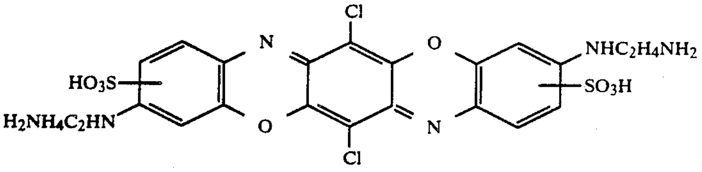

in 1500 parts of water are heated to 45° C. at pH 9. The pH is then brought to 6.5 with hydrochloric acid, and the solution is cooled to 20° C. and reacted with 16.5 parts of 4,5-dichloro-1-(N'-difluorotriazin-2'-ylaminoethyl)-pyridaz-6-one at pH 6.5 and 20° C. When the reaction is complete, the product is salted out with 400 parts of potassium chloride and the precipitated dye is filtered off under suction and dried. It dyes cellulosic fibers in reddish blue hues having good fastness properties and is of the formula

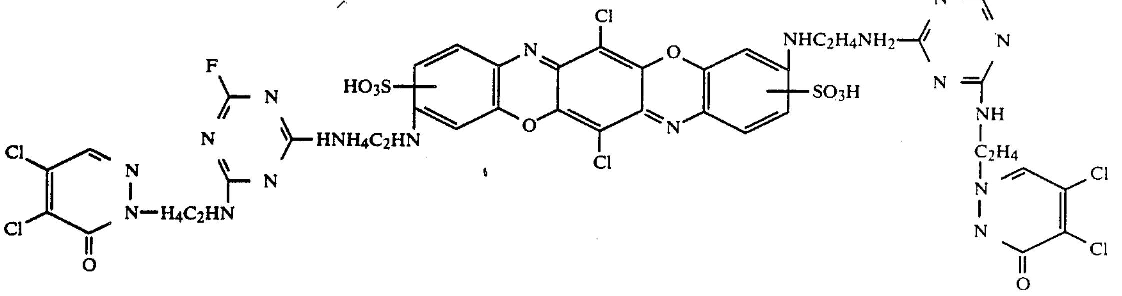

The dyes listed in the Table below can be prepared in a similar manner; the radical

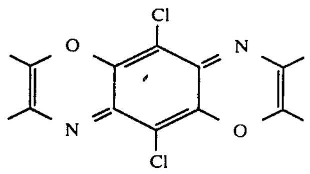

has been abbreviated to

| Example | Chromophore | B | Hue on cotton |
| --- | --- | --- | --- |
| 158 | 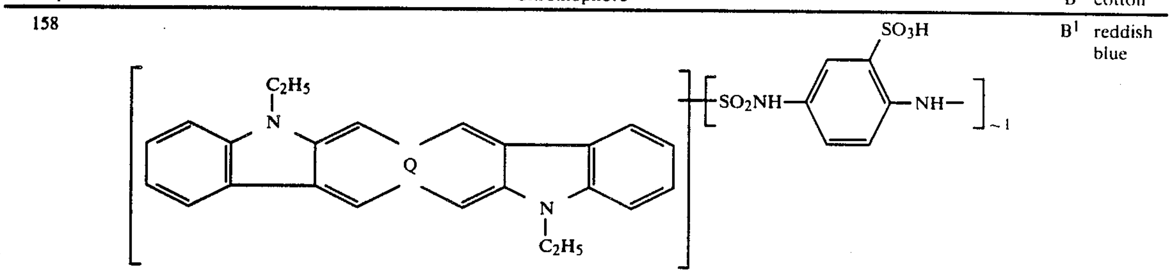 | $B^1$ | reddish blue |

-continued
| Example | Chromophore | B | Hue on cotton |
|---|---|---|---|
| 159 | 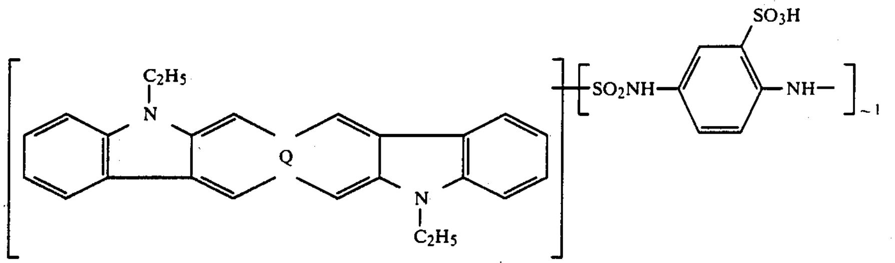 | $B^2$ | reddish blue |
| 160 | 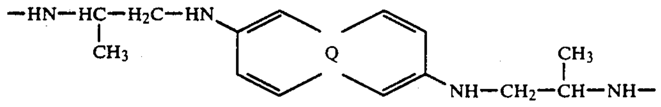 | $B^3$ | reddish blue |
| 161 | 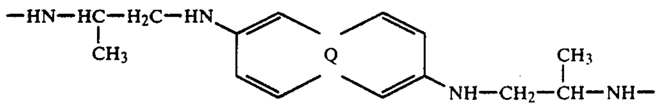 | $B^2$ | reddish blue |
| 162 | 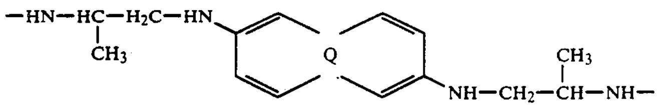 | $B^5$ | reddish blue |
| 163 | 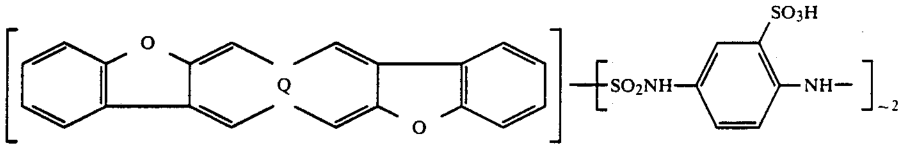 | $B^3$ | reddish violet |
| 164 | 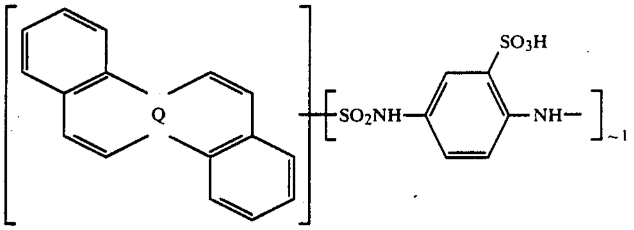 | $B^3$ | red |
| 165 | 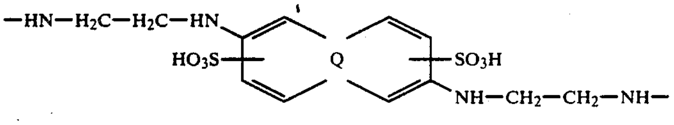 | $B^2$ | reddish blue |
| 166 | 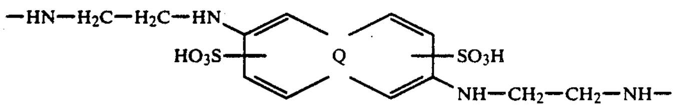 | $B^5$ | reddish blue |
| 167 | 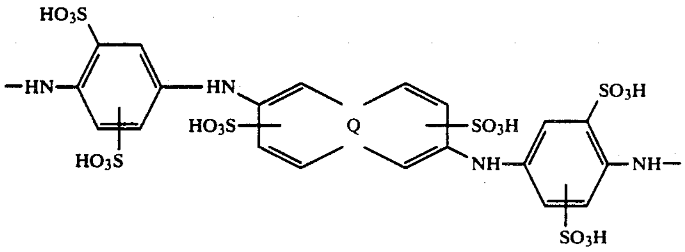 | $B^1$ | reddish blue |

-continued
| Example | Chromophore | B | Hue on cotton |
|---|---|---|---|
| 168 | 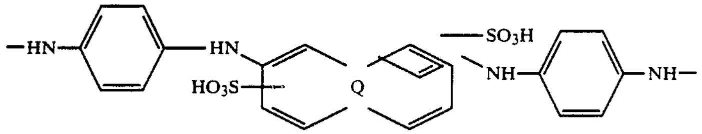 | B[1] | reddish blue |
| 169 | 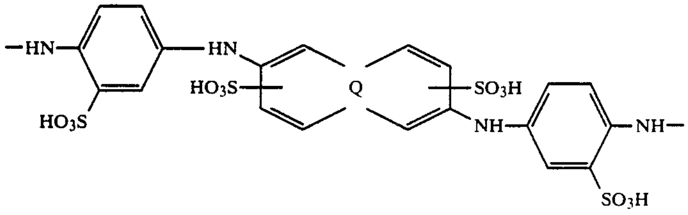 | B[1] | reddish blue |
| 170 | 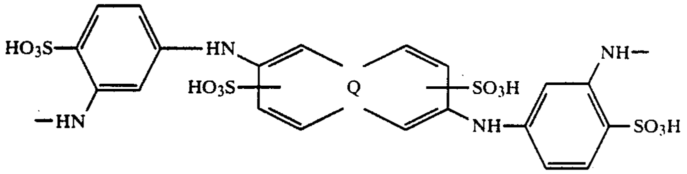 | B[5] | reddish blue |
| 171 | 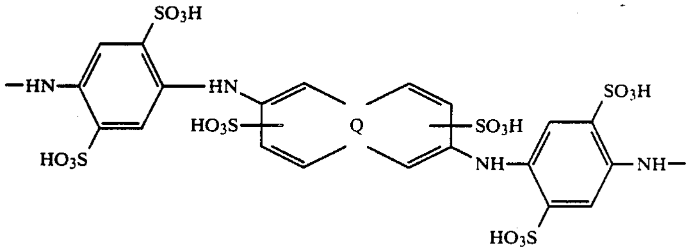 | B[1] | reddish blue |
| 172 | 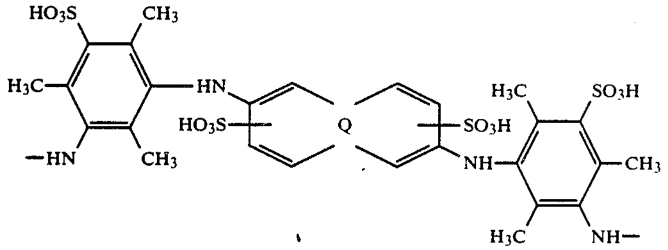 | B[1] | reddish blue |
| 173 | 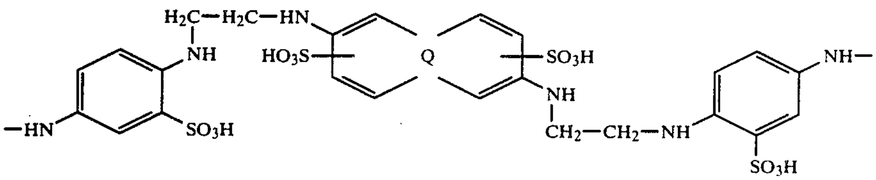 | B[1] | reddish blue |
| 174 | 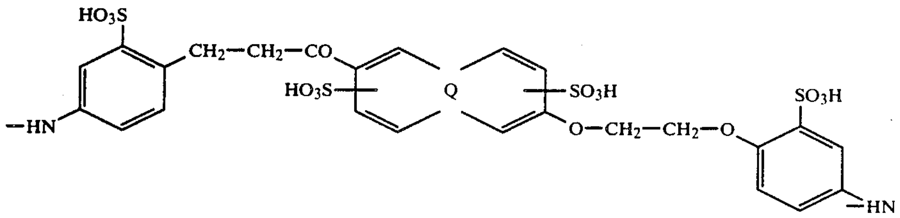 | B[1] | red |

-continued
| Example | Chromophore | B | Hue on cotton |
|---|---|---|---|
| 175 | 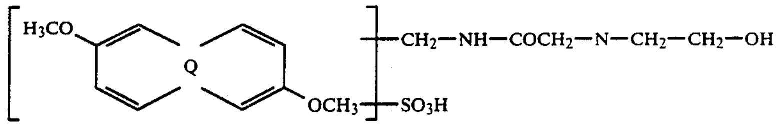 | $B^1$ | red |
| 176 | 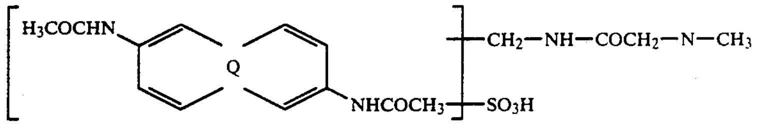 | $B^1$ | red |
| 177 | 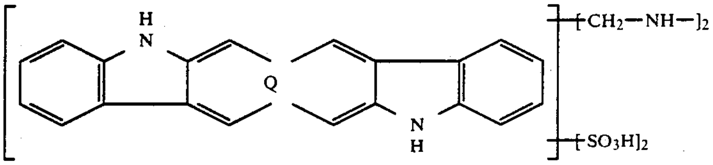 | $B^1$ | blue |
| 178 | 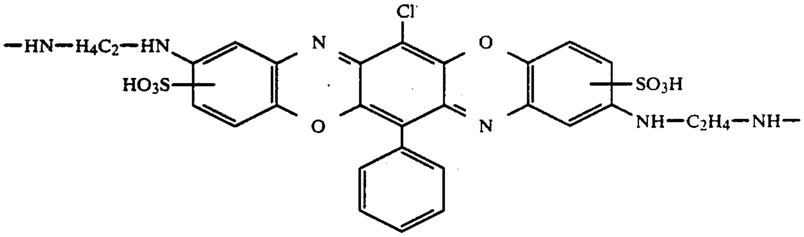 | $B^1$ | reddish blue |
| 179 | 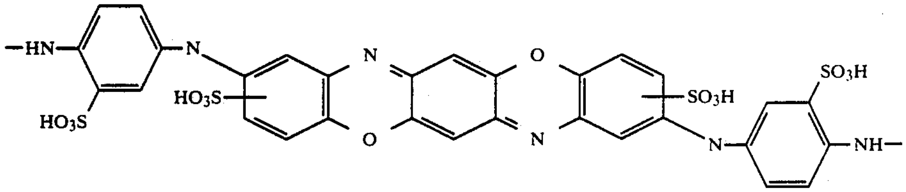 | $B^1$ | rèddish blue |
| 180 | 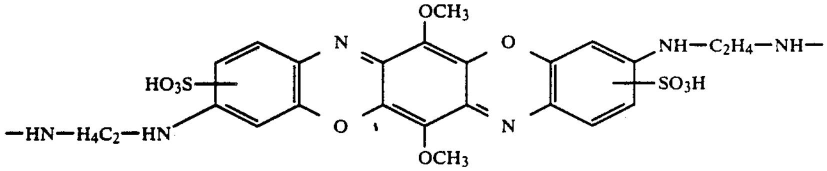 | $B^1$ | reddish blue |
| 181 | 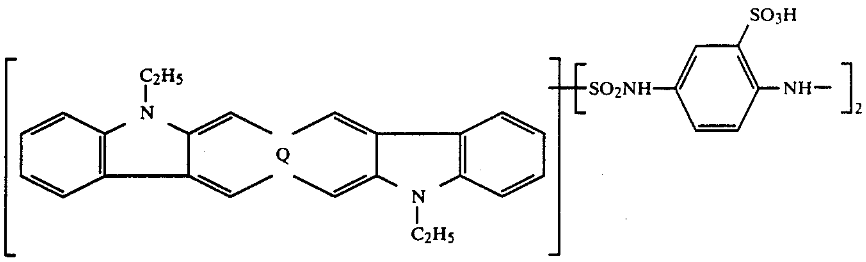 | $B^1$ | reddish blue |
EXAMPLE 182
19.7 parts of the compound of the formula

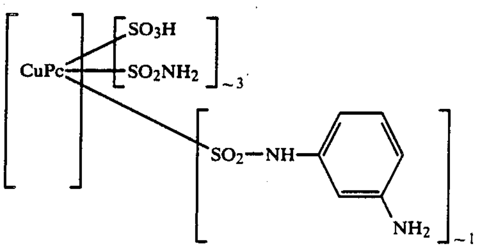

are stirred in a mixture of 125 parts of ice and 125 parts of water to give a homogeneous mixture, and the pH is brought to 7 with sodium hydroxide solution. A fine suspension of 8.3 parts of 4,5-dichloro-1-(N'-difluorotriazin-2'-ylaminoethyl)-pyridaz-6-one in 50 parts by volume of acetone is then added at 20°-25° C., the pH being kept at 6.5-6 with sodium carbonate. As soon as the reaction is complete, the dye is salted out with sodium chloride, filtered off under suction and dried. Its formula is roughly

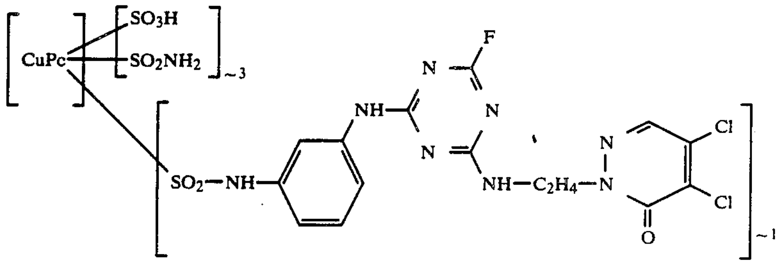

and it dyes cellulose material in greenish blue hues having good fastness properties.

EXAMPLE 183

58 parts of the compound whose formula is roughly

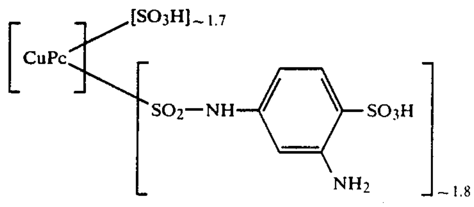

are stirred in a mixture of 300 parts of water and 125 parts of ice to give a homogeneous mixture and brought to pH 7 with sodium hydroxide solution. A fine suspension of 31.5 parts of 4,5-dichloro-1-(N'-difluorotriazin-2'-ylaminoethyl)-pyridaz-6-one in 200 parts by volume of acetone is then added at 20°-25° C., the pH being kept at 6.0-6.5 with sodium carbonate. As soon as the reaction is complete, the dye is salted out with sodium chloride, filtered off under suction and dried. Its formula is roughly

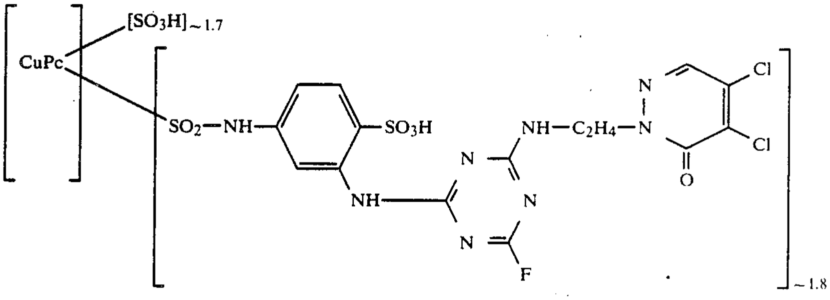

The dyes listed in the Table below can be prepared in a similar manner. They are of the general formula

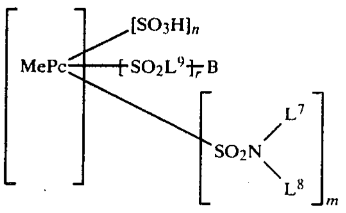

where n and m are each 0-3 and r is 1-4.

| Example | Me | $L^7$ | $L^8$ | $L^9$ | B | rough values n | m | r | hue |
|---|---|---|---|---|---|---|---|---|---|
| 184 | Cu | H | H | 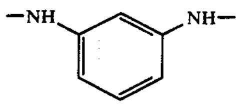 | $B^5$ | 2 | 1 | 1 | greenish blue |
| 185 | Cu | — | — | $—HN—CH_2—CH_2—NH—$ | $B^1$ | 3 | 0 | 1 | greenish blue |
| 186 | Cu | — | — | 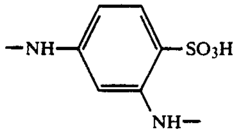 | $B^2$ | 1.7 | 0 | 1.8 | greenish blue |
| 187 | Cu | — | — | 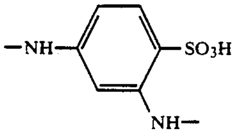 | $B^5$ | 3 | 0 | 1 | greenish blue |
| 188 | Cu | H | H | 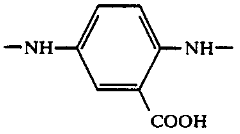 | $B^1$ | 2 | 1 | 1 | greenish blue |
| 189 | Cu | H | H | 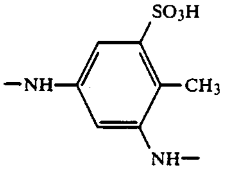 | $B^1$ | 1.6 | 1 | 1 | greenish blue |
| 190 | Cu | H | H | 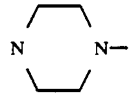 | $B^1$ | 2 | 1 | 1 | greenish blue |
| 191 | Ni | — | — | 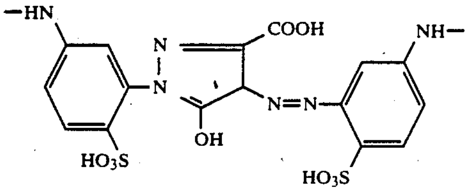 | $B^1$ | 3 | 0 | 1 | green |
| 192 | Ni | — | — | 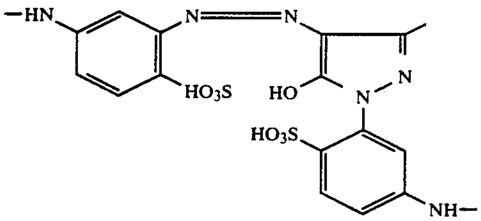 | $B^1$ | 2 | 0 | 1.5 | green |
| 193 | Cu 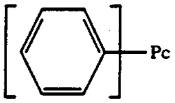 | — | — | $—NH—CH_2—CH_2—NH—$ | $B^1$ | 3-4 | 0 | 2-3 | green |

-continued

| | | | | | | rough values | | | |
|---|---|---|---|---|---|---|---|---|---|
| Example | Me | $L^7$ | $L^8$ | $L^9$ | B | n | m | r | hue |
| 194 | Ni | — | — | 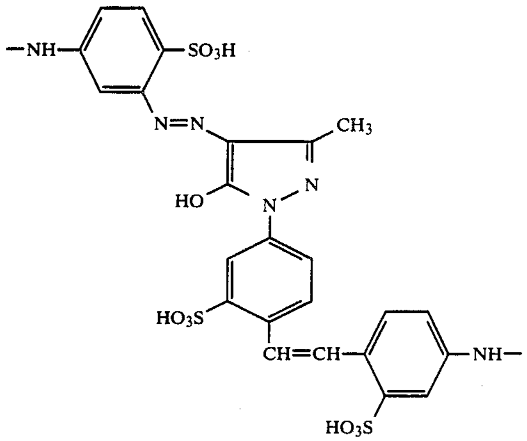 | $B^1$ | 3 | 0 | 1 | green |
| 195 | Ni | — | — | 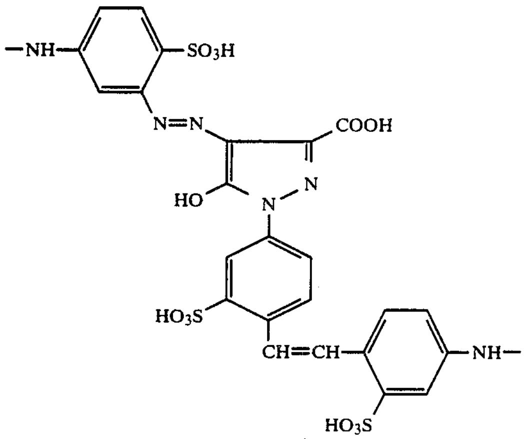 | $B^1$ | 2 | 0 | 1.5 | green |

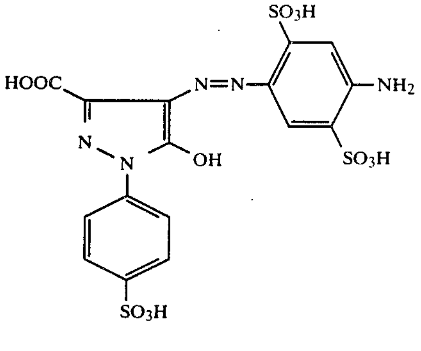

EXAMPLE 196

(a) 134 parts of 1,4-diaminobenzene-2,5-disulfonic acid are dissolved in 2000 parts of water at pH 8–9. The pH is then brought to 2.8–3, the suspension is cooled to 0°–5° C. and one of the amino groups in the molecule is diazotized with an aqueous solution of 34 parts of sodium nitrite in the course of 2 hours. The diazo suspension is then run into a solution of 150 parts of 1-(4'-sulfophenyl)-3-carboxypyrazolone in 100 parts of water which has been brought to pH 9–9.5, and the mixture is stirred for one hour at pH 9–9.5 and then overnight at pH 7. The product is then precipitated by adding 500 parts of sodium chloride a little at a time at pH 4.5–5, and is filtered off under suction and dried. The dye of the formula is obtained in the form of a yellow powder.

(b) 56.3 parts of the dye prepared as described in Example 196 (a) are dissolved in 500 parts of water to give a neutral solution, the pH is brought to 0.5 with hydrochloric acid and diazotization is carried out at 10° C. with sodium nitrite. After two hours, excess nitrite is removed, and the diazo suspension is run into a neutral solution of 23 parts of 1-aminonaphthalene-6-sulfonic acid in 150 parts of water. The pH is kept at 9 by simultaneously feeding in sodium hydroxide solution. When coupling is complete, the pH is brought to 6.5 and the dye of the formula

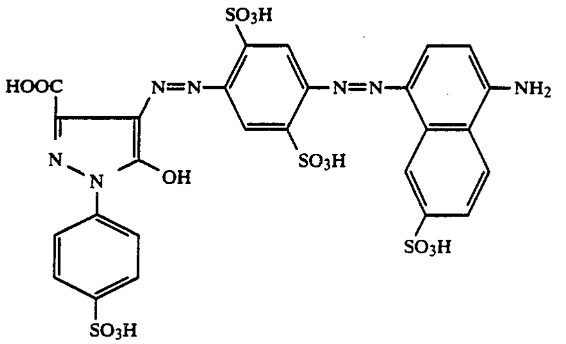

is precipitated with sodium chloride, filtered off and dried.

(c) 20 parts of the dye described in Example 196 (b) and stirred into 150 parts of water at pH 7, and a suspension of 8.1 parts of 4,5-dichloro-1-(N'-difluorotriazinyl-2-aminoethyl)-pyridaz-6-one in 50 parts by volume of acetone is added. The mixture is stirred for 6 hours at 35°-40° C. and ph 6.5-7, after which the product is salted out with sodium chloride and dried under mild conditions under reduced pressure to give the dye of the formula

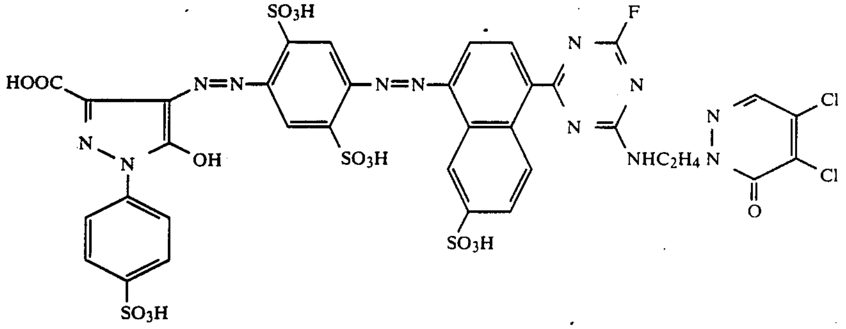

which dyes cotton in orange hues having generally good allround fastness.

The dyes listed in the Table below are also synthesized similarly to Example 196 and give dyeings having similar fastness properties on cotton.

| Example | Chromophore-NH—B | hue on cotton |
|---|---|---|
| 197 | 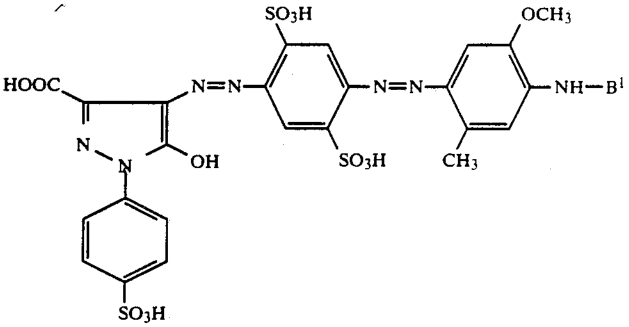 | orange |
| 198 | 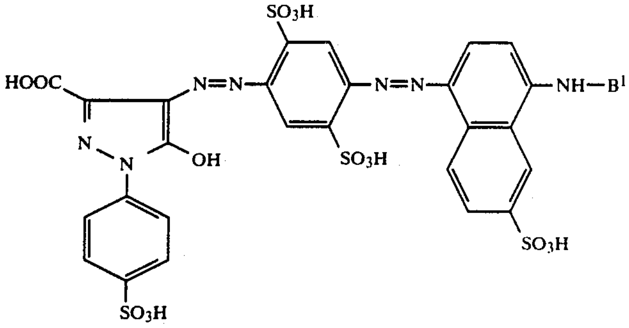 | orange |

-continued

| Example | Chromophore-NH—B | hue on cotton |
|---|---|---|
| 199 | 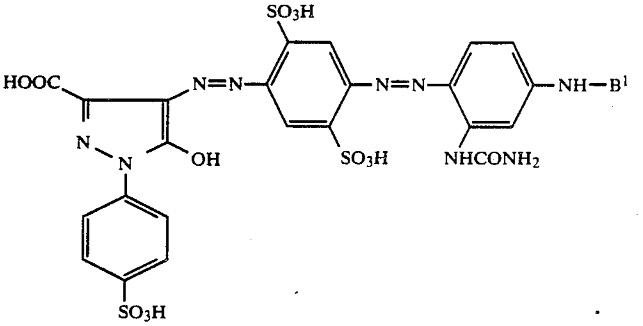 | reddish brown |
| 200 | 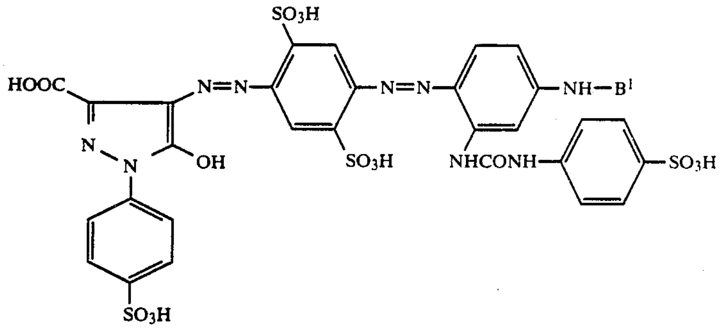 | reddish brown |
| 201 | 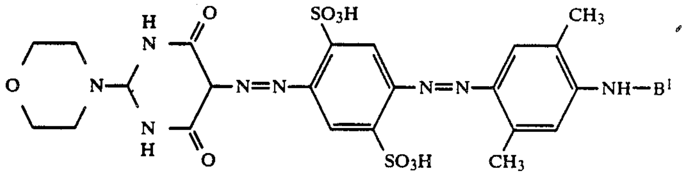 | orange |
| 202 | 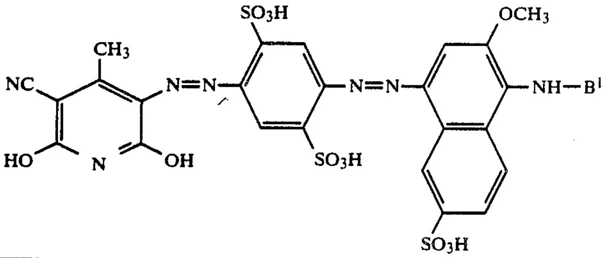 | orange |

We claim:

1. A compound of the formula:

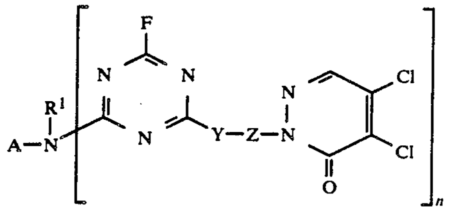

(I)

wherein:

A is a dye radical which is one member selected from the group consisting of formazan dye radicals and their metallized counterparts, said dyes containing from 1 to 6 sulfo groups;

n is 1 or 2;

Y is $R^1$—N;

$R^1$ is hydrogen or unsubstituted $C_1$-$C_4$-alkyl; and

Z is propylene, ethylene, methylene or phenylene; and wherein when n is 2, the groups are independently the same or different, and the groups Z are independently the same or different.

* * * * *